(12) United States Patent
Dacosta

(10) Patent No.: US 9,819,747 B2
(45) Date of Patent: Nov. 14, 2017

(54) CHIRP NETWORKS

(71) Applicant: MeshDynamics, Santa Clara, CA (US)

(72) Inventor: Francis Dacosta, Santa Clara, CA (US)

(73) Assignee: MeshDynamics, Santa Clara, CA (US)

( * ) Notice: Subject to any disclaimer, the term of this patent is extended or adjusted under 35 U.S.C. 154(b) by 86 days.

(21) Appl. No.: 14/740,062

(22) Filed: Jun. 15, 2015

(65) Prior Publication Data

US 2015/0304879 A1 Oct. 22, 2015

Related U.S. Application Data

(63) Continuation-in-part of application No. 13/764,008, filed on Feb. 11, 2013, now Pat. No. 9,363,651, which
(Continued)

(51) Int. Cl.
| | |
|---|---|
| *G06F 15/16* | (2006.01) |
| *H04L 29/08* | (2006.01) |
| *H04W 4/14* | (2009.01) |
| *H04W 40/24* | (2009.01) |
| *H04L 12/751* | (2013.01) |
| *H04L 12/753* | (2013.01) |

(Continued)

(52) U.S. Cl.
CPC ........ *H04L 67/145* (2013.01); *H04L 12/4625* (2013.01); *H04L 45/02* (2013.01); *H04L 45/48* (2013.01); *H04W 4/14* (2013.01); *H04W 40/248* (2013.01); *H04W 84/18* (2013.01)

(58) Field of Classification Search
CPC . H04L 27/103; H04L 1/0003; H04L 25/0202; H04L 2027/0093; H04L 45/04; H04L 45/02; H04L 45/48; H04L 45/28; H04L 41/12; H04L 12/462; H04L 47/10; H04L 49/15; H04L 47/781

See application file for complete search history.

(56) References Cited

U.S. PATENT DOCUMENTS

| | | | |
|---|---|---|---|
| 7,428,300 B1* | 9/2008 | Drew | H04M 3/2254 379/14.01 |
| 2010/0150170 A1* | 6/2010 | Lee | H04L 41/0213 370/466 |

(Continued)

*Primary Examiner* — Djenane Bayard
(74) *Attorney, Agent, or Firm* — Cherskov Flaynik & Gurda, LLC

(57) ABSTRACT

A network combining wireless and wired elements is described, using a multi-slot modular mesh node to house diverse transceiver elements (e.g. IR, Wi-Fi, Powerline). A radio agnostic tree based mesh network is formed, based on what type of wireless links are formed on the uplink and downlink of the backhaul and what type of radios are used for the Access Points AP. In addition to servicing IP based clients (e.g. Wi-Fi, WiMax, Bluetooth), the modular mesh nodes APs may also serve as receivers/collectors for low cost chirp devices. The method of transport is standard IP based packets yet security is inherent in this chirp-based implementation: only mesh nodes are privy to the routing tables that indicate that packet addresses are not IP. Multiple methods to obfuscate packet flow are presented. An organic approach to providing category/class based form of data type identification is proposed, to support a (dynamic) M2M Social Network Applications in-device discovery, registration and control are presented.

8 Claims, 72 Drawing Sheets

Related U.S. Application Data is a continuation-in-part of application No. 13/627,883, filed on Sep. 26, 2012, now Pat. No. 8,923,186, application No. 14/740,062, which is a continuation-in-part of application No. 13/571,294, filed on Aug. 9, 2012, now Pat. No. 9,172,738, which is a continuation-in-part of application No. 12/696,847, filed on Jan. 29, 2010, now Pat. No. 8,520,691, said application No. 13/571,294 is a continuation-in-part of application No. 12/352,457, filed on Jan. 12, 2009, now Pat. No. 8,477,762, application No. 14/740,062, which is a continuation-in-part of application No. 13/541,446, filed on Jul. 3, 2012, now abandoned, and a continuation-in-part of application No. 14/523,778, filed on Oct. 24, 2014, which is a continuation of application No. 12/625,365, filed on Nov. 24, 2009, now Pat. No. 8,514,852.

(60) Provisional application No. 61/615,802, filed on Mar. 26, 2012, provisional application No. 62/012,196, filed on Jun. 13, 2014, provisional application No. 61/555,400, filed on Nov. 3, 2011, provisional application No. 61/621,926, filed on Apr. 9, 2012, provisional application No. 61/148,803, filed on Jan. 30, 2009, provisional application No. 61/117,502, filed on Nov. 24, 2008.

(51) Int. Cl.
  *H04L 12/46* (2006.01)
  *H04W 84/18* (2009.01)

(56) References Cited

U.S. PATENT DOCUMENTS

| | | | |
|---|---|---|---|
| 2012/0202514 A1* | 8/2012 | Kadirkamanathan | H04W 64/006 455/456.1 |
| 2013/0343430 A1* | 12/2013 | Bettendorff | H04B 1/713 375/133 |
| 2015/0036649 A1* | 2/2015 | Chen | H04W 72/0453 370/330 |

* cited by examiner

DISTRIBUTED DHCP SERVICE WITH INHERENT CONFLICT RESOLUTION

ASSUME A FIXED SUBNET MASK OF *255.0.0.0* IS USED

- IP ADDRESSES OF THE FORM *A.x.y.k* where
- A defines the *CUSTOMER-NETWORK-ID* 16 bit (0 -255)
- k is *CLIENT BASED ID* 16 bit (0-255)
- x, y are each 16 bit : $2^{32}$ unique networks each with up 255 clients possible POLICY DIRECTIVE: SPLIT UP ADDRESS SPACE BETWEEN STATIC and MOBILE networks

- Assign 15 bits to distributed DHCP services for floating networks
- Let NODES CHOOSE A RANDOM 15-bit NUMBER '*R*' AT STARTUP and
  1. LET '*M*' BE THE DECIMAL EQUIVALENT OF THE 7-MSBs OF '*R*'
  2. LET '*N*' THE DECIMAL EQUIVALENT OF THE 8-LSBs OF '*R*'

THE DHCP ADDRESS SPACE OF THE NODE WOULD BE

*A.255-M.N.0* to *A.255-M.N.254 where 0<=M<=127 and 0<=N<=255*

Figure 29

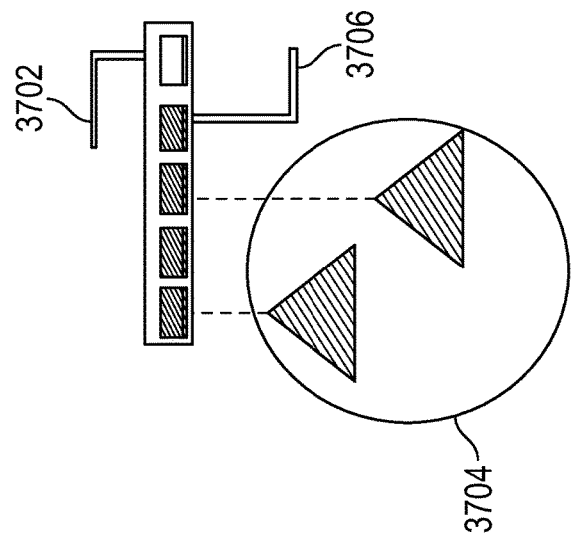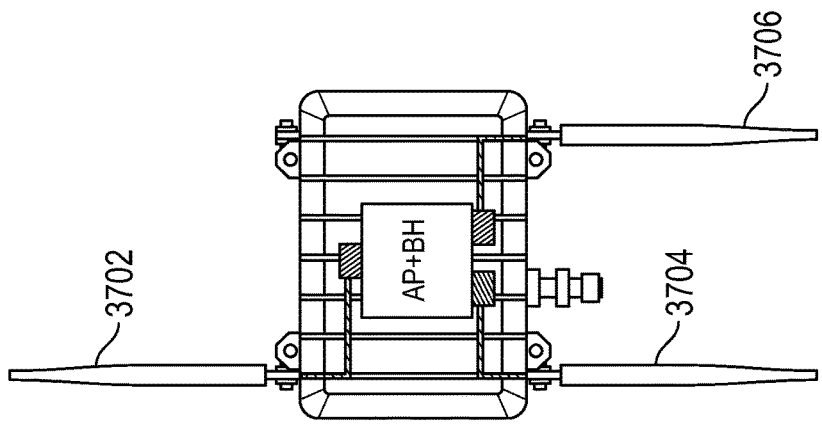
FIG. 37

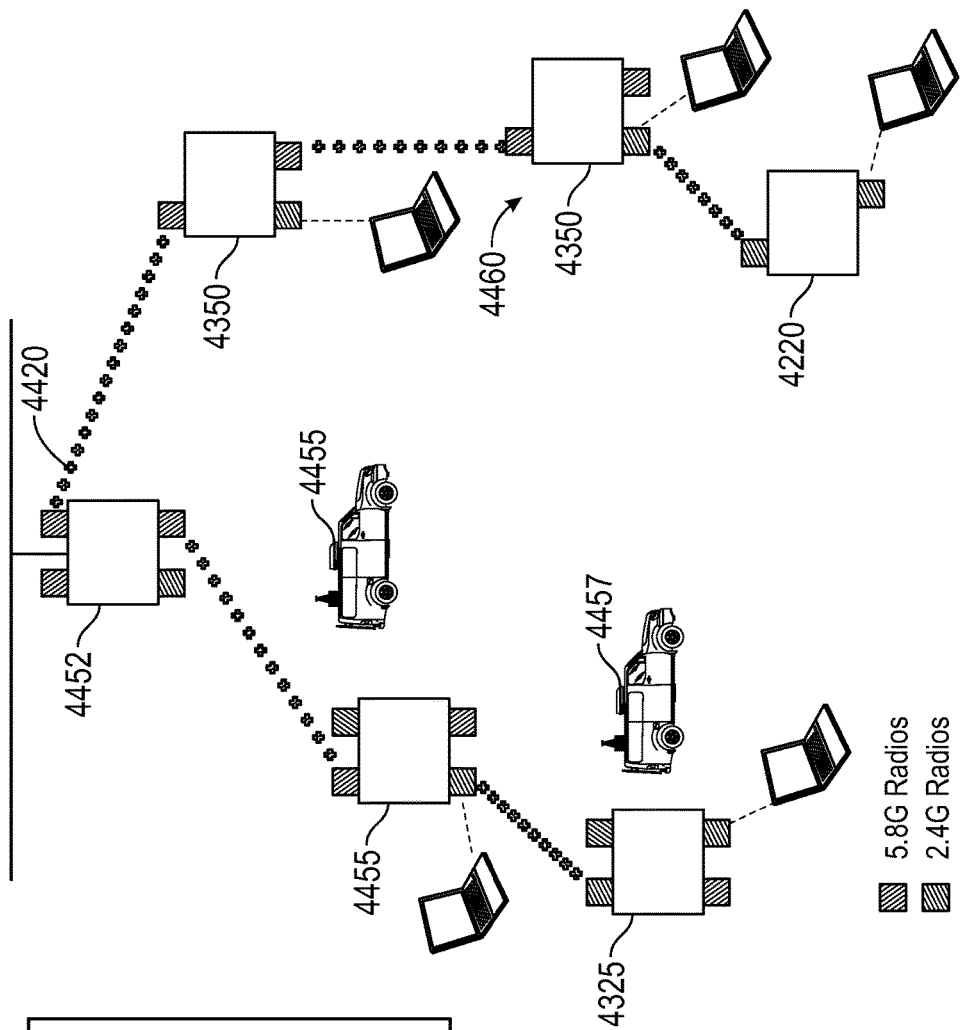
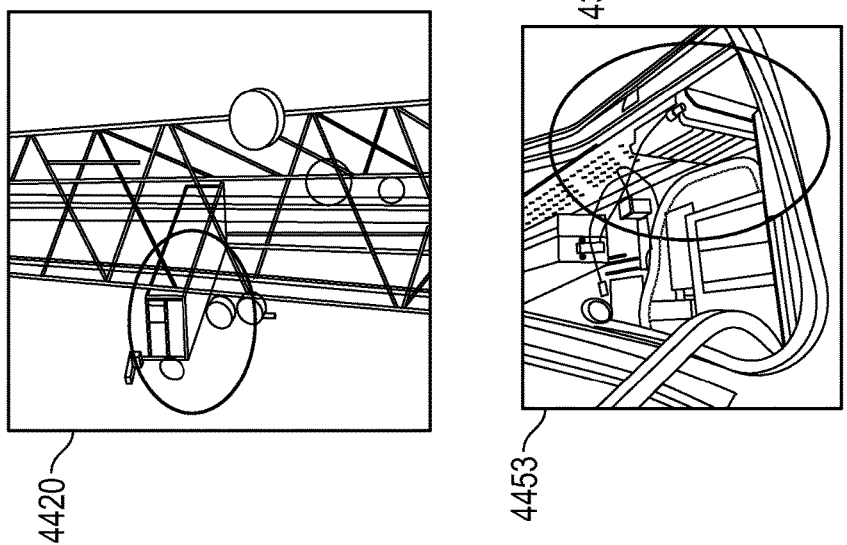
FIG. 44

Figure 53

Dual Control Loop
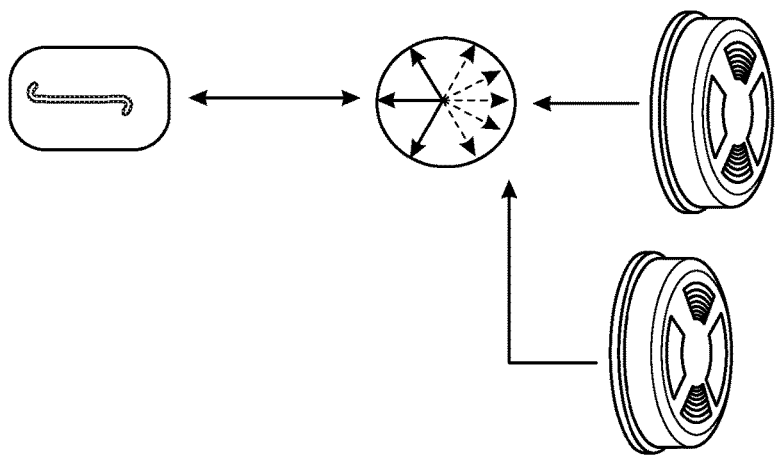
Single Control Loop
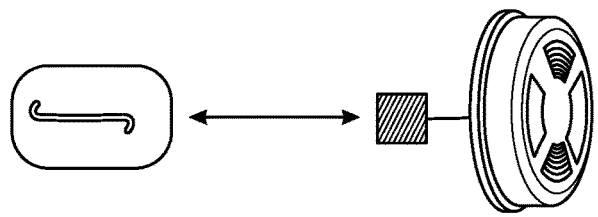
FIG. 56

*Some devices will combine multiple IoT functions in a single package. Here an End Device includes a Propagator node that may provide networking services for additional nearby End Devices.*

CHIRP NETWORKS

CROSS REFERENCES

The instant application claims priority as a non-provisional of U.S. Provisional Application Ser. No. 62/012,196, filed on Jun. 13, 2015.

The instant application is a continuation in part of U.S. Utility application Ser. No. 13/764,008, filed on Feb. 11, 2013, which is pending, which in turn claimed priority as a continuation in part of U.S. Utility application Ser. No. 13/627,883, filed on Sep. 26, 2012, and issued as U.S. Pat. No. 8,923,186 on Dec. 30, 2014, which in turn claimed priority as a non-provisional utility application of Provisional U.S. Patent Application Ser. No. 61/555,400 filed on Nov. 3, 2011, and Provisional U.S. Patent Application Ser. No. 61/615,802, filed on Mar. 26, 2012, and Provisional U.S. Patent Application Ser. No. 61/621,926, filed on Apr. 9, 2012, the contents of which are hereby incorporated by reference.

The instant application claims priority as a continuation in part of U.S. patent application Ser. No. 13/571,294, filed on Aug. 9, 2012, presently pending, which in turn claimed priority to U.S. patent application Ser. No. 12/696,947, filed on Jan. 29, 2010, issued as U.S. Pat. No. 8,520,691 which issued on Aug. 27, 2013, which in turn claimed priority as a non-provisional of U.S. application Ser. No. 61/148,803, filed on Jan. 30, 2009, the contents of each prior application is hereby incorporated by reference. Application Ser. No. 13/571,294 also claimed priority as a continuation in part of U.S. Utility application Ser. No. 12/352,457, filed on Jan. 12, 2009, and issued as U.S. Pat. No. 8,477,762 on Jun. 2, 2013, the contents of each prior application is hereby incorporated by reference.

The instant application claims priority as a continuation in part of U.S. application Ser. No. 13/541,446 filed on Jul. 3, 2012, presently pending, the contents of which are hereby incorporated by reference.

The instant application further claims priority as a continuation in part of U.S. Utility application Ser. No. 14/523,778, filed on Oct. 24, 2014, presently pending, which in turn claims priority to U.S. Utility application Ser. No. 12/625,365, filed on Nov. 24, 2009, issued as U.S. Pat. No. 8,514,852 on Aug. 20, 2013, which in turn claimed priority to U.S. application 61/117,502, filed on Nov. 24, 2008, which are hereby incorporated by reference.

FIELD OF THE INVENTION

This invention relates to the field of computer networks and machine communications and, more particularly to a network system and method for facilitating large scale messaging emanating from devices on the edge of the network. These edge devices include, for example, sensors and actuators that interface with the dynamics of the physical world and each other through terse messages. In some embodiments these terse messages are referred to as chirps. Small data propagators near the edge of the network optimize the data based on dynamic subscriber interests.

BACKGROUND OF THE INVENTION

Increasing percentages of devices connected to the Internet or other global networks are not used by people in the familiar way that personal computers, tablets and smart phones are. Interconnected devices monitor the environment, structures, transportation systems, factories, farms, forests, utilities, soil and weather conditions, oceans and resources. Many of these sensors and actuators are networked into autonomous sets, with much of the information being exchanged machine-to-machine directly and without human involvement.

Machine-to-machine communications are typically brief and specialized. Most sensors and actuators will report or act upon small pieces of information. For purposes of the systems described in this application these terse messages are "chirps." Burdening these devices with prior art standard network protocol stacks is inefficient, unnecessary and unduly increases their cost of ownership.

Machine-to-machine communications dominate in several applications, including the field referred to as the "Internet of Things." As described in this application, the architecture optimized for the Internet of Things necessarily entails a widely distributed topology relying on simpler chirp protocols, especially at the edges of the network where the machine-to-machine communications predominate. Intermediate network elements perform information propagation, manage broadcasts, and provide protocol translation. Another class of devices house integrator functions providing higher-level analysis, for both near-edge analytics and broader-scope analysis. Small chirp data provides the necessary information for analytical systems.

The system as described in the application is described using certain analogies, such as the propagation of pollen, and interaction of social insects.

This application describes reasons why a different architecture is needed for the Internet of Things. The architectures described can coexist with existing incumbent networking protocols. In one embodiment, the architecture comprises integrator functions, propagator nodes, and end devices, and their interactions.

SUMMARY OF THE INVENTION

This invention addresses multiple embodiments. The methods taught address a variety of current networking challenges, specifically for mobile, temporal, or isolated networks, as can occur when a collection of wireless nodes is moving. These networks are mission critical, often requiring multiple connectivity media. Approaches for such networks are described in FIGS. 9, 14, 15, 25, 39, 44, 45. As shown in those figures, the networks are often hybrids, involving both humans and machines. The machines may use IP or non IP (machine native) protocols. Such protocols are suitable for terse machine-to-machine (M2M) messaging and may use separate physical radios as shown in FIGS. 22, 23, 25, 62, 63. Alternately, they may collaboratively share the same physical radio as shown in FIGS. 32, 33, 39. Such a one-radio embodiment may use collaborative scheduling shown in FIGS. 65-67. Lastly a Network Management System (NMS) framework must support clients which include humans, machines, routers and applications in the routers supporting terse M2M messaging, as shown in FIG. 12, element 060.

These diverse requirements are supported by a service delivery framework for network participants comprising mesh nodes (in one embodiment) wherein each mesh node supports wireless clients. The features implemented in the architecture include:

Logical Radio Routers FIGS. 1 through 8 depict one logical radio abstraction to support diverse client connectivity needs. FIGS. 9, 13, 14, 15, 25, 44, 45, 56 through 63 explain certain other embodiments. FIGS. 5, 6 depict the analogy to tree based wired switch stacks. The analogy to ports on the switches is made in FIGS. 9, 38 through 42. FIGS. 13, 14, 15, 16, 44, 45 depict mission critical embodiments. Home or office application are shown in FIGS. 22, 23, 56 through 63, 68, 69.

Efficient Terse Messaging Transport FIGS. 10, 11 12, 24, teach concatenation for latency bound transmissions of terse M2M messaging, an embodiment of particular importance to VOIP packets.

Modular Nodes based on U/D/S/A FIGS. 17, 22, 23, 26, 38, 39 through 45, 63 are embodiments of modular frameworks supporting the logical radio abstractions of Uplink, Downlink, Scanner and Access Point. Failover and dynamic options from one uplink port to another is depicted in FIGS. 9, 21, 41, 42, 44, 45. Dynamic reconfigurable ports and sharing of U,D,S,A functions are depicted in FIGS. 9, 41, 42, 44, 45.

Isolated Network support: FIGS. 27 through 29 teach methods for Distributed DHCP address generation needed in mobile, temporal or isolated networks. Other applications are depicted in FIGS. 26, 39, 44, 45. Finally, FIG. 27 depicts the SIP registry for M2M messaging, e.g. VOIP.

Remote Management FIGS. 18, 19 describe embodiments for remotely programming clients. Clients include mesh router applications, element 060 FIG. 12. Programming applications or rule based directives is taught in FIGS. 30, 31. The NMS based application support framework is depicted in FIG. 52. It extensively uses Local and Global Streams, FIGS. 48, 49. Intra router communications is implemented using terse UDP-based "heartbeats," FIG. 54. It is open and customizable and used for other M2M messaging. Stream Readers are used to translate and communicate with native formats, FIGS. 50, 51, 52. A published NMS API, FIG. 53, enables custom and domain specific NMS development, see FIG. 55.

Application-Aware Mesh Control FIGS. 12, 20, 43 depict facets of the Mesh Control Layer that manages mesh topology first introduced in FIG. 1. The control layer is radio and protocol abstracted. It supports both IP and non-IP client devices and applications.

Chirp Device Registration and Discovery FIGS. 64, 70 describe a topic-based addressing scheme that does not require IP based addressing schemes. Instead the nature of the device and its function, define its genus. Categories may be defined or created using the SIP/DHCP services depicted in FIGS. 27, 28. FIGS. 56 through 63 depict embodiments for such low-cost chirp devices. Category based information, e.g. "small data" is available within the M2M network for autonomous pattern discovery and machine control, see FIGS. 68, 69, 70.

Latency Sensitive Messaging FIGS. 56 through 63 depict embodiments of devices participating in a dynamic M2M publish subscribe exchange. Terse M2M messaging between devices includes latency sensitive traffic, see FIGS. 25, 56, 68, 69. FIG. 71 shows chirp packets enter the propagator from both local and remote publishers (elements 7110 and 7120 respectively). The latter is containerized as a bus-load for efficient transport, 7120. Inside the propagator, port forwarding tables define the locations of interested subscribers. The bus containers may be reconstituted, in alignment with the current dynamics of the pub-sub exchange. Further processing includes removing chirp packets that are duplication or are no longer desired (such as for those packets that arrived out of order or contain information that is no longer current). In one embodiment, heart beat packet duplicates are discarded at each mesh node. The reconstituted bus containers are then sent out to both local and remote subscribers 7140. As shown in FIG. 72, the top level view of the entire M2M service delivery framework consists of simple terse messaging devices 7210. Further included in the embodiment are propagator and bridging Mesh Network elements 7220 which incorporate agents. The agents are implemented within the nodes 7225. Agents act on behalf of big data subscriber requirements 7230.

BRIEF DESCRIPTION OF DRAWINGS

In order to more fully describe embodiments of the present invention, reference is made to the accompanying drawings. These drawings are not to be considered limitations in the scope of the invention, but are merely illustrative.

In FIG. 7, there is one service radio to service both voice and data clients. However voice and data traffic has different performance requirements. By having different Access Point radios service the voice and data clients, the contention between voice and data packets attempting to gain access to the same medium is reduced. Also, with different radios servicing the data and voice clients, the voice and data packets can now be treated differently. The Access Point radios servicing the voice clients could therefore be operating in TDMA (time division multiple access) mode while the AP radio servicing the data clients operates in CSMA (Collision Sense Multiple Access) mode. The two radios (032) and (034) thus provide different functionality. VoIP devices such as phones connect to the former, data devices such as laptops to the latter.

Figure 1:
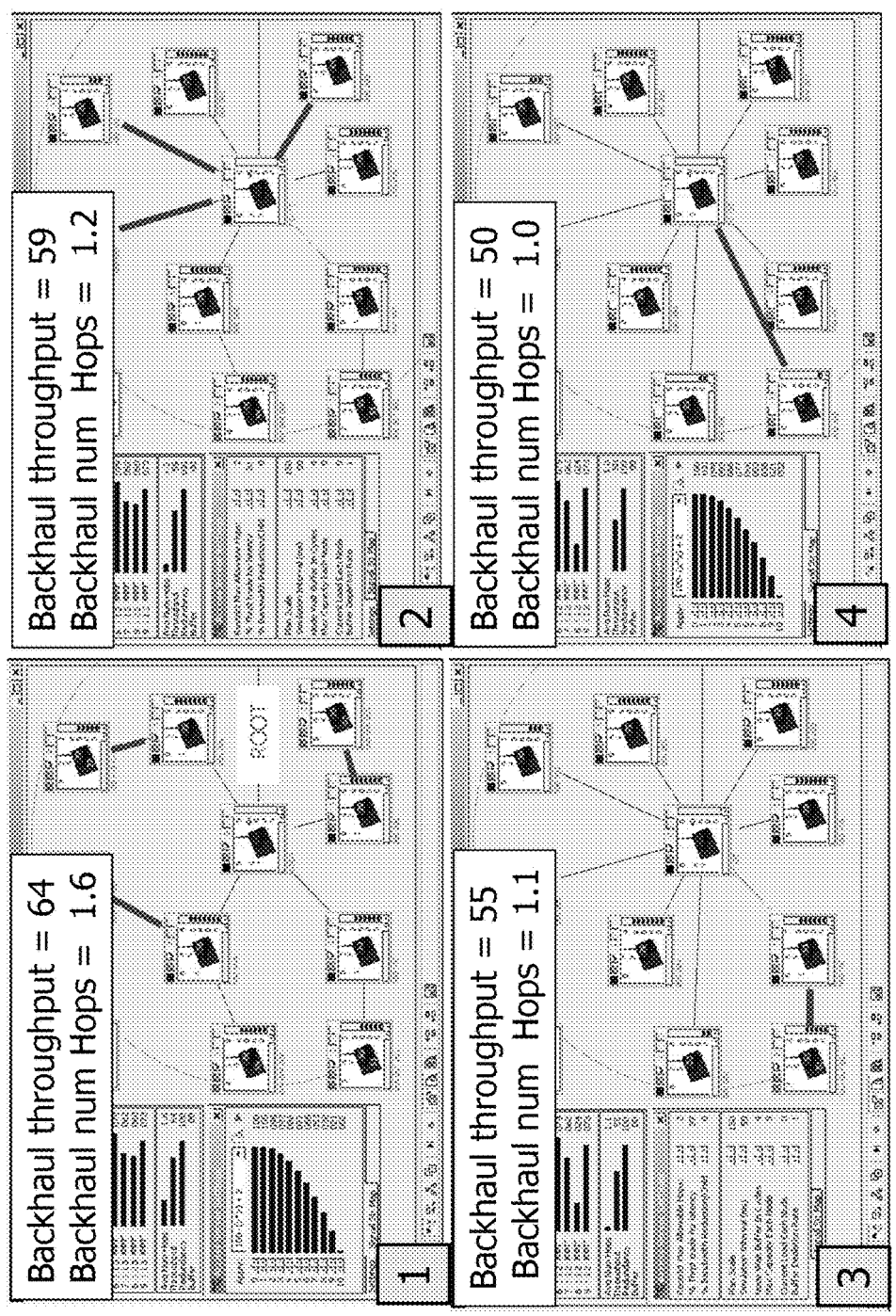
FIG. 1 illustrates how the network topology is changed by selecting a different backhaul in a two-radio system, with one link to the backhaul AP and the other link servicing the child AP. It depicts four network topologies. Each of the four network topologies provides a different set of performance in terms of latency and throughput. The mesh control software adjusts the latency and throughput parameters to meet voice/video or data performance requirements in terms of latency and bandwidth.
Figure 2:
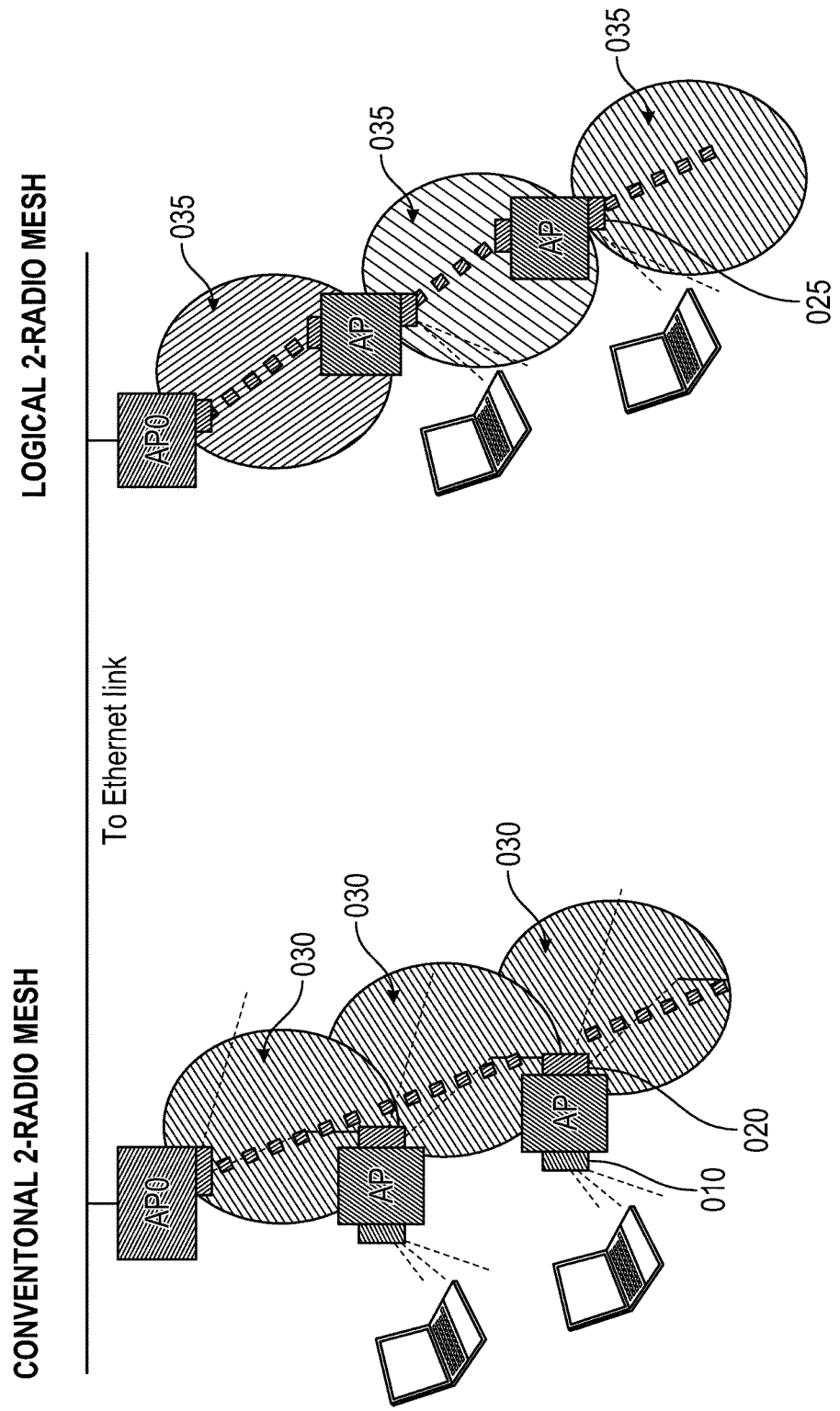
FIG. 2 contrasts the conventional "Dual Radio" mesh with the Logical Two-Radio Mesh. On the left of FIG. 2, two radios labeled 010 and 020 provide client connectivity and ad hoc mesh backhaul functionality, respectively. All the mesh backhaul radios (020) are on the same channel depicted by the clouds of coverage of the same color (030). They are all part of the same sub-network. In contrast, on the right of FIG. 2, the same radio (025) provides service to clients and also backhaul functionality but operates in different sub domains depicted by different color clouds of coverage (035). The left hand resembles a network hub, the right side a high performance network switch. Hubs are not scalable.
Figure 3:
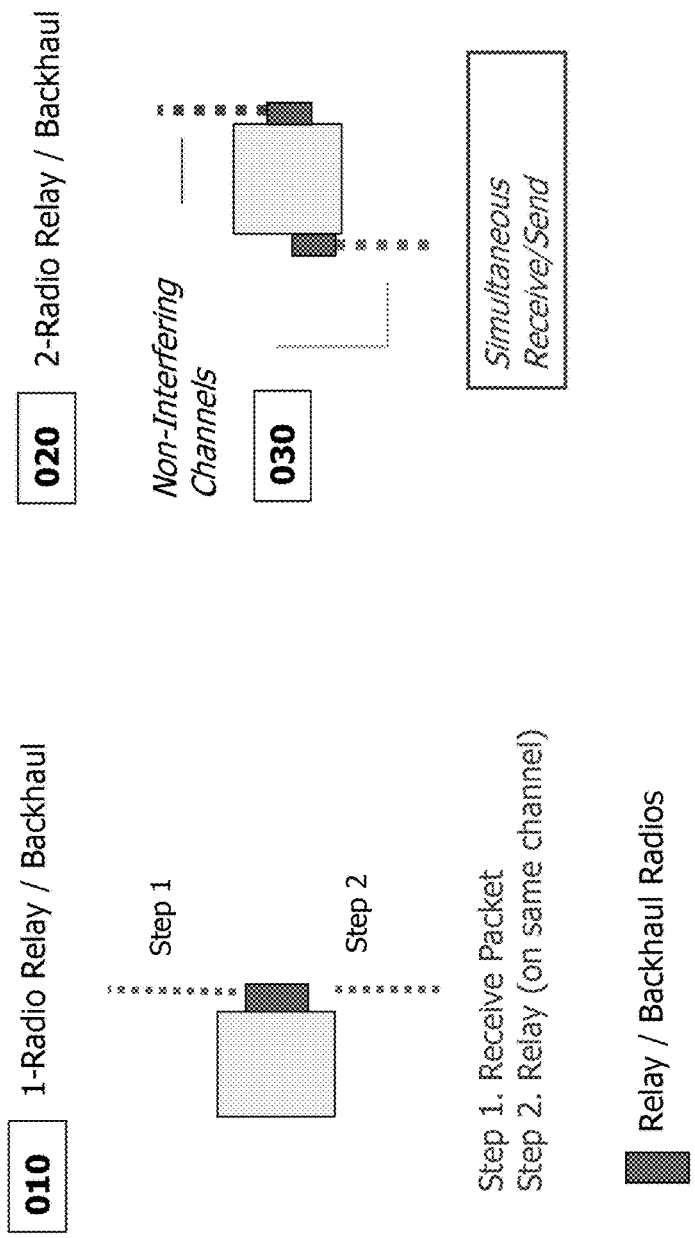
FIG. 3 compares the two-step process of a single radio relay to a two-radio relay. On the left side, (010) a single radio relay is shown. Every packet received has to be re-transmitted on the same radio. Thus the bandwidth with every hop in a single radio mesh network is reduced by approximately 50%. After three hops, the Bandwidth would be an eighth of what is available at the Ethernet backhaul. On the right side of FIG. 3 (020) a two-radio backhaul is shown, where packets received on one radio are re-transmitted on another radio operating on a non-interfering channel. In this configuration, there is no bandwidth reduction with every hop and bandwidth is preserved with every hop. Two radio mesh backhauls are scalable while single radio backhauls are not.

As explained below, the embodiment includes a Packet classifier (labeled 010) that recognizes voice packets based on size and regularity of transmissions. A VOIP concatenation engine (labeled 020) "container-izes" small voice packets into a larger "container" packet for more efficient transportation. Real time extensions (labeled 030) to the Linux kernel enable the system to provide near real time performance for sending and receiving the latency sensitive VOIP container packets through the network—regardless of what the Operating System is doing at the time.

Application driven rules and Scripts are resident in device abstracted APPLICATION layer library 060, a supervisory control layer above three lower control layer modules: TCP/IP, MESHCONTROL 040 and SCAN 050. Direct Machine to Machine (M2M) communications are controlled by APPLICATION over the Software MAC layer. The Software MAC Layer is typically running at the Kernel level of the software platform, requiring LINUX KERNEL EXTENSION 030. These extensions enable low level, fast applications/algorithms, operating at close to port forwarding tables, operating at (Kernel level) Drivers for Ports 080. The APPLICATION layer is analogous to the Control Plane in the SDN paradigm. The control plane manages the buses, FIG. 72 needed for real time M2M messaging for industrial applications FIGS. 56, 68, 69, down to port level routing. The TCP/IP layer supports AAA audit trails and AES encryption 090 so the Application Service Delivery and Deployment is securely managed.

Figure 13:
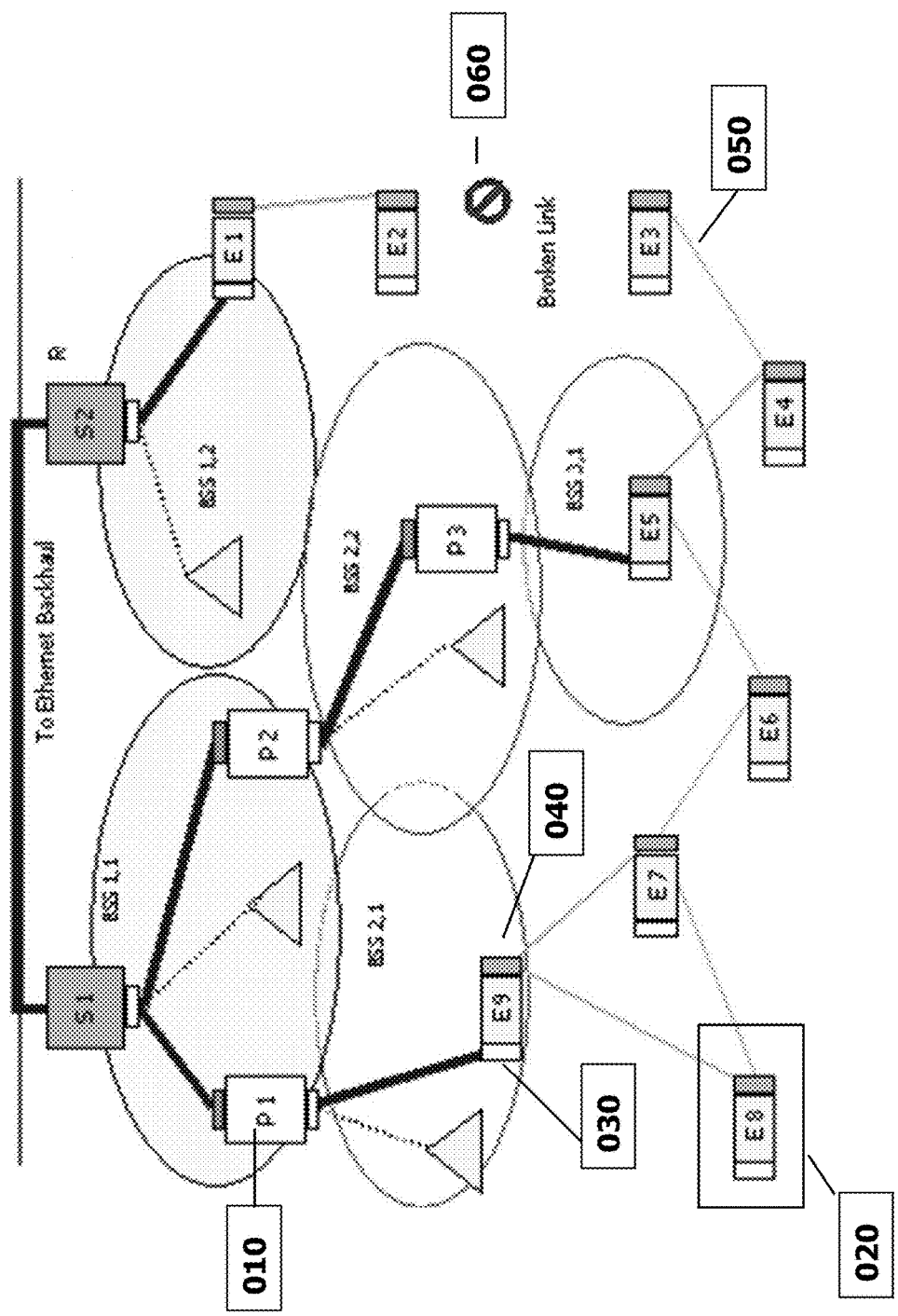

FIG. 13 shows the concept of a "Hybrid Mesh network" where two-radio systems provide two types of service. In one case, they are part of an infrastructure mesh as shown by the two-radio mesh node labeled 010. In another embodiment, the same node may be dynamically reconfigured to support ad hoc peer-to-peer connectivity. The node labeled 020 (marked as E8) has two radios. One is intended for client radio connection to infrastructure mesh nodes—see the radio labeled 030 on the unit marked E9. The other provides a peer-to-peer mesh capability, as shown by radio labeled 040. Depending on the needs of the network, the two-radio units are dynamically re-configured to support either need, infrastructure mesh (010) or backhaul support to ad hoc mesh (020). Labels 050 and 060 designate connected and broken ad hoc mesh links.

Figure 14:
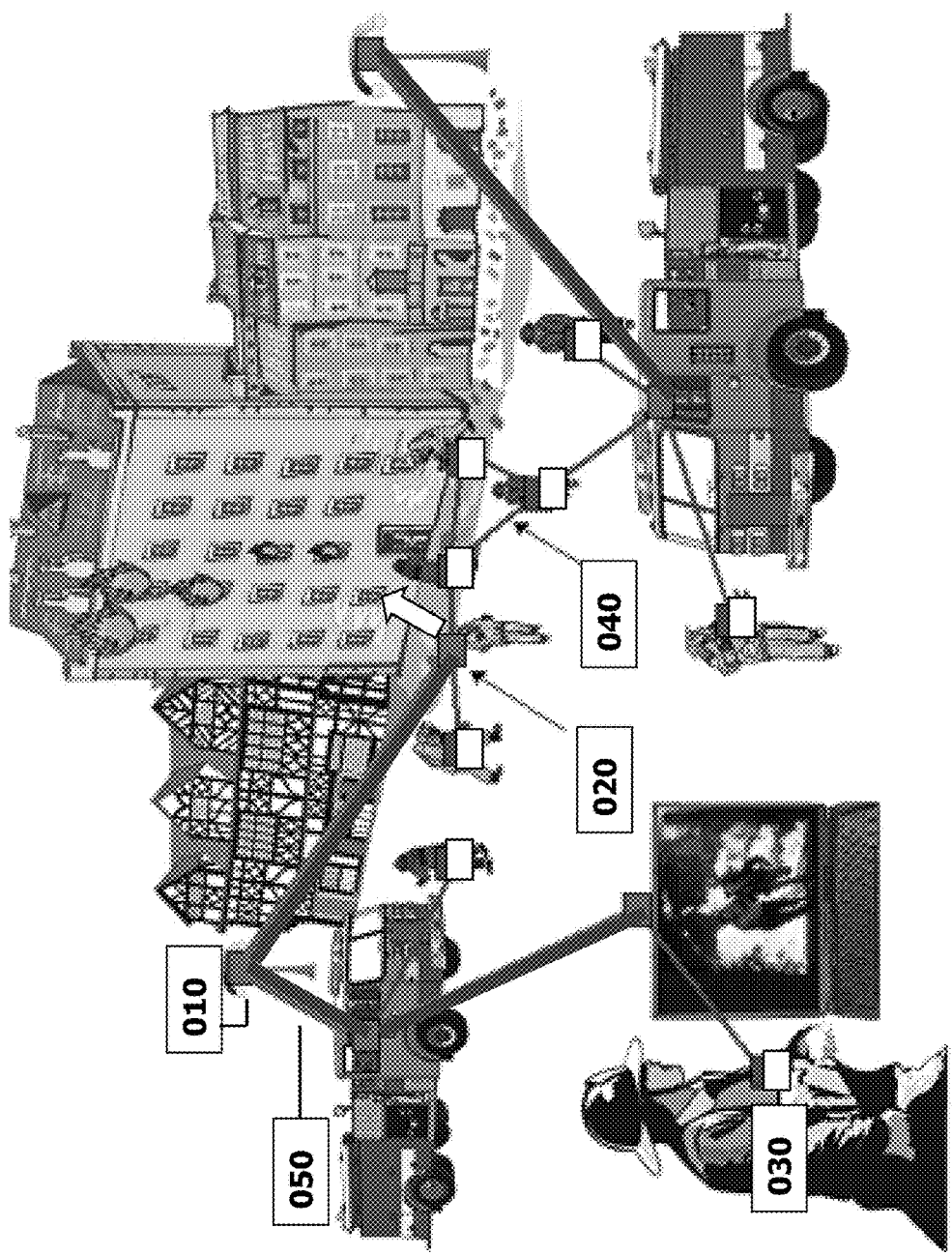

FIG. 14 is an application of the Hybrid Mesh concept to a Public Safety embodiment. The node labeled 010 is a Stationary node on top of a light pole, in this embodiment. A mobile embodiment shown as labeled 020 is entering the building (arrow) such as when carried by firefighters. These mobile units are also called "breadcrumb" routers. The Mobile Mesh nodes provide connectivity to two-radio portable units worn by the firefighters in this picture. All firefighters are thus connected to themselves through a peer-to-peer mesh network shown as a thin line. They are also connected to the Infrastructure mesh backhaul through one or more connect points. This ensures redundancy in network connectivity. The broken link (labeled 060, FIG. 13) is avoided.

Figure 15:
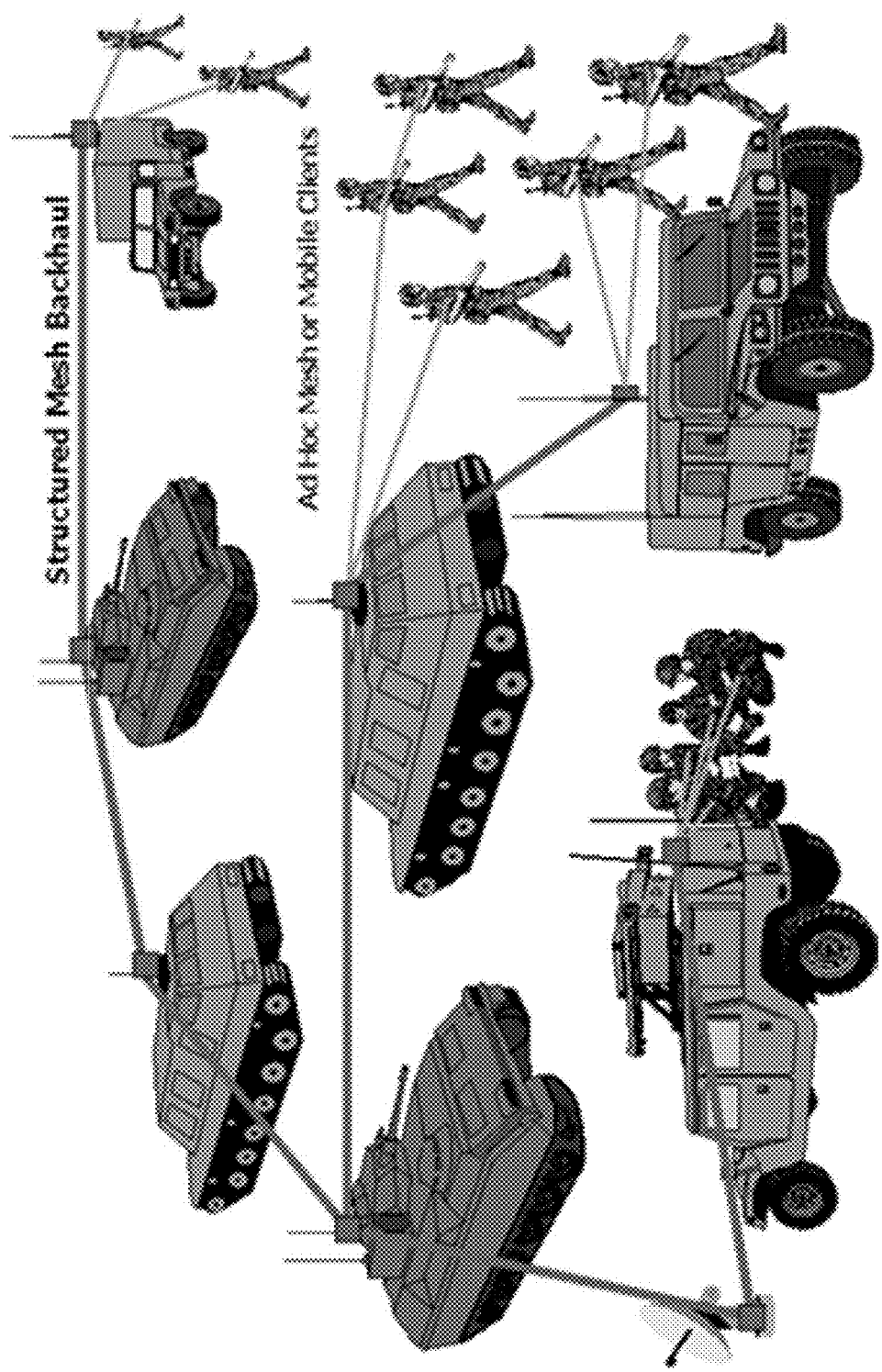

FIG. 15 is an application of the Hybrid Mesh concept related to a Battle Force Protection embodiment.

Figure 16:
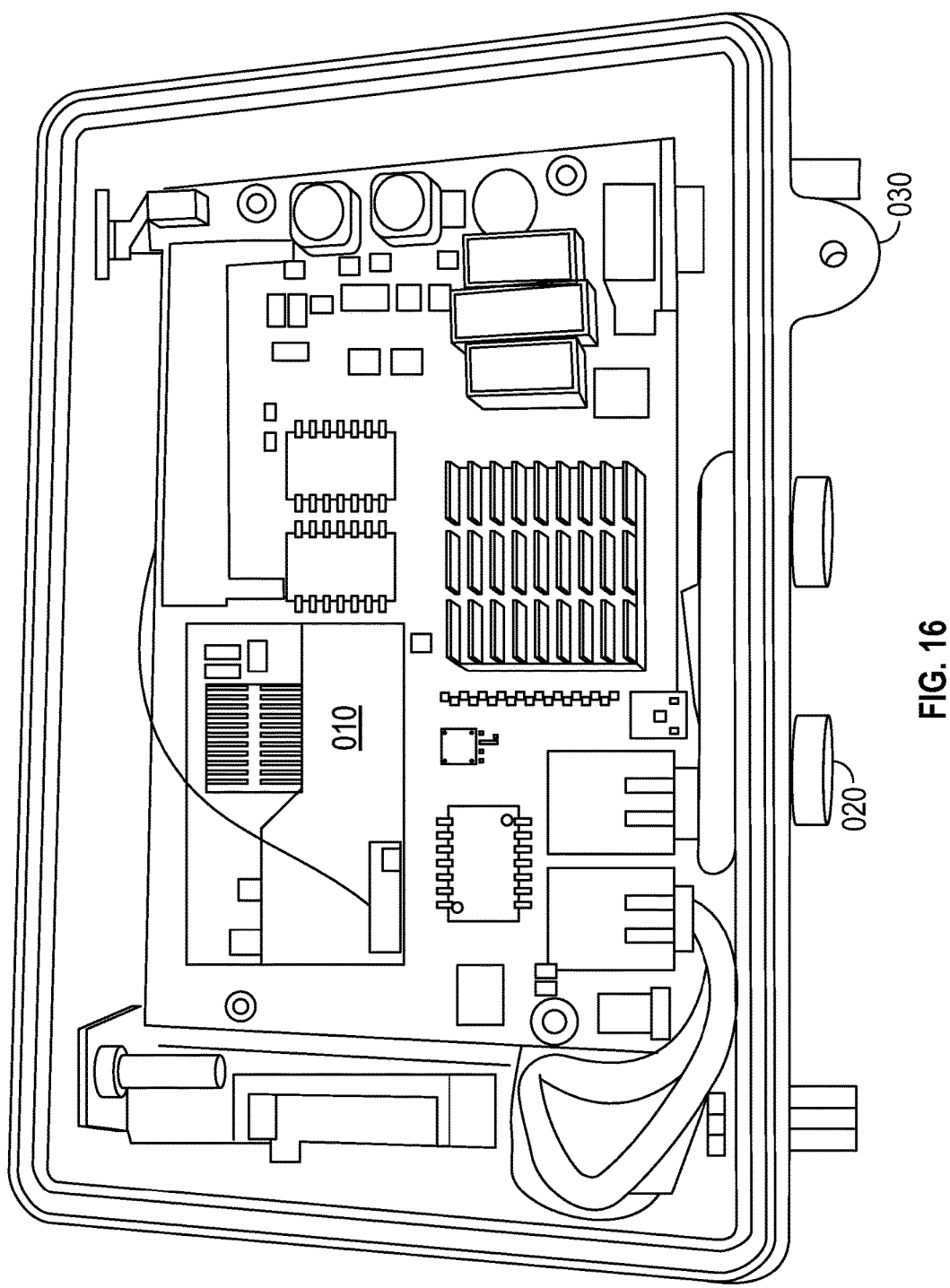
Figure 17:
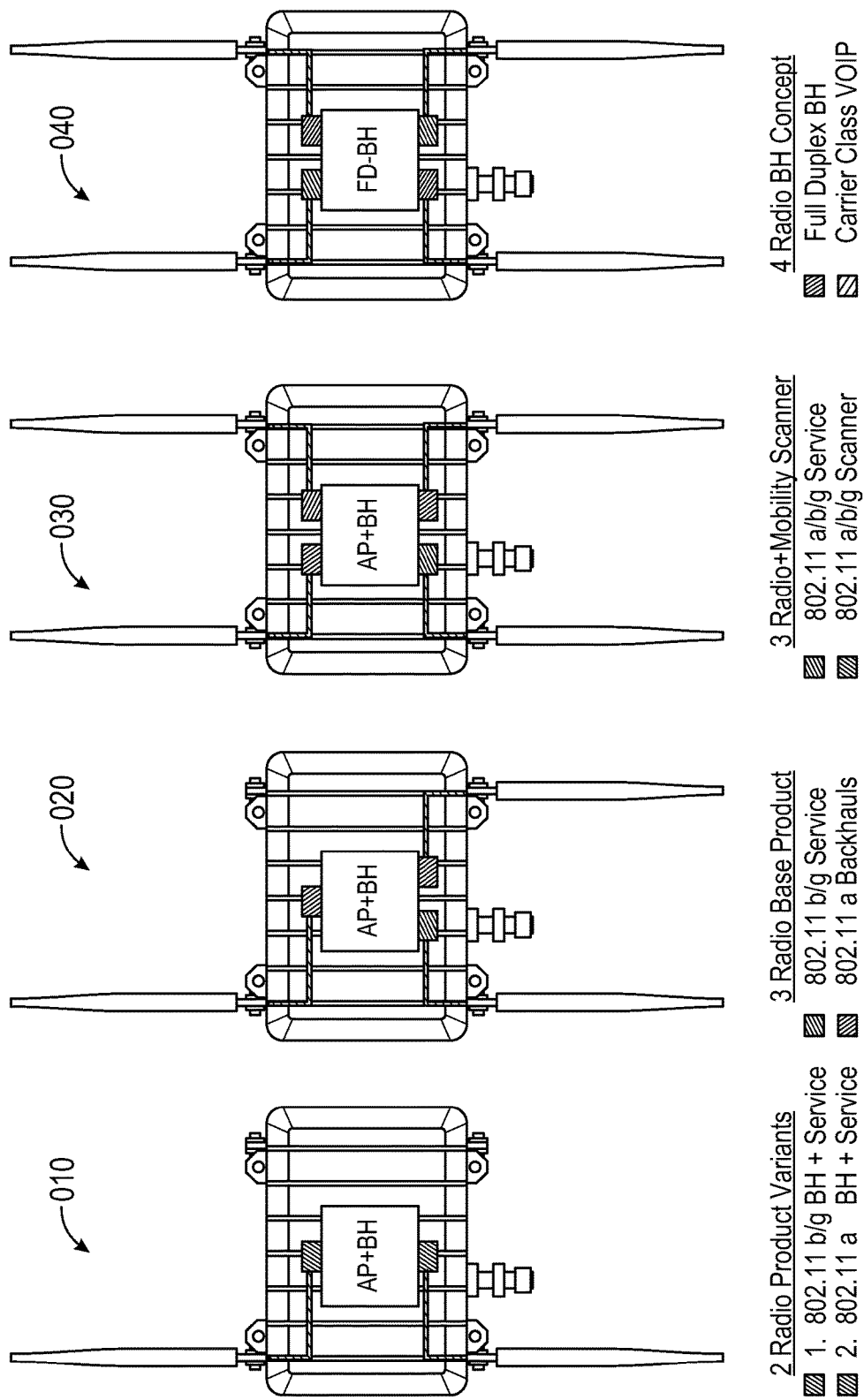

FIG. 16 depicts an embodiment using mesh nodes which feature four radio slots used in the modular mesh framework of FIG. 17. There are two slots for radio cards on the front and back. Up to four radios 010 are thus supported on a single embedded systems board. The radio card antenna connections 030 are included for four radios. Two Ethernet ports 020 provide wired access to provision wired uplink and wired service access.

Figure 5:
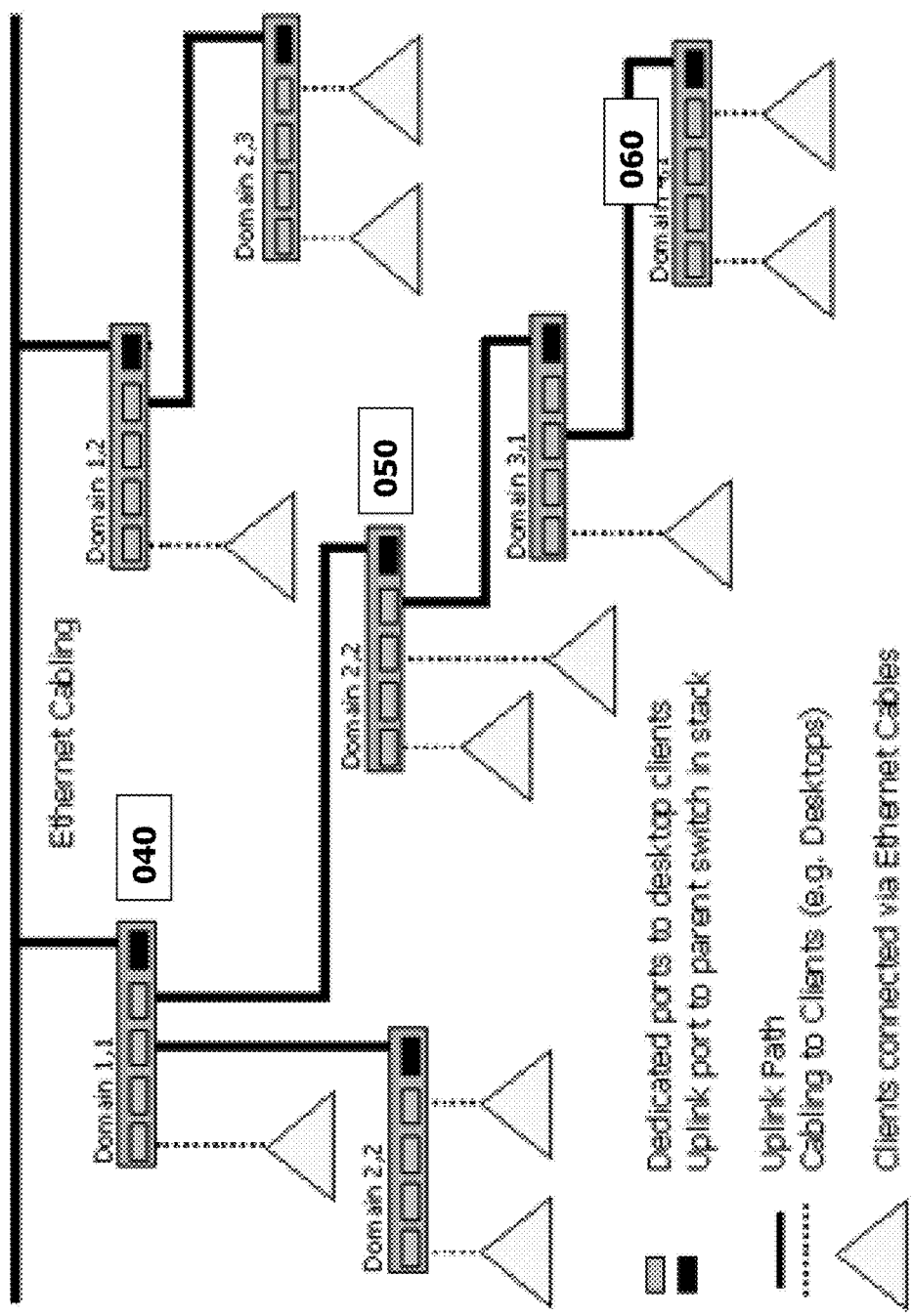
FIG. 5 shows the similarities between FIG. 4 and a wired switch stack with the same chain of connectivity 040-050-060. Both have the same tree-like structure and up link and down link connections. In both cases the units (040,050,060) operate on a distinct sub domain.
Figure 6:
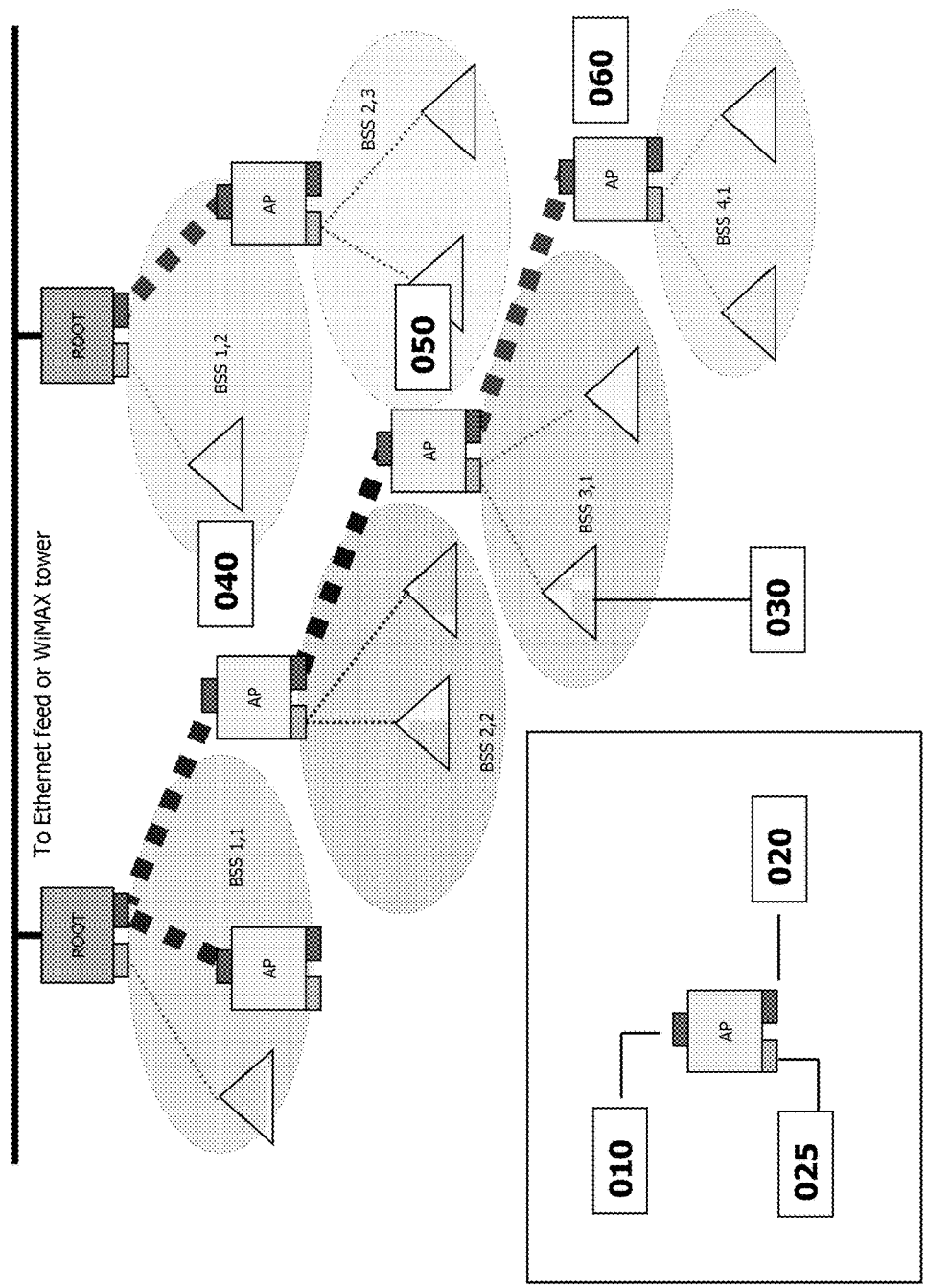
FIG. 6 illustrates one embodiment of the two logical-radio approach with three physical radios. Two radios constitute logically one radio of the two logical radio concept, while the third physical radio serves clients as the second radio of the two logical radio concept. By eliminating the sharing of physical radios for both backhaul and client services, the backhaul bandwidth is improved and also reduced the dependency to use the same type of radios for the backhaul and for clients. In the insert, the uplink radio (labeled 010) connects to the parent mesh node while the downlink radio (labeled 020) connects to the uplink radio of child mesh nodes. The service radio (labeled 030) act as Access Points to client radios shown as triangles. One such is labeled 040. Note that all service radios (030) operate on different non-interfering channels, depicted by different color ovals.
Figure 7:
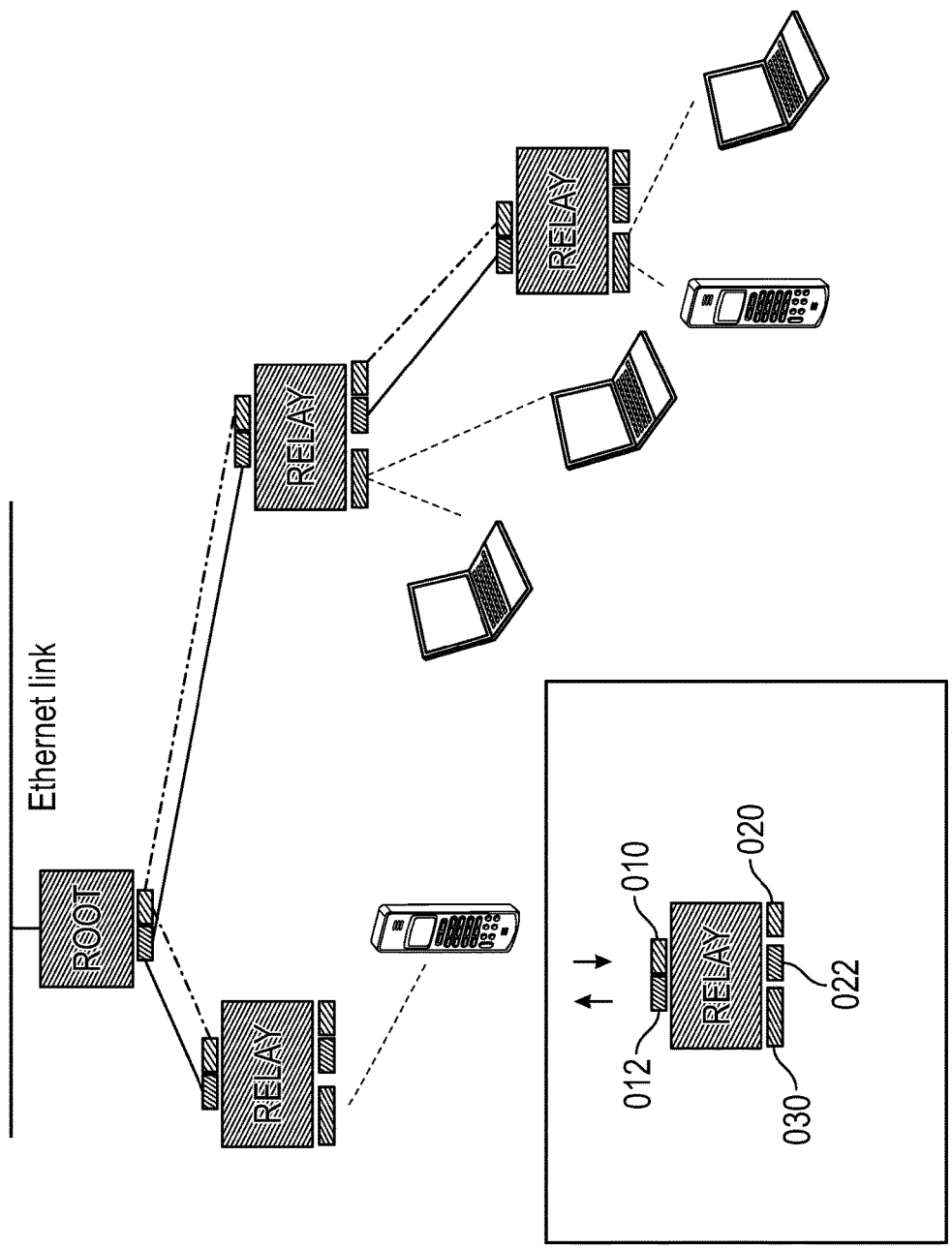
FIG. 7 illustrates another embodiment of the two logical radio approach but with five physical radios. The uplink and downlink radios (shown as one radio FIG. 6) are split into two radios, in this embodiment, with each responsible for one direction of traffic. Bandwidth is doubled and latency halved, since traffic in the opposing direction now has its own channel or logical "lane". Thus, the radio labeled 010 in FIG. 6 is now radios 012 and 010. Similarly, the radio marked 020 in FIG. 6 is now split into radios labeled 022 and 020. The radio pairs 012-010 and 022-020 provide the same functionality as the radios labeled 010 and 020 in FIG. 6 but with twice the bandwidth and approximately half the latency.
Figure 8:
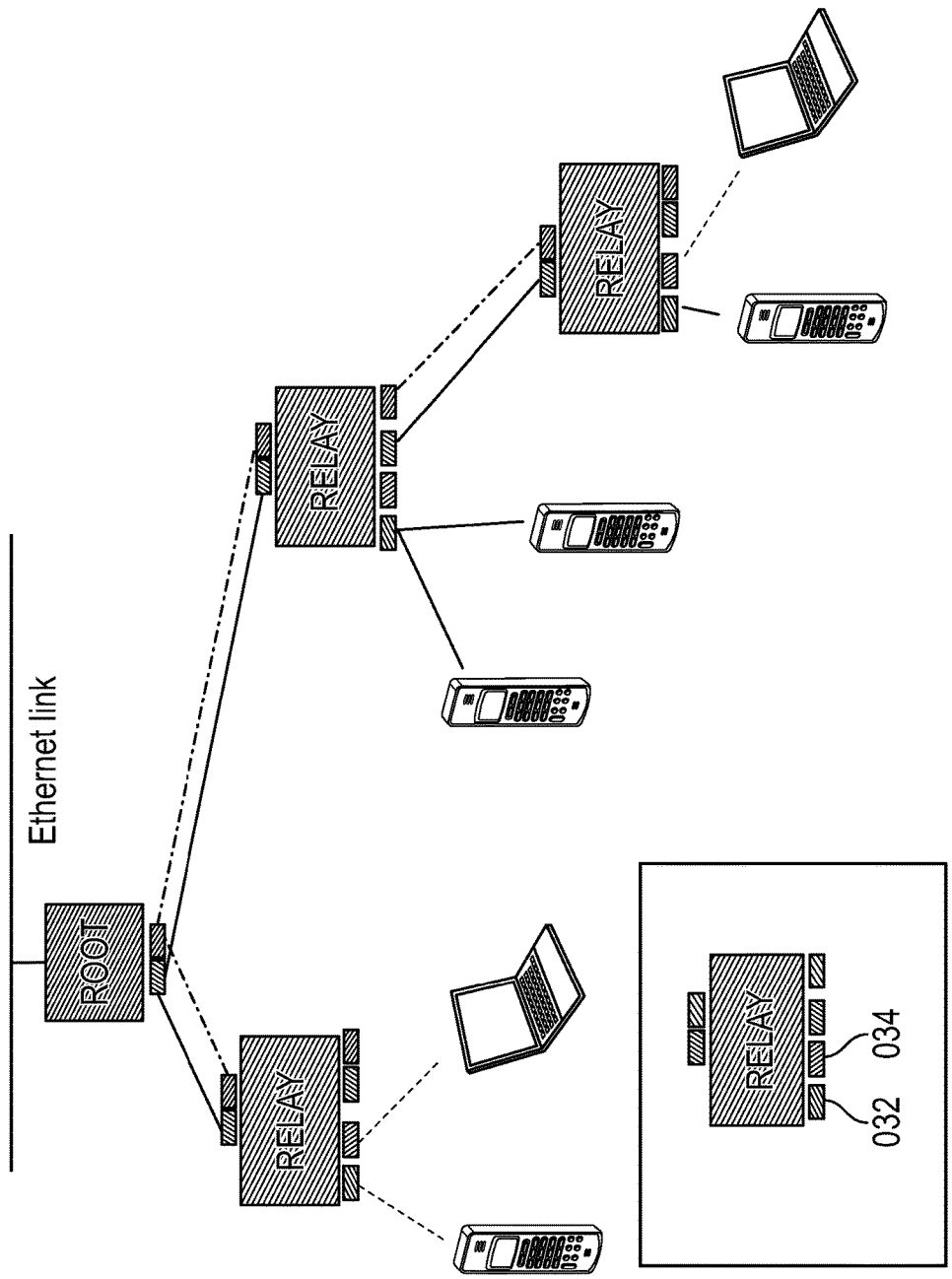
FIG. 8 is an extension of the five-radio embodiment shown in FIG. 7.
Figure 9:
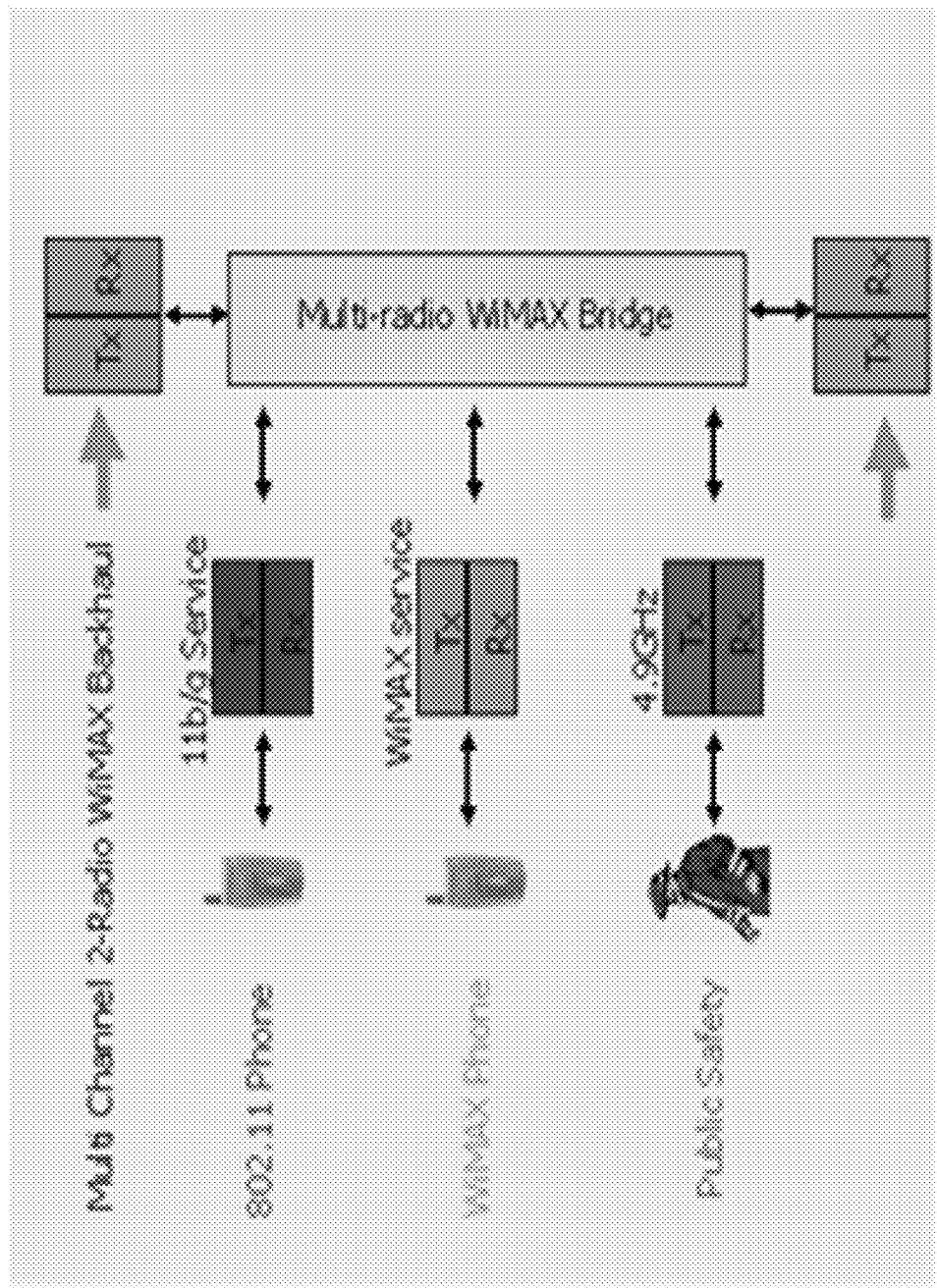
FIG. 9 is a five-radio extension of the three-radio configuration shown in FIG. 6 but with more dedicated service radios operating on different frequencies for different types of client radios.

FIG. 17 indicates the modular mesh framework, whereby a four slot board, as shown in FIG. 16, may be configured to provide different functionalities: Two radio Backhaul (BH) 010; three radios BH+AP 020; four Radio with BH AP and Scanner 030; four radio with Full Duplex (FD) using a coupled two radio BH 040. Further, since the modular mesh framework always forms a tree, these nodes are part of a switch hierarchy, as shown in FIG. 5.

Figure 18:
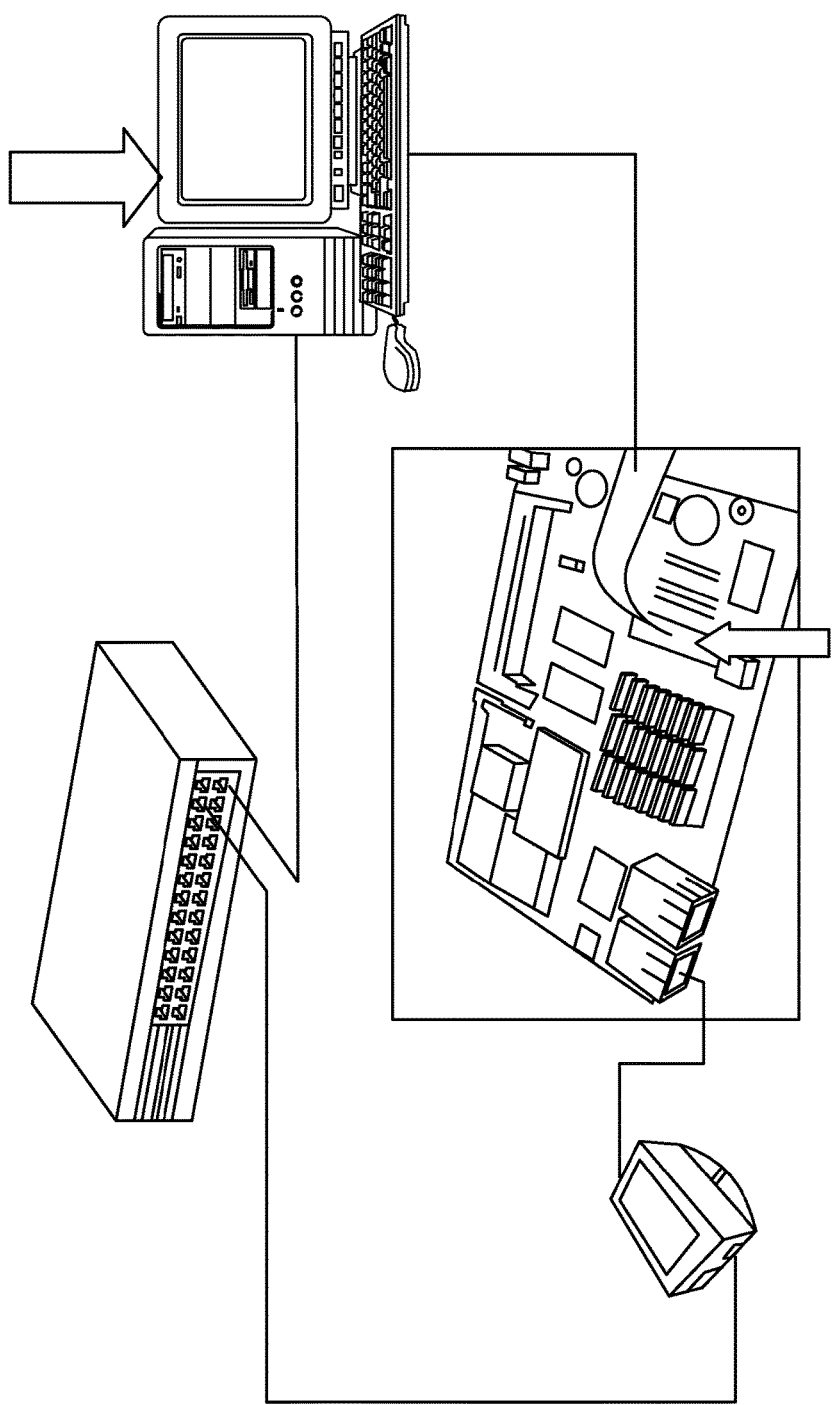

FIG. 18 depicts how the installation software is tagged to both the radios and board characteristics. It shows a serial line connected to load the boot loader program, after which the Ethernet port is used to complete the software installation and branding process. Compiling the install program on the board it is intended to run on performs this function, thus creating a unique software image.

Figure 19:
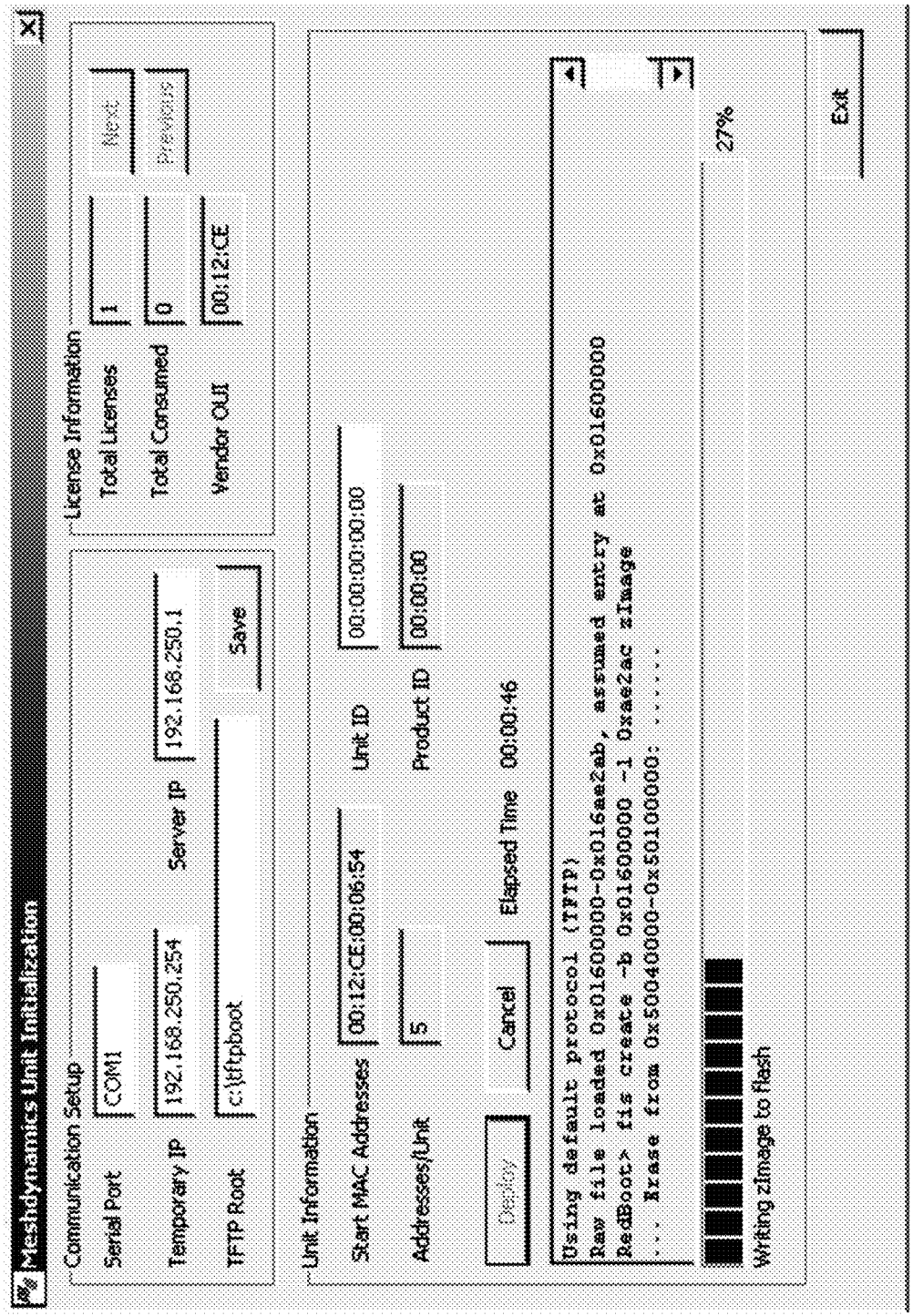

FIG. 19 is a view of the flash deployment software developed and implemented to ensure that software generated for the install of this board cannot be used by another mesh node. When the software installation process begins, the software is compiled on the board it is intended for and the compilation process is unique since it is based on a number of unique factors. The software is generated on the board that it is intended to run on—to ensure that the software image cannot be used to run on another board, thus preventing both software privacy and dissuading theft of the mesh nodes.

Figure 20:
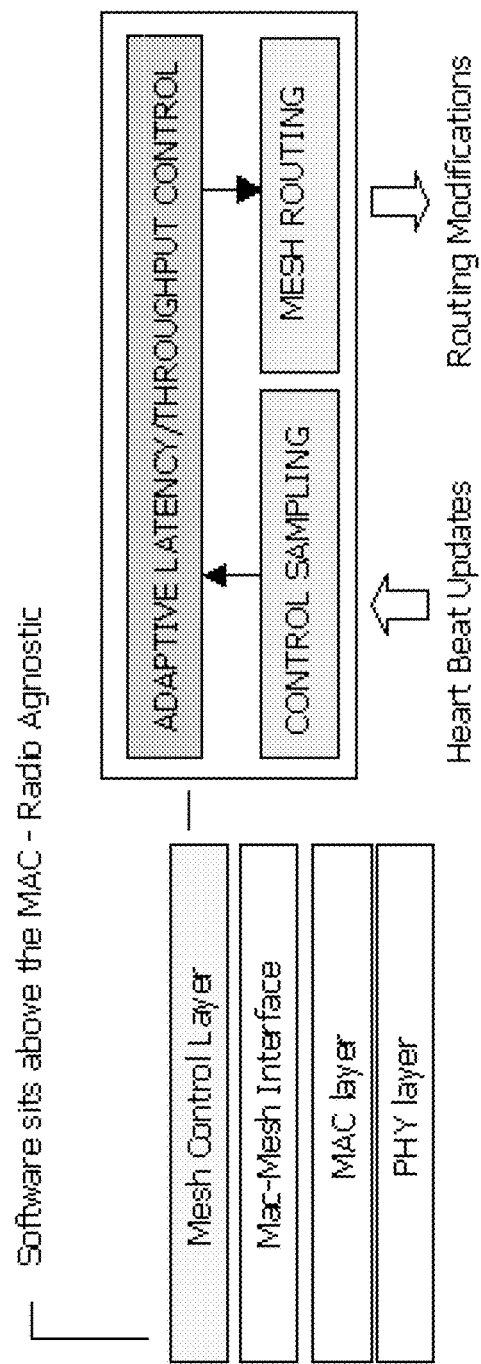

FIG. 20 shows that the Mesh Control Software sits above the Media Access Control (MAC) of the radio. As such it is radio and protocol agnostic, in one embodiment.

Figure 21:
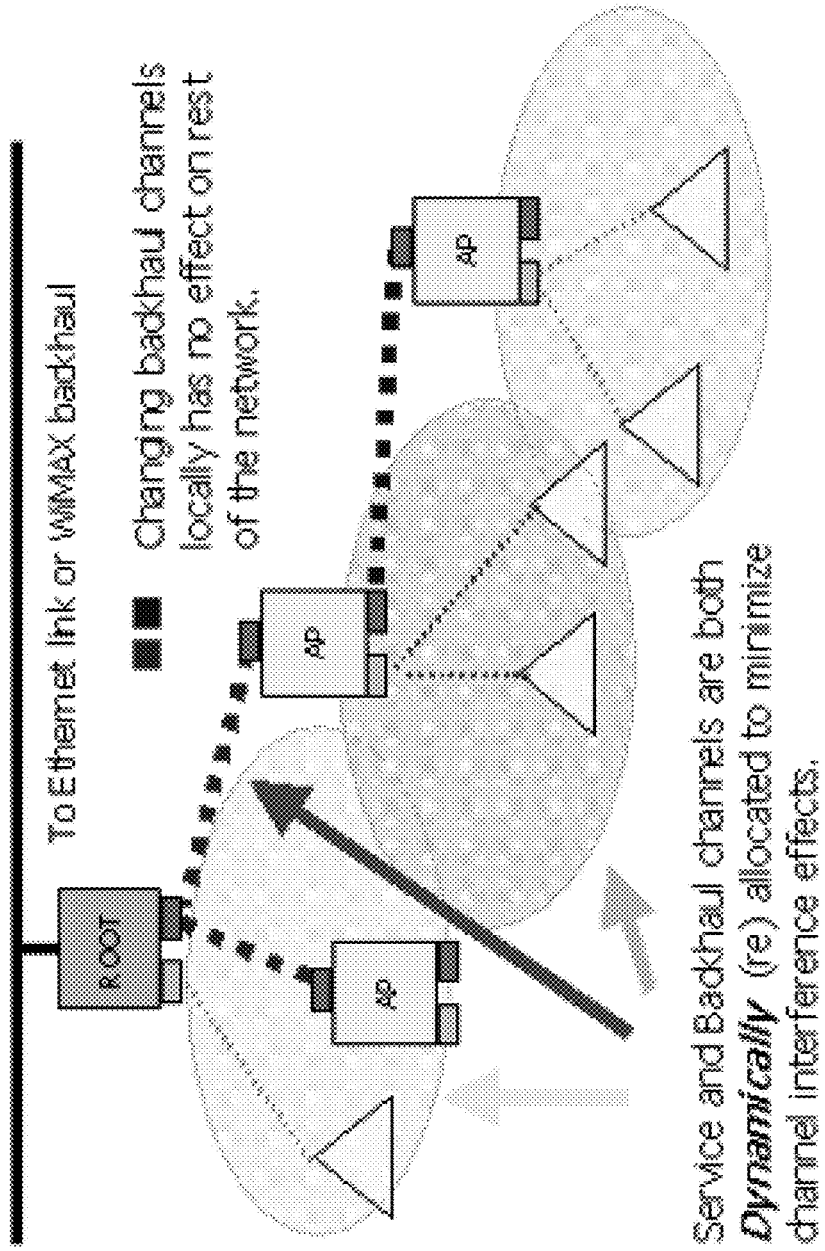

FIG. 21 shows how channel interference is dynamically managed in the logical two-radio system.

Figure 22:
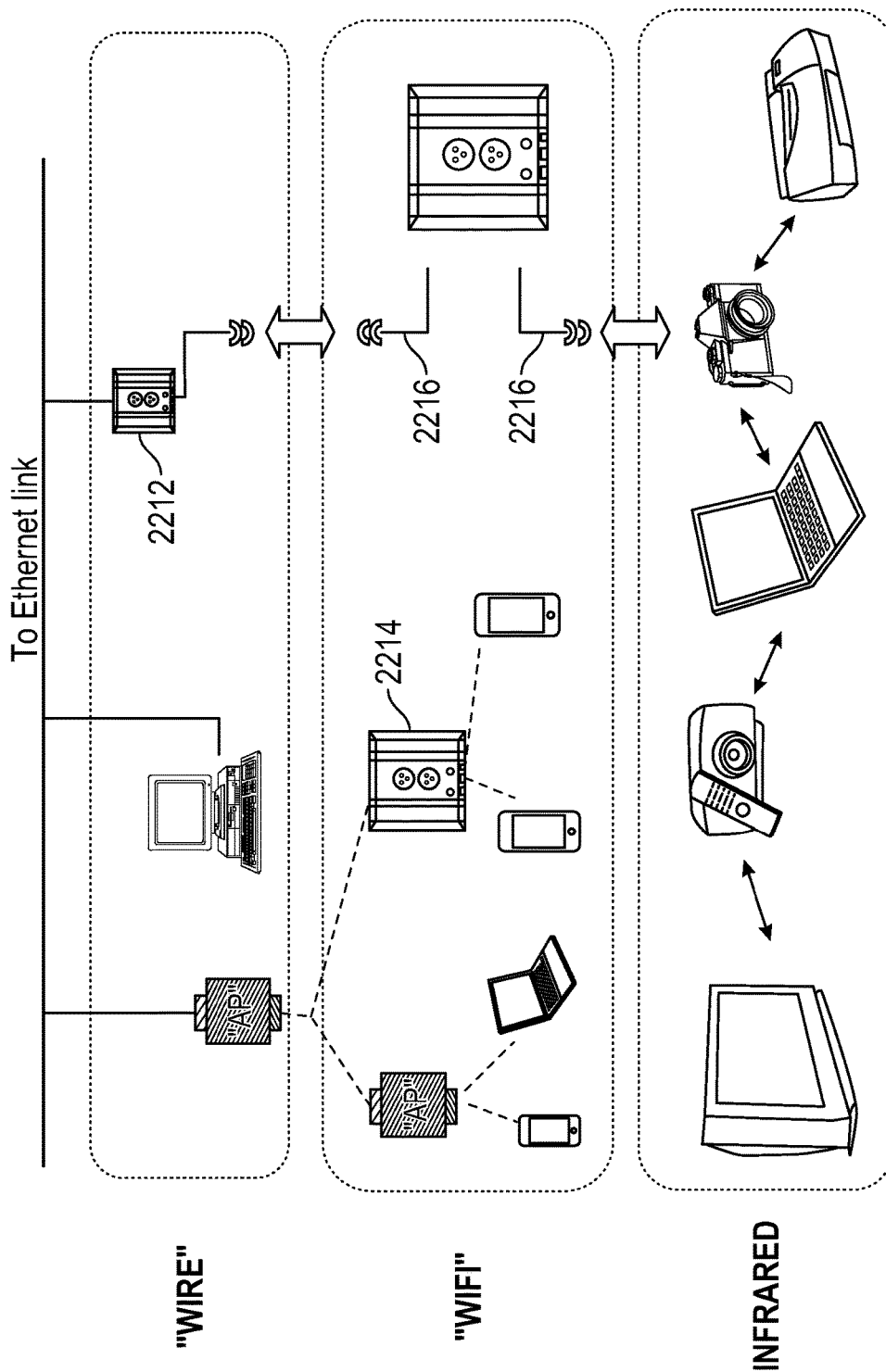
Figure 23:
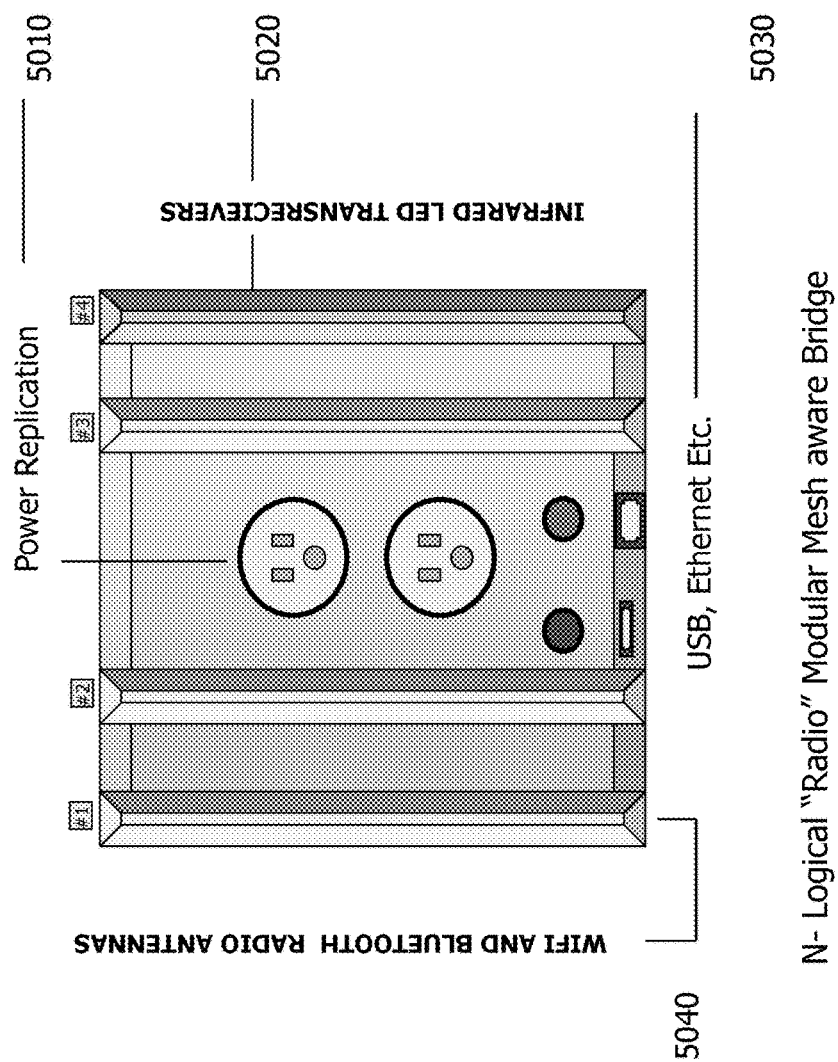

FIGS. 22 and 23 introduce an embodiment bridging across diverse wireless medium using the example of an N-Logical wireless medium bridge, referred to as the "nightlight." In one embodiment, the nightlight serves as both range extender and intermediary between device "chirps" and more conventional, IP based, communication devices and protocols.

Figure 24:
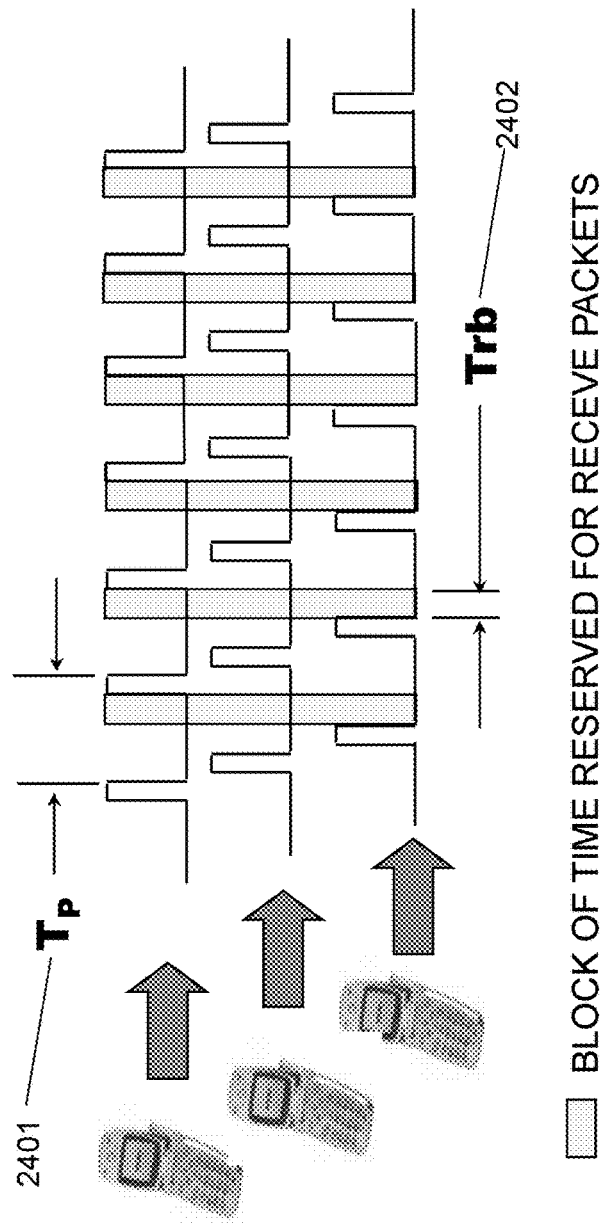

FIG. 24 shows the synchronization of multiple voice devices accessing the same wireless medium with a focus on the time for bulk receipt of packets that are shared among the separate devices.

Figure 25:
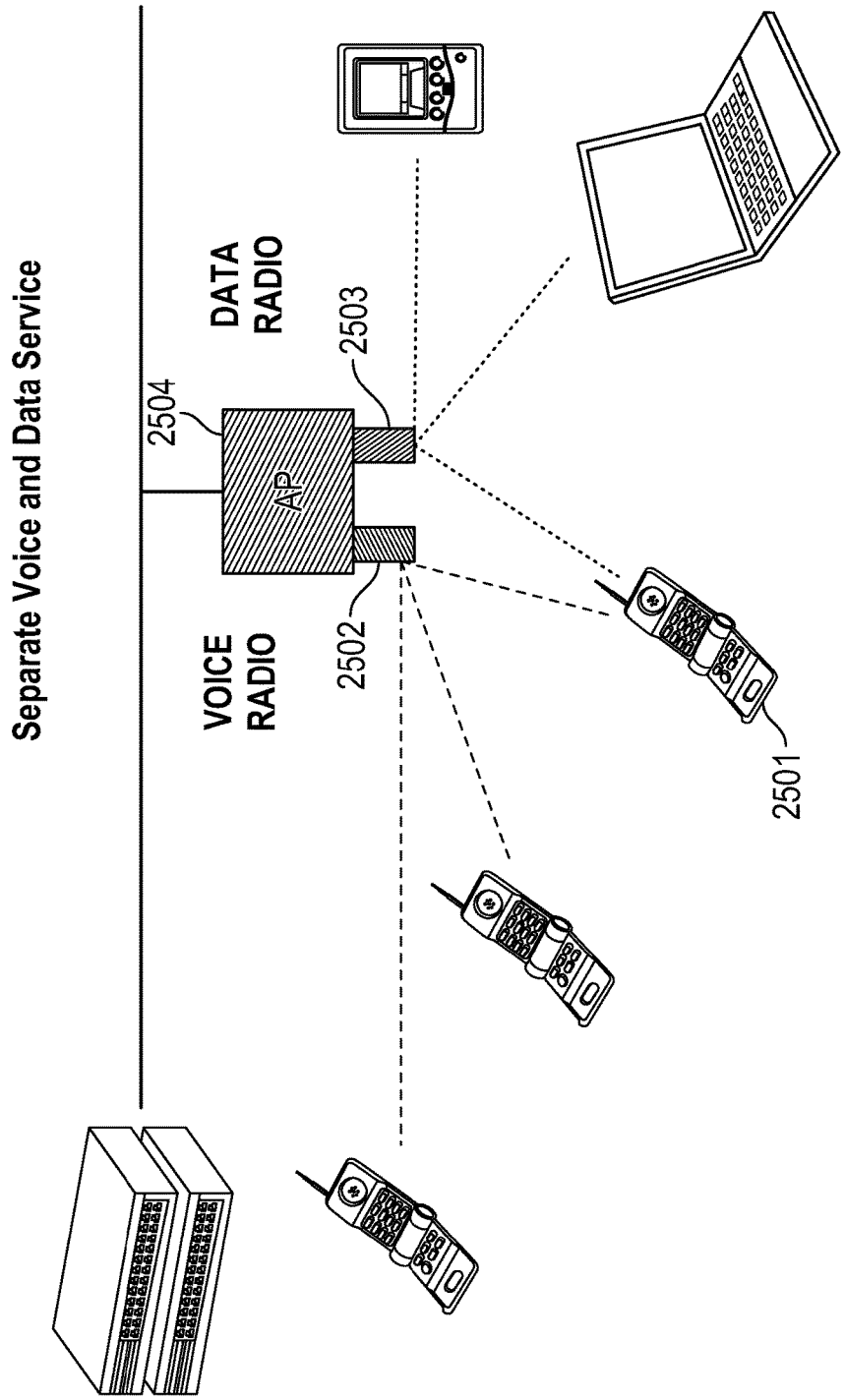

FIG. 25 shows a voice device talking to a dedicated voice radio and data devices taking to a data radio, with one phone 2501, capable of taking to both 2502 and 2503 in one embodiment. The night light embodiment 2504 manages both voice and data transceivers, in the depicted embodiment.

Figure 26:
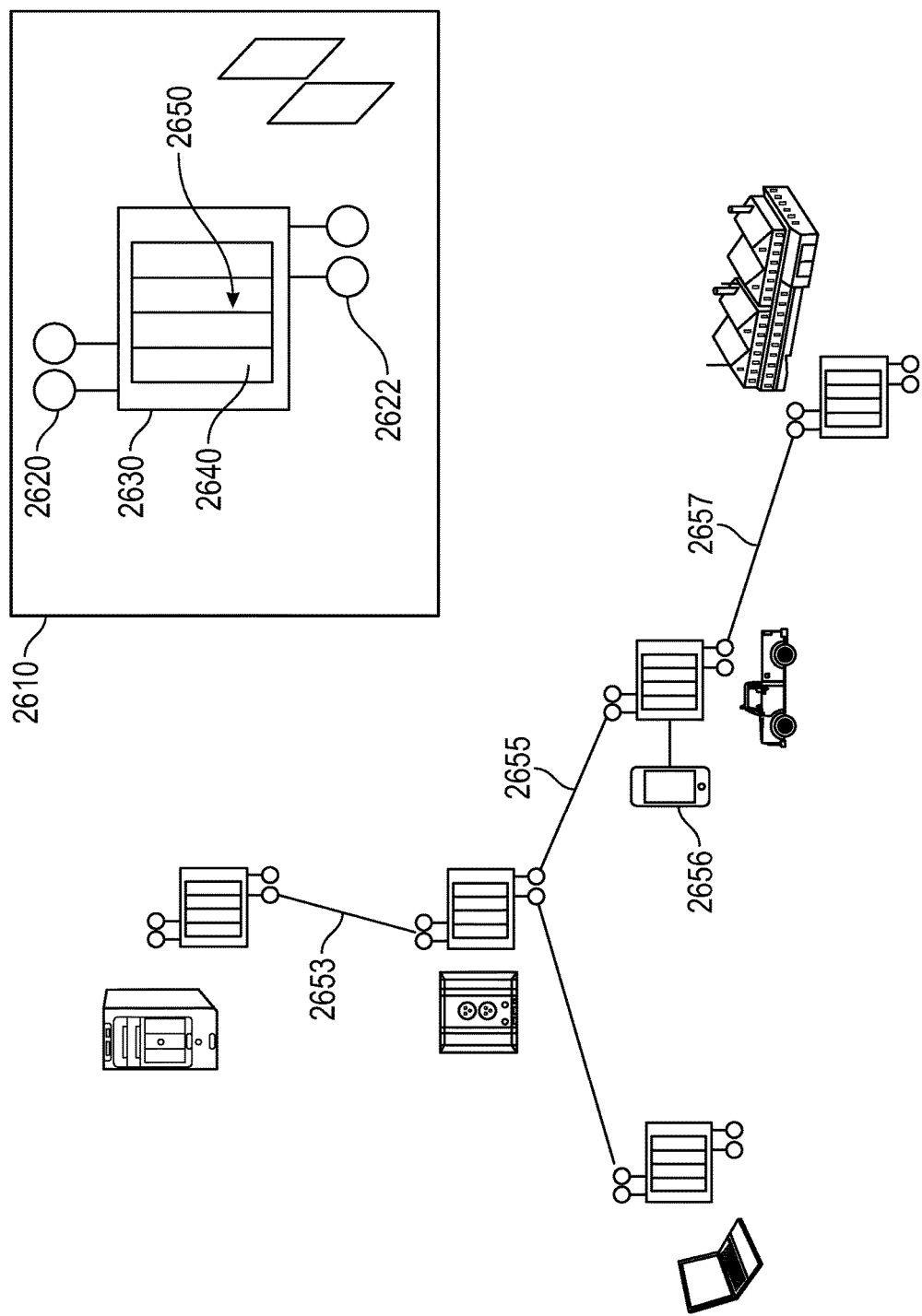
Figure 65:
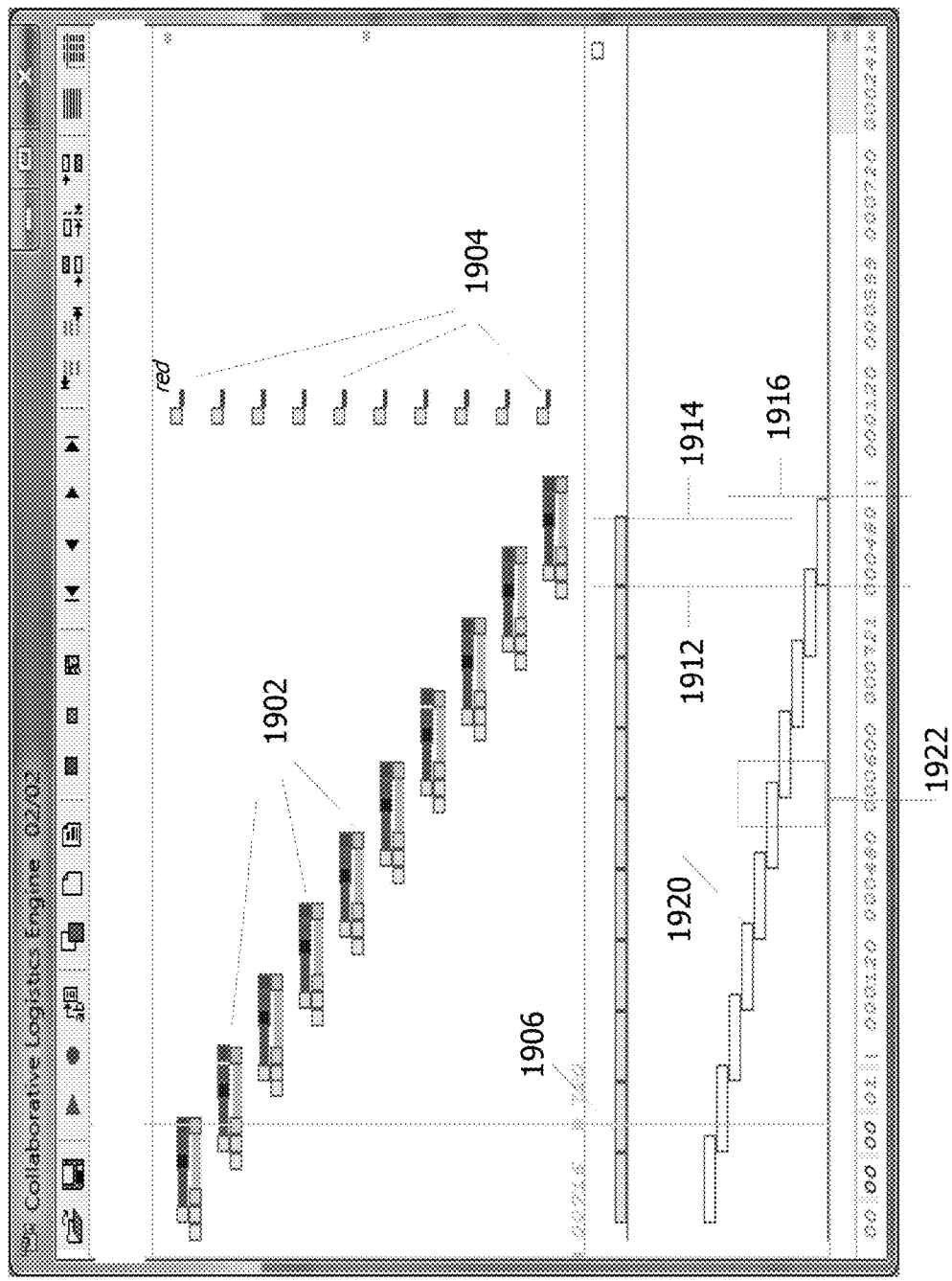
Figure 66:
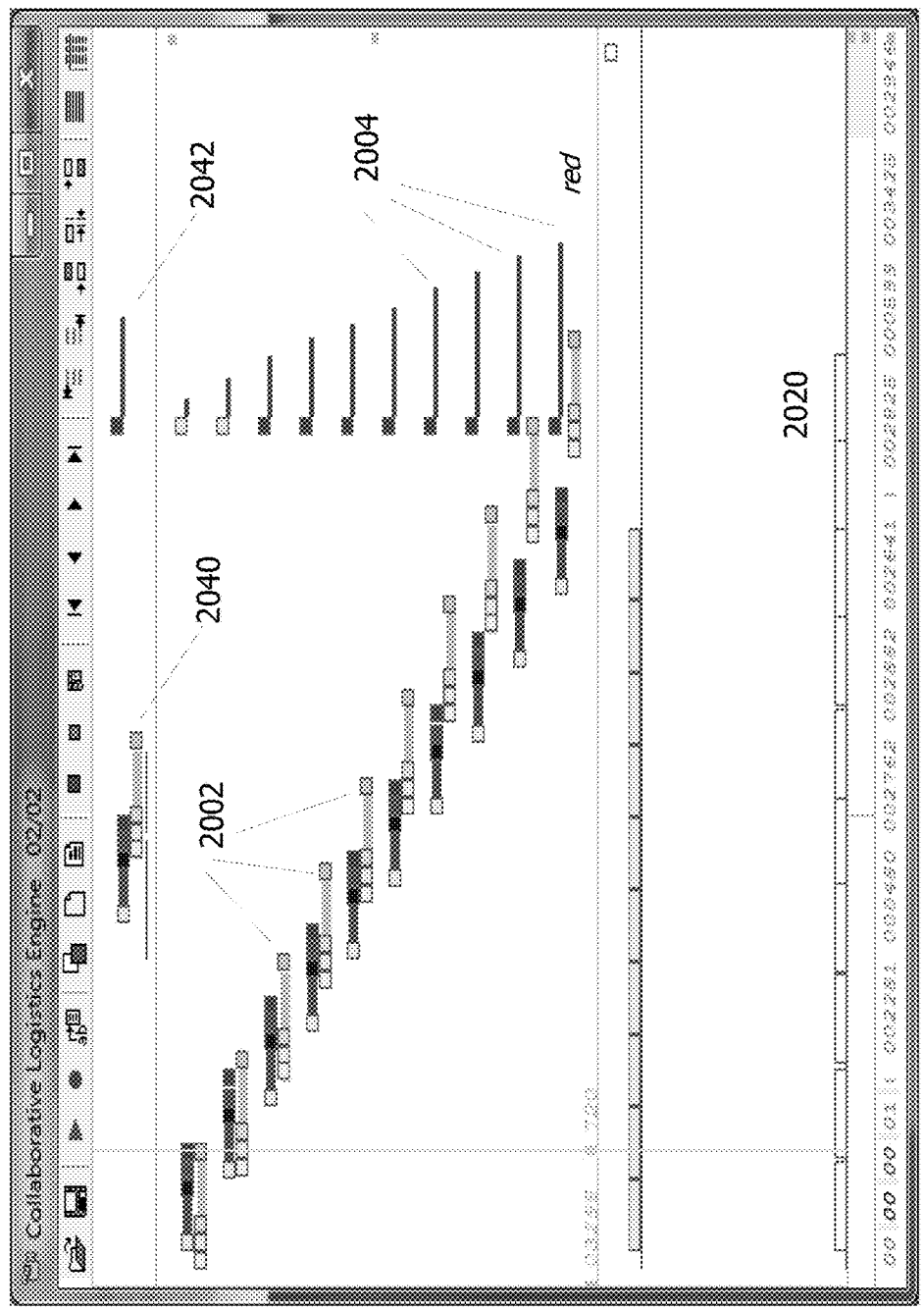
Figure 67:
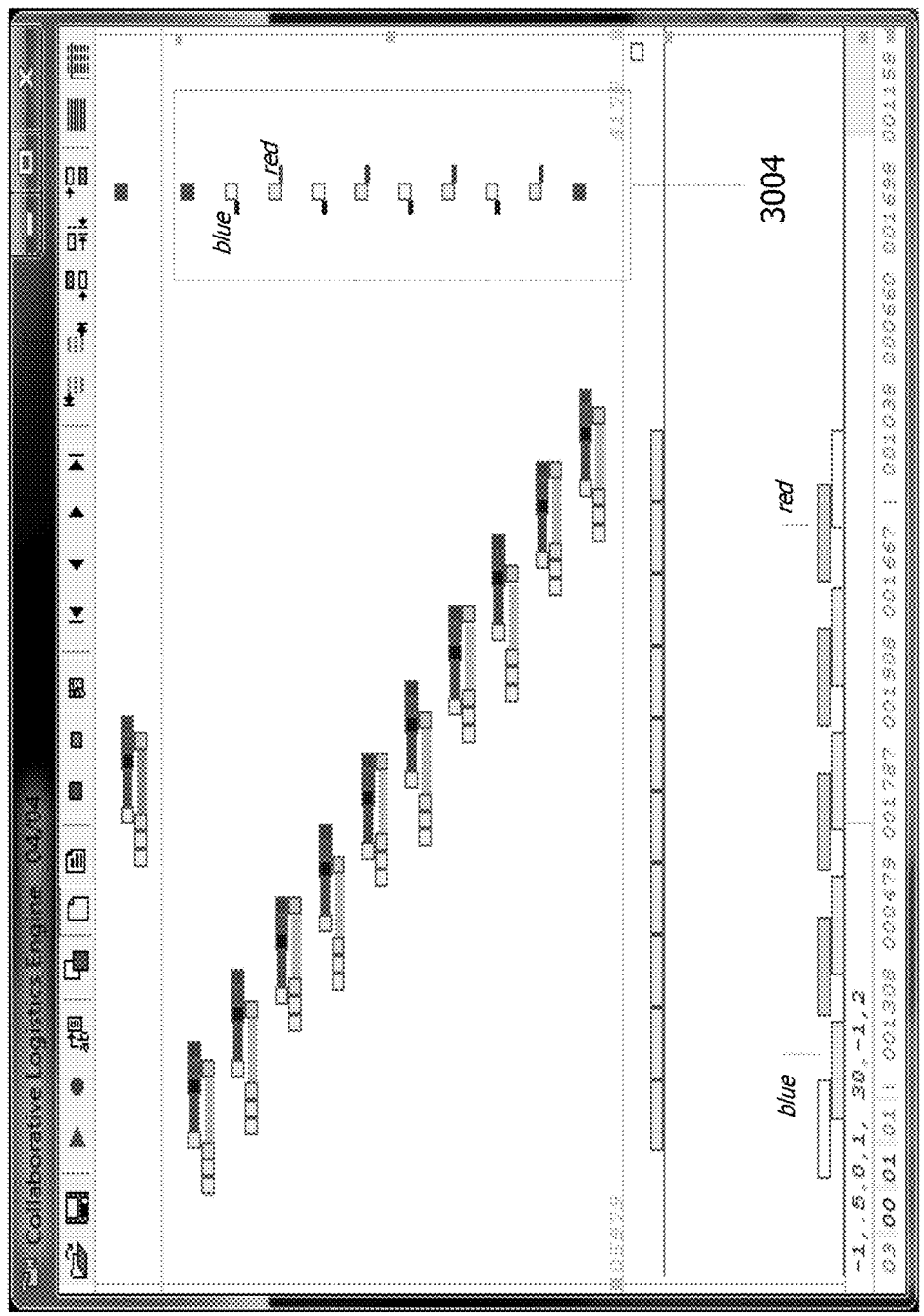

FIG. 26 depicts the dynamic collaboration tree for an exemplary supply chain application, where routers support modular U,D,S,A functionalities and messaging is driven by collaborative scheduling, as detailed in FIGS. 65, 66, 67.

Figure 27:
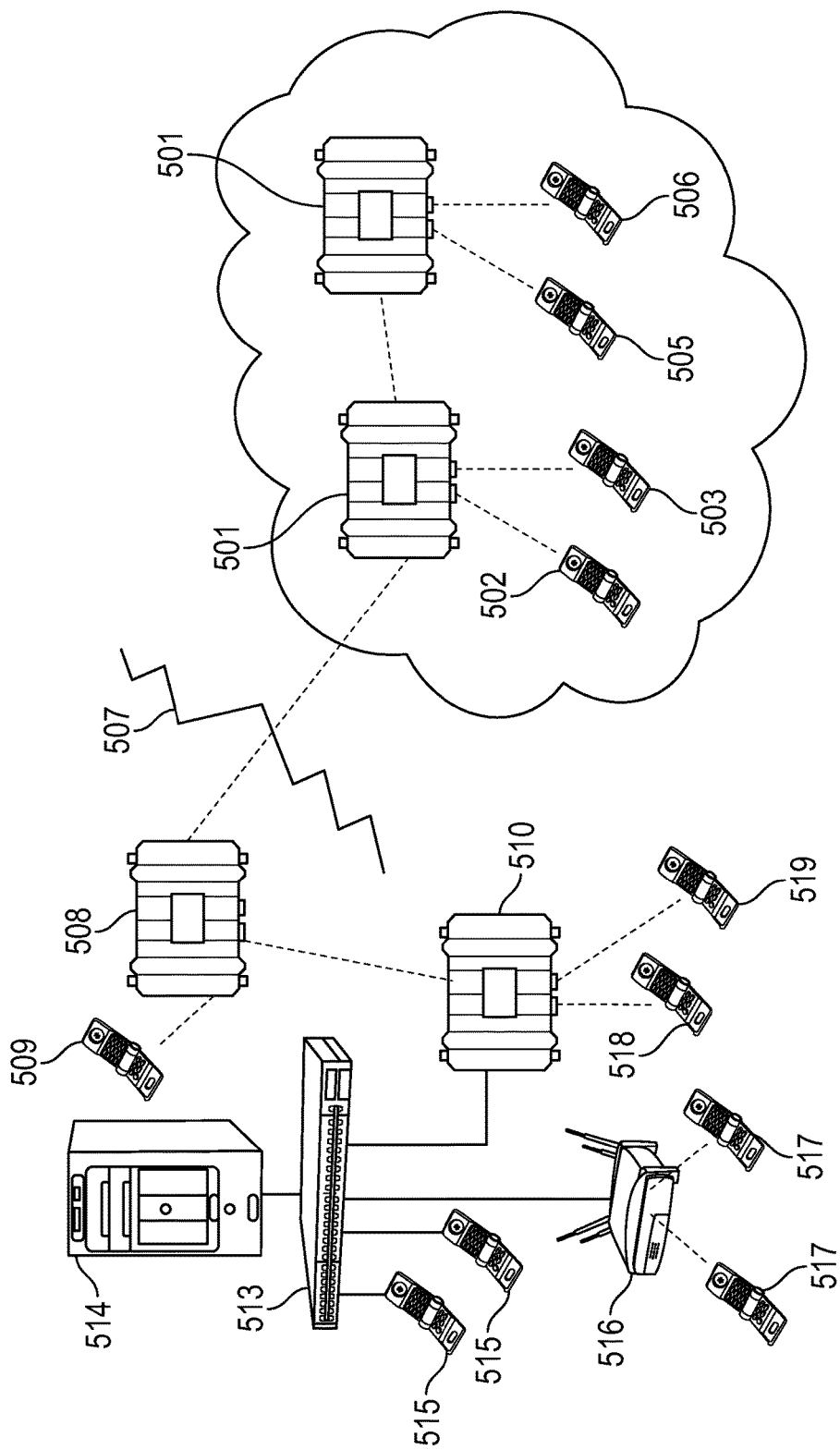

FIG. 27 shows an isolated mobile network cluster and communication within it using VOIP phones.

Figure 28:
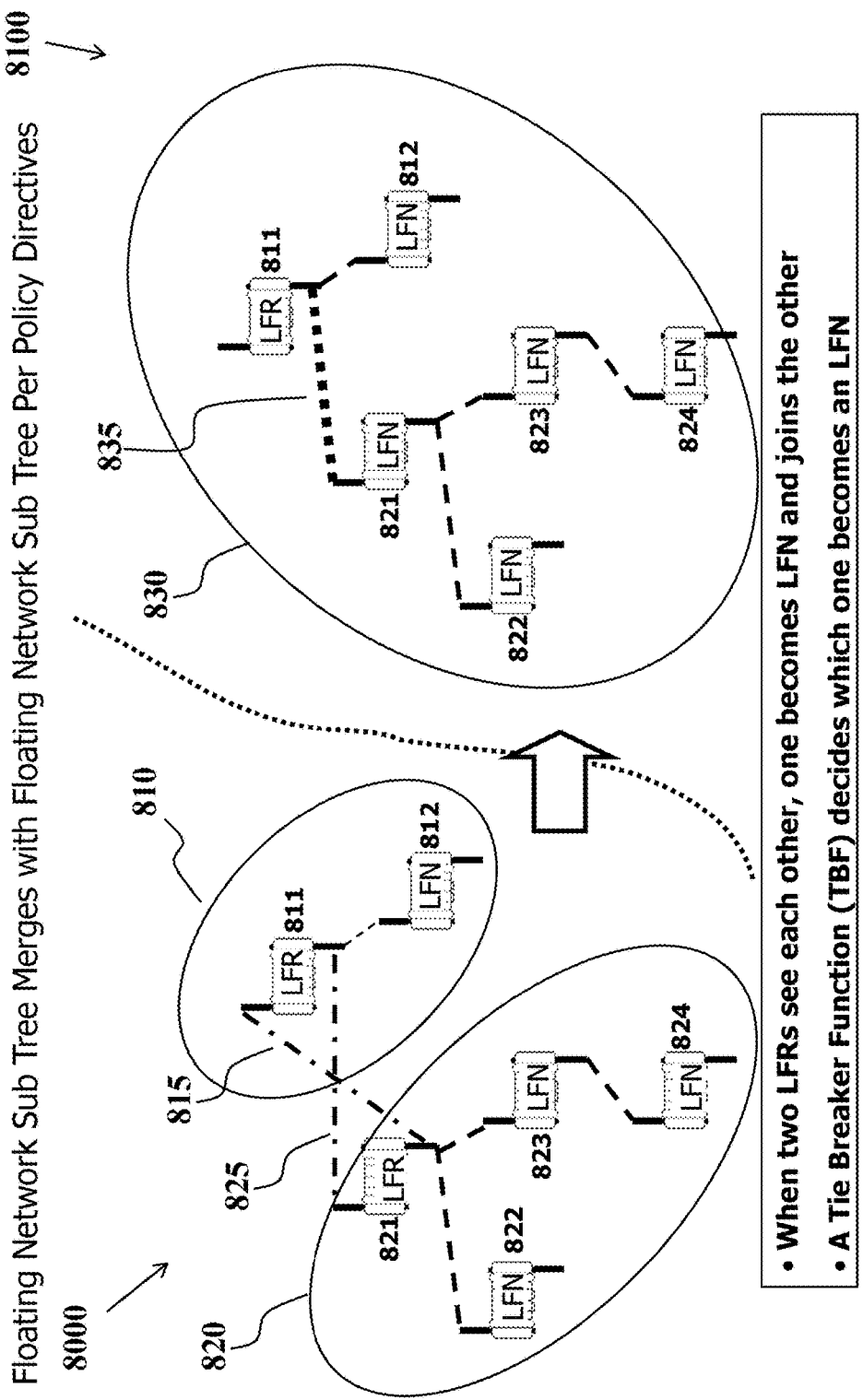

FIGS. 28 and 29 describe an embodiment wherein isolated network clusters may converge with distributed DHCP services and inherent conflict resolution using randomized sub net address ranges.

Figure 30:
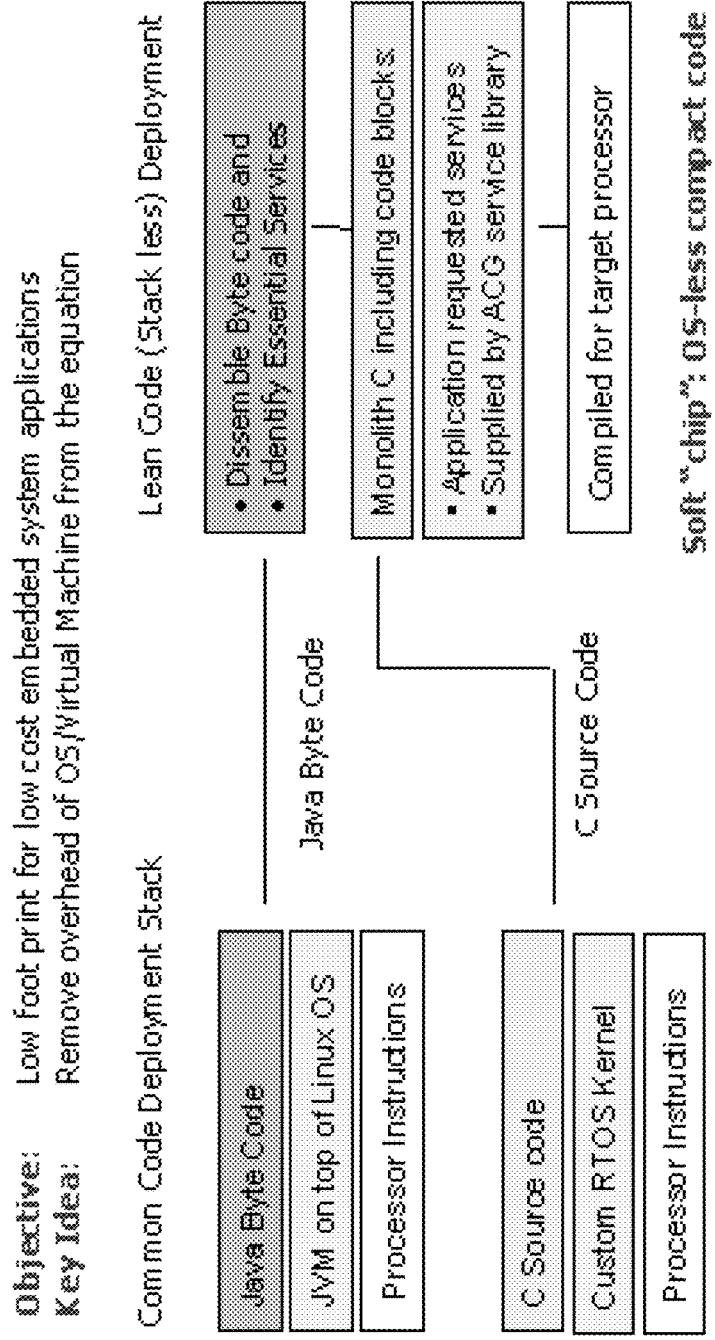
Figure 31:
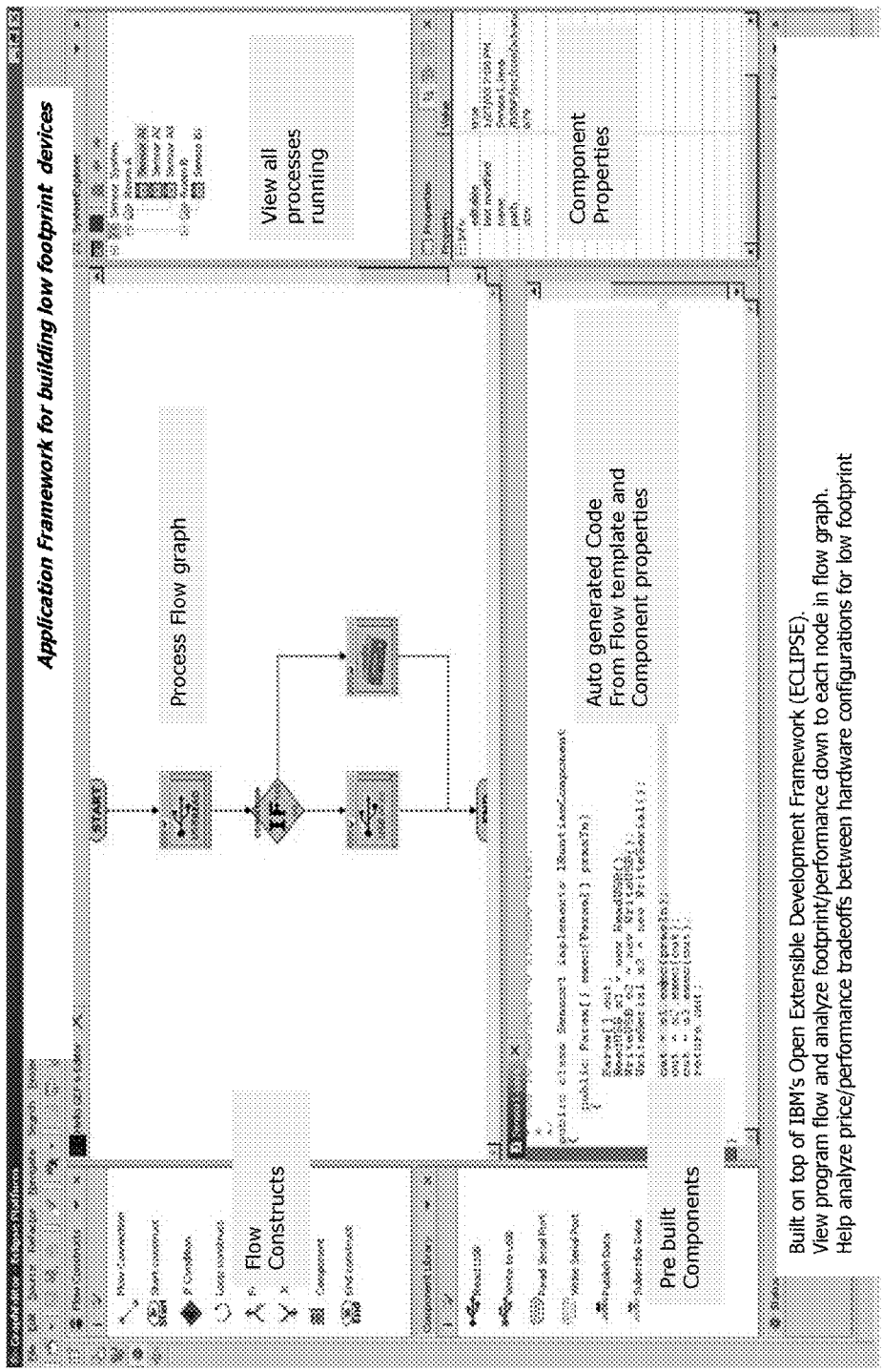

FIGS. 30 and 31 depict the process of generating an OS-independent image for secure small footprint devices and an exemplary graphical programming environment for simple sensory devices, in one embodiment.

Figure 32:
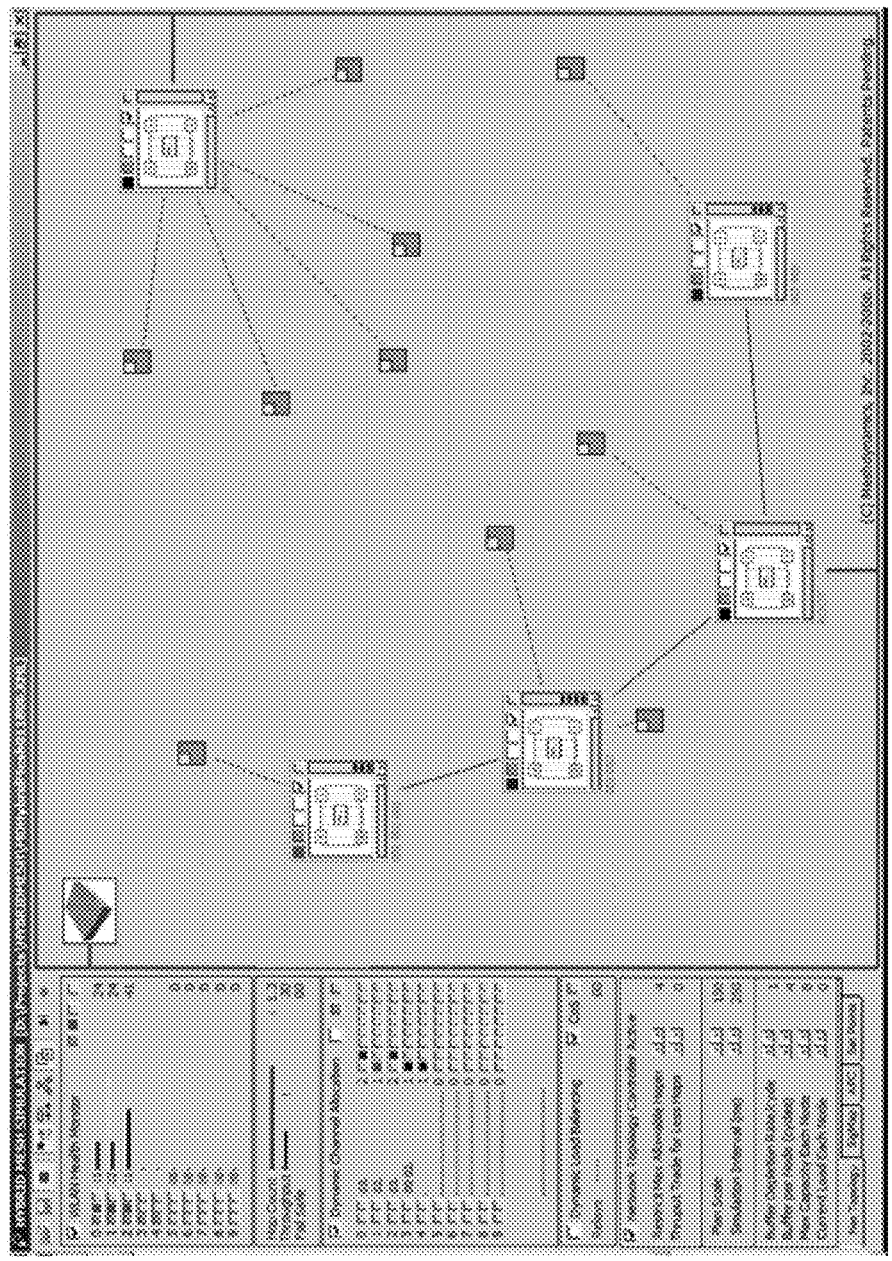
Figure 33:
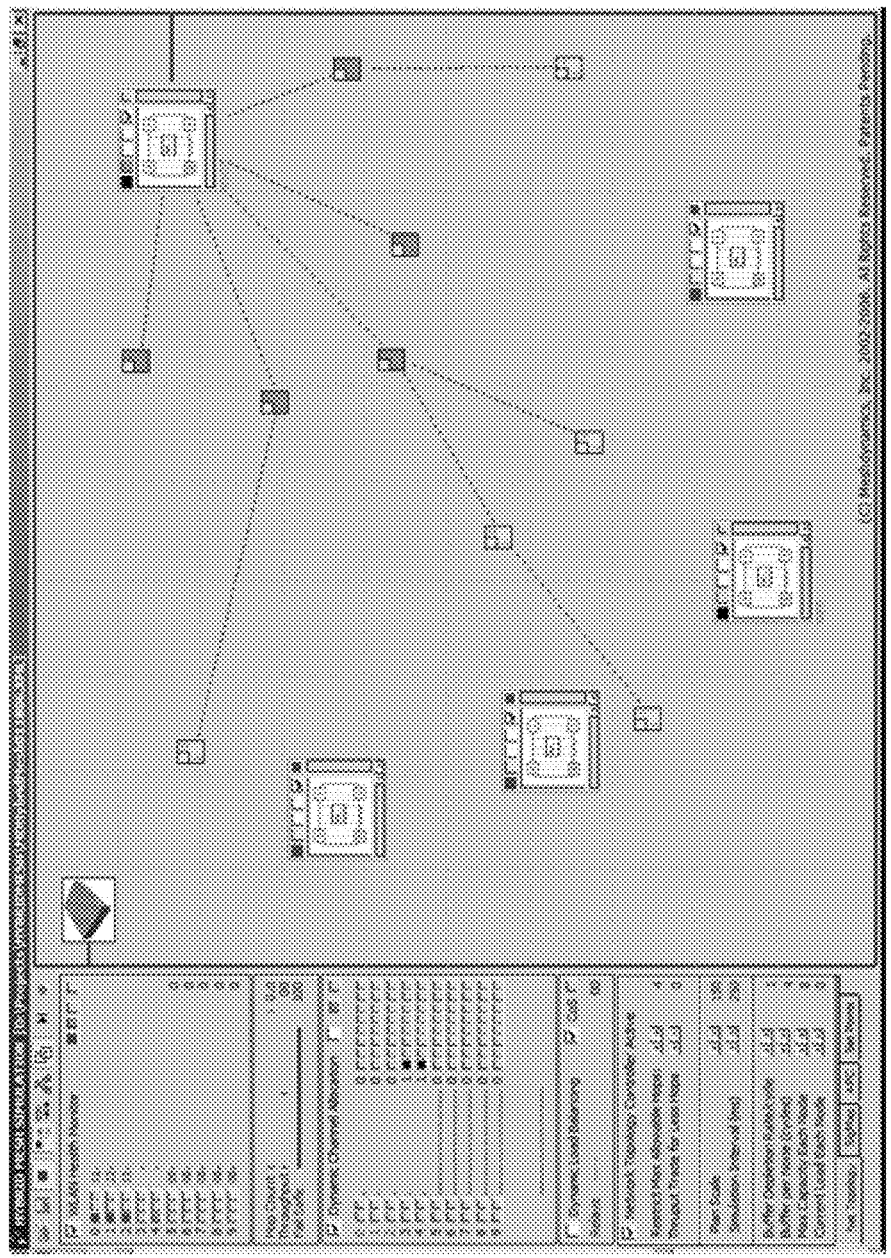

FIGS. 32 and 33 depict device repeaters and range extenders. Conceptually these devices are similar to clients, such as the soldiers in the battle force embodiment shown in FIG. 15. The range extenders provide blind repeating and therefore range extension for remote devices. They also serve as a redundant path, similar to FIG. 13 but employing a single physical radio. Thus, in chirp language, they are birds that repeat and relay a bird song in string of pearl configurations.

Figure 34:
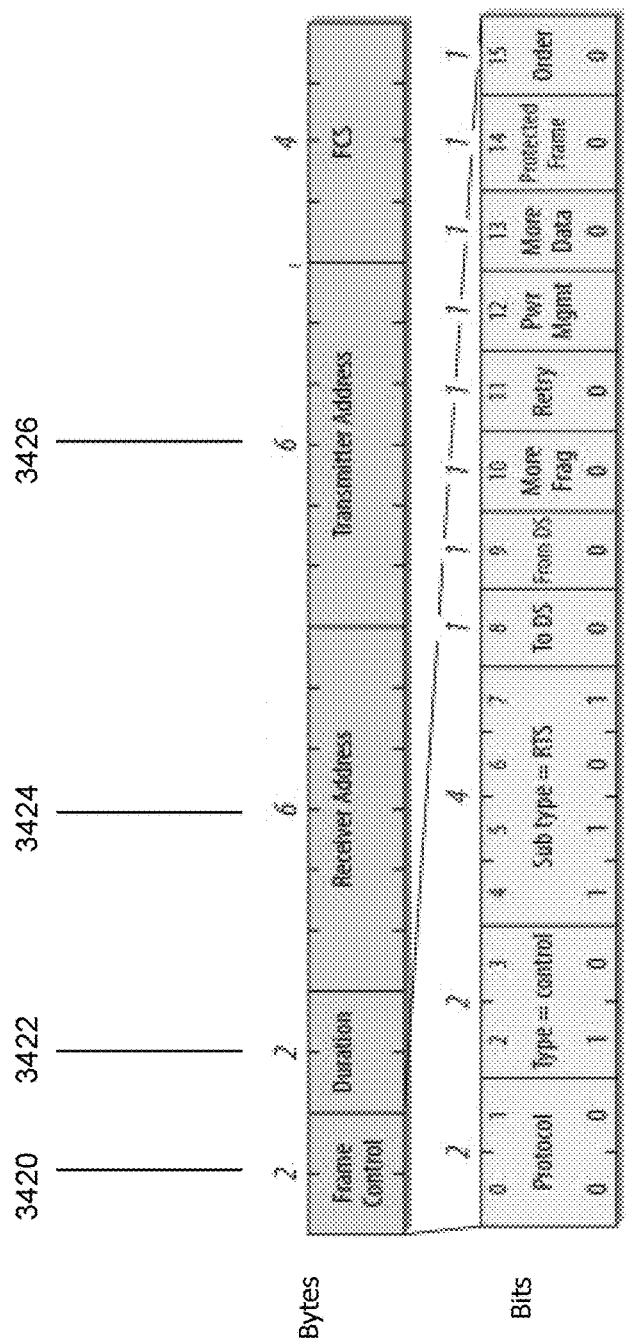
Figure 35:
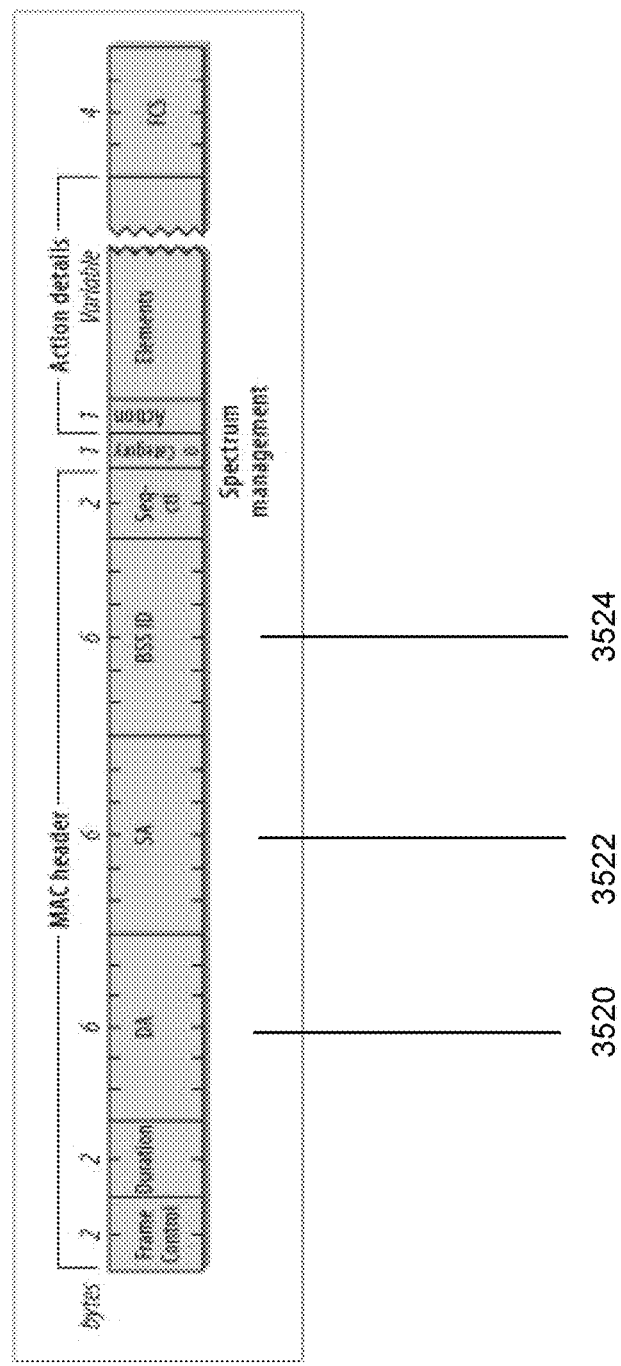
Figure 36:
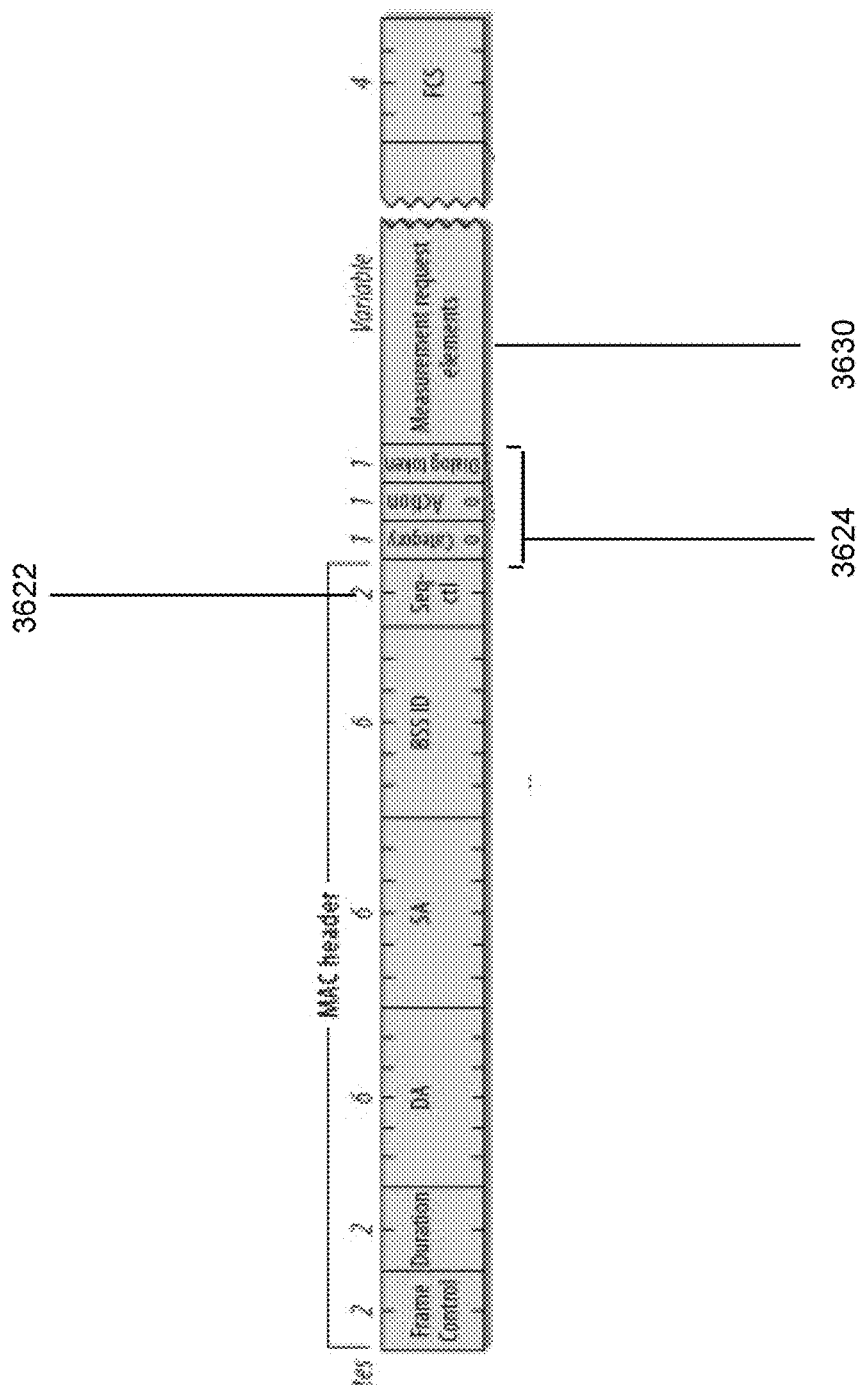

FIGS. 34 through 36 depict representative IP based "light" or low payload packets that may be used to transport chirp data over an IP based network. 802.11 packets are used as examples. Chirp data is encapsulated in such packets for onward transmissions, in unicast, multicast or broadcast modes, in search of flower/agents/tunes/subscribers interested in the chirp/pollen. In one embodiment, chirp devices use such innocuous frames to transport payload—only chirp aware routers know how to recognize them as chirp packets and process their (secure) routing to appropriate agents accordingly.

Figure 4:
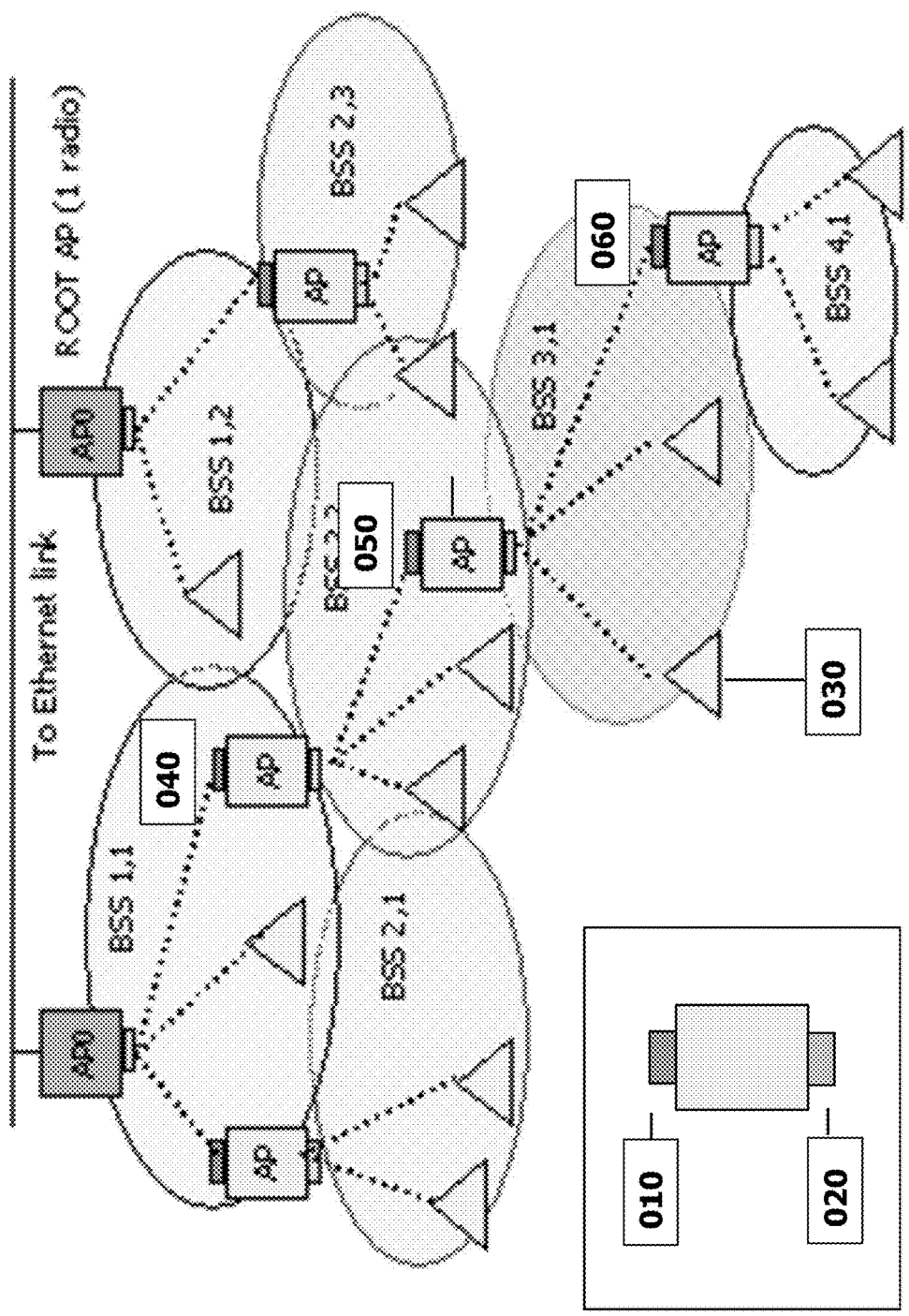
FIG. 4 shows how the structure of two-radio multiple hop mesh network where each two radio unit services a Basic Service Set (BSS) by configuring one of the two radios to serve as an AP to its clients. Clients may include the second radio of another two radio system, with this radio configured to run in station mode, providing the backhaul path back to the Ethernet link. In the insert, the uplink radio (labeled 010) connects to the parent mesh node while the downlink radio (labeled 020) acts like an Access Point to client radios, including other mesh nodes that connect to it through their uplink radio. Note that all service radios (020) operate on different non-interfering channels, depicted by different color ovals.
Figure 38:
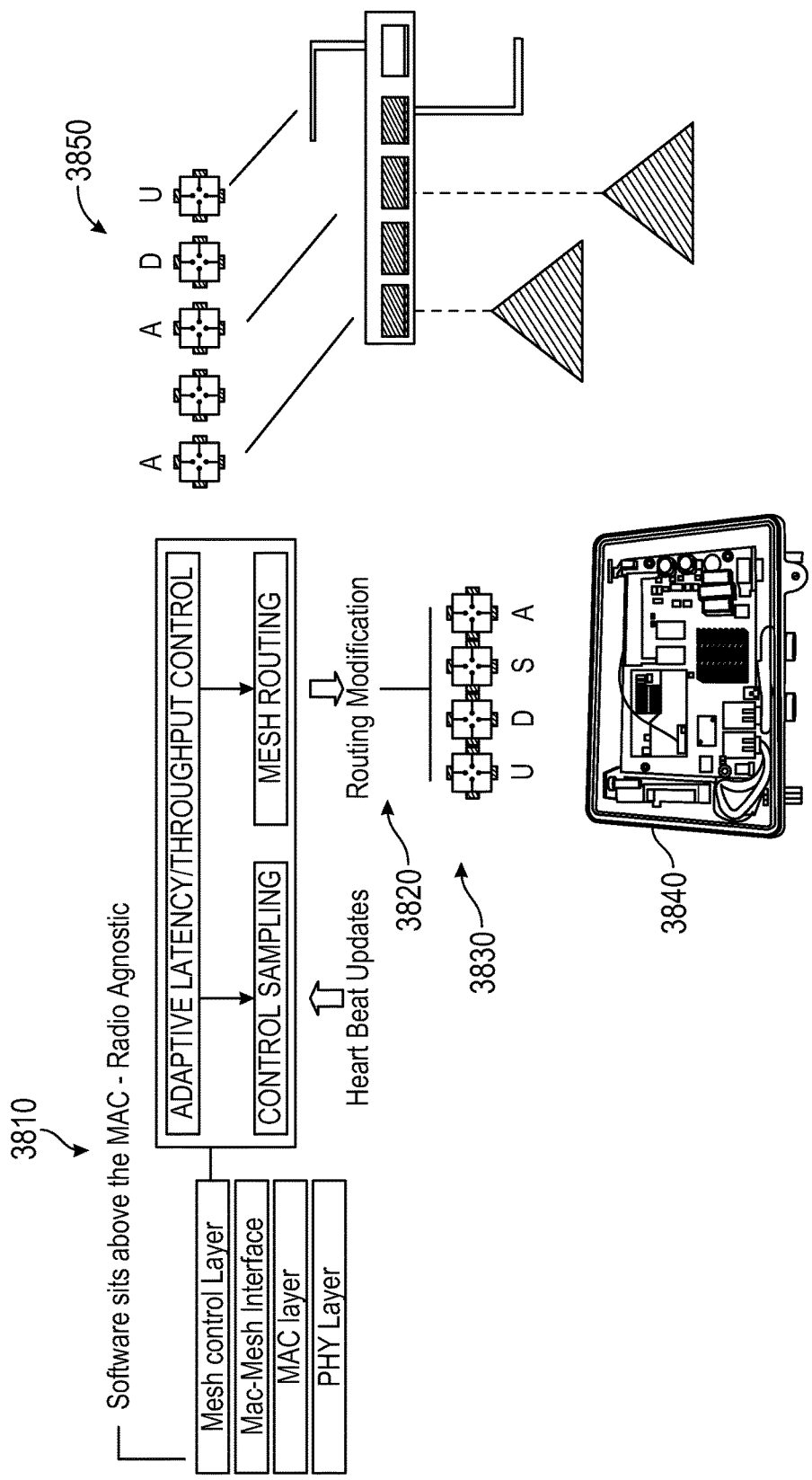

FIGS. 37 through 38 map the equivalent slots/ports of wired and wireless switch equivalents as shown in FIGS. 4 and 5.

Figure 39:
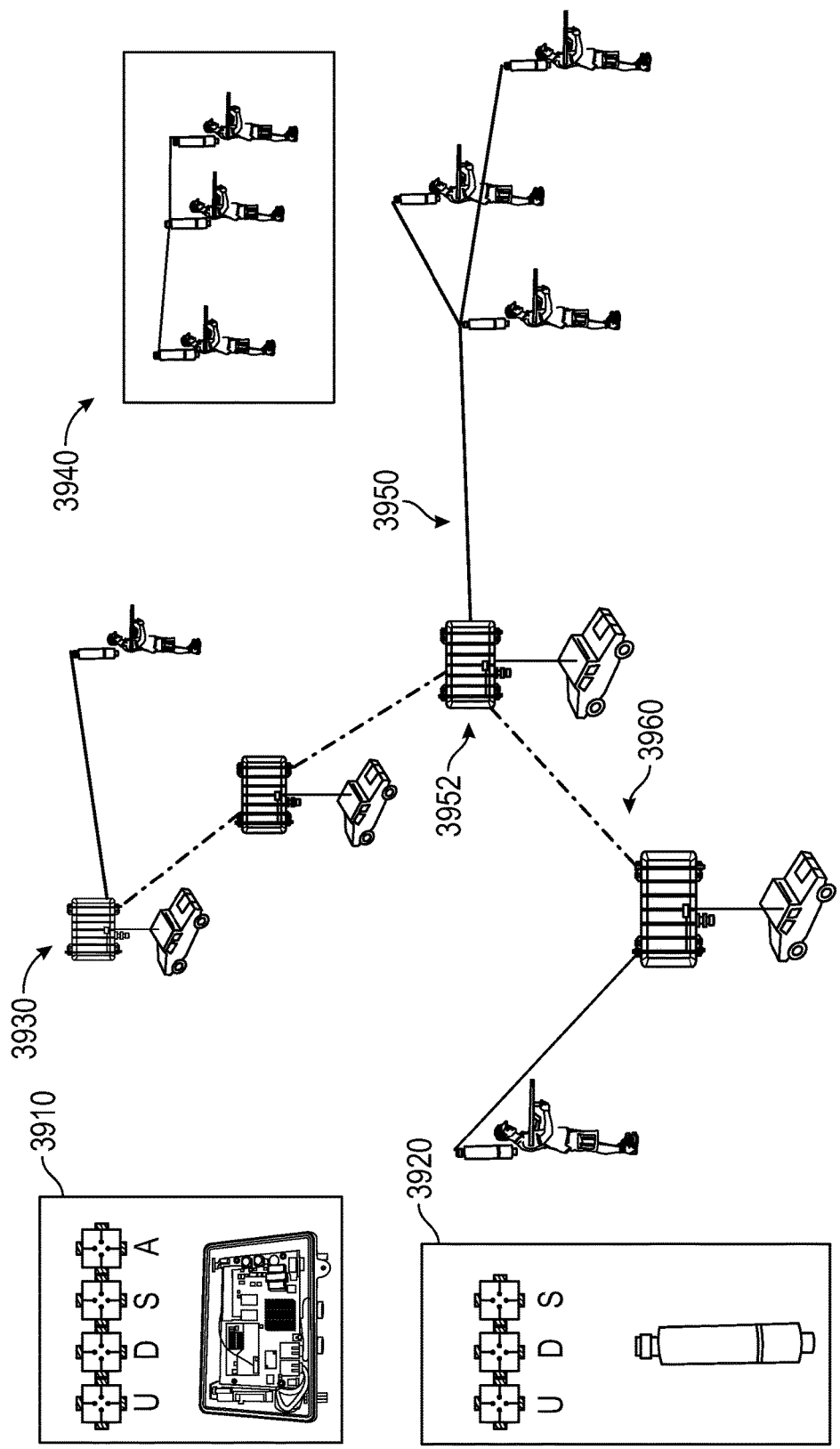

FIG. 39 shows how logical radio modes, Uplink (U), Downlink (D), Scanner (S), Access Point for Service (A) map to physical transceivers in single radio and multi radio mesh node embodiments. The joining of tree branches 3950 to tree trunks 3960 is aided by common routers 3952.

Figure 40:
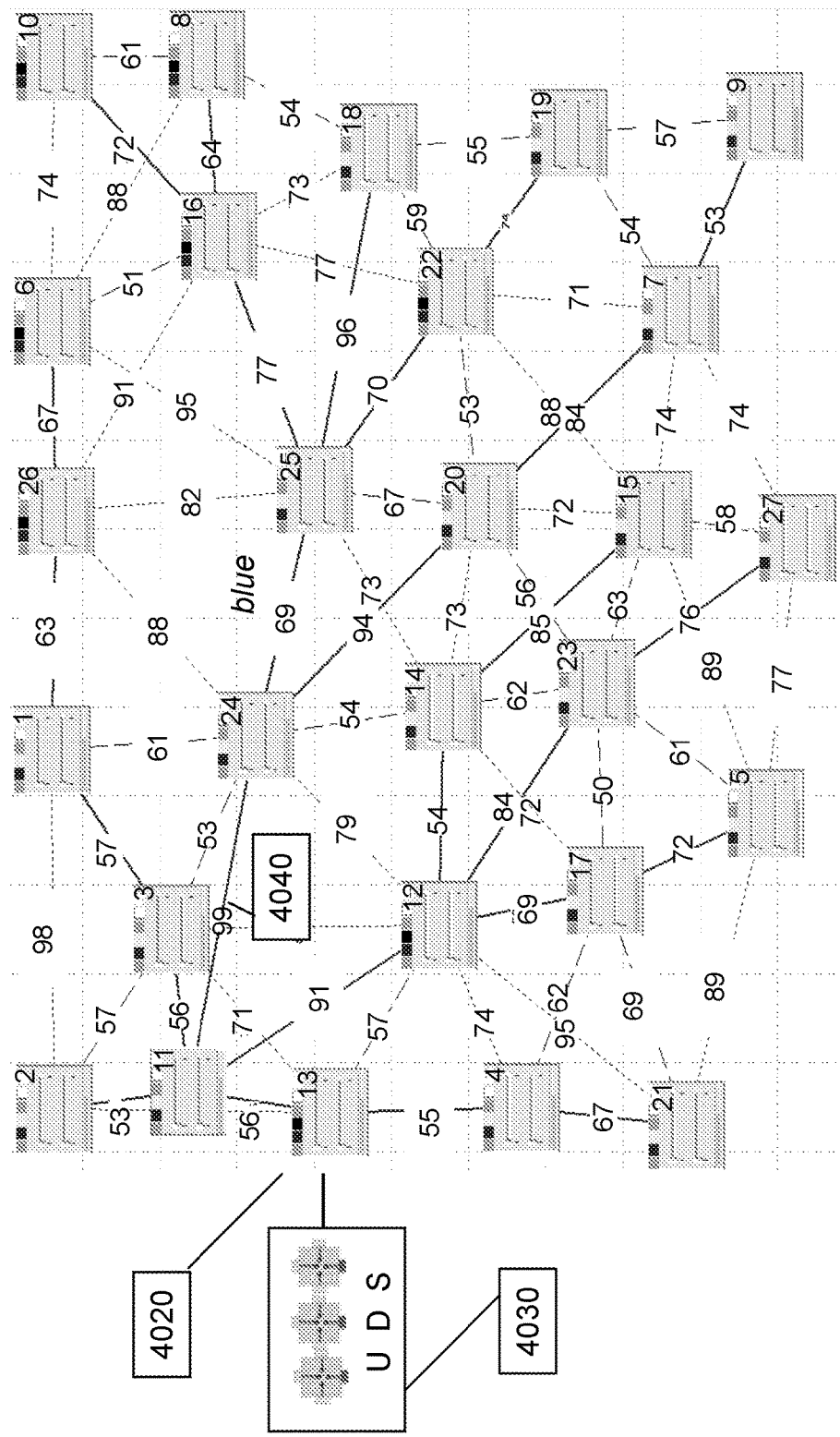

FIG. 40 is a simulation of a representative prior art mesh routing algorithm and its comparison to tree based routing of FIG. 4. The thicker blue lines in FIG. 40, 4040 denote the minimal spanning tree. Note the dashed lines have to be additionally recomputed for each node in prior art mesh routing. Performance deteriorates exponentially as O ($n^2$) where n is the number of mesh members.

Figure 41:
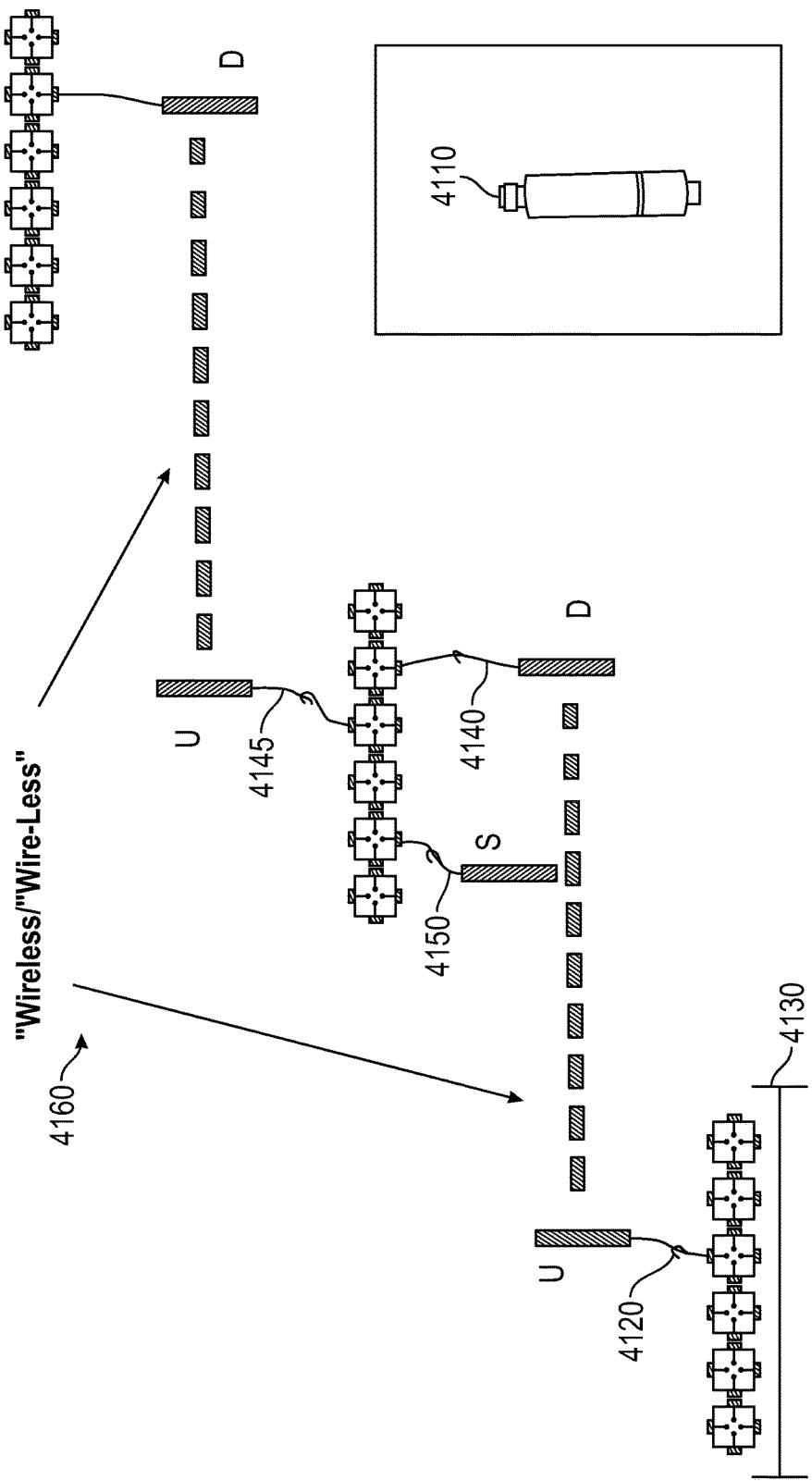
Figure 42:
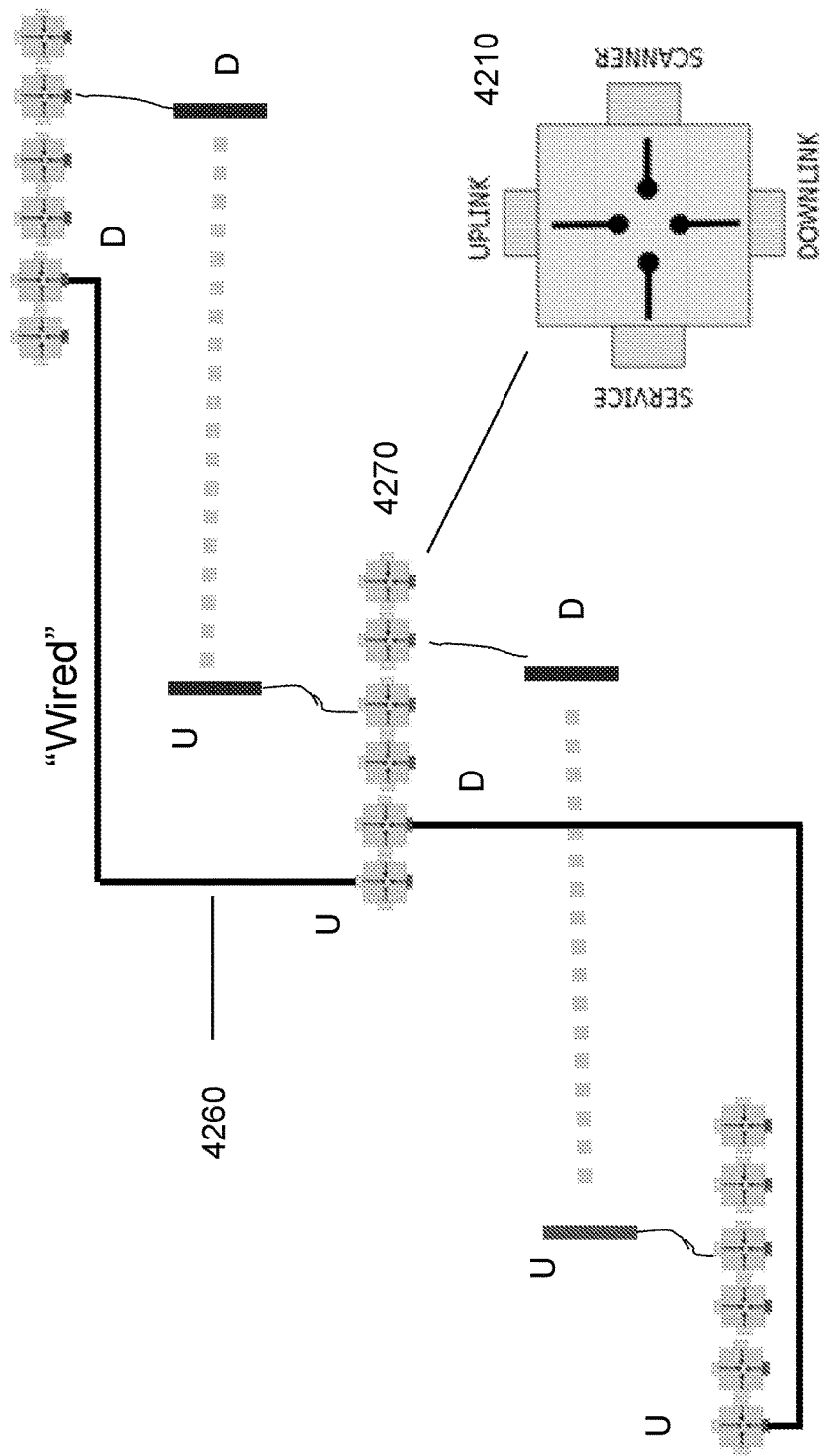

FIGS. 41 and 42 depict a switch equivalent of logical radios operating in both wired and wireless mediums/channels, using Logical Radios Uplink (U), Downlink (D), Scanner (S) and O(n) routing. The logical radio switching module (as an insert in one embodiment) is introduced.

Figure 43:
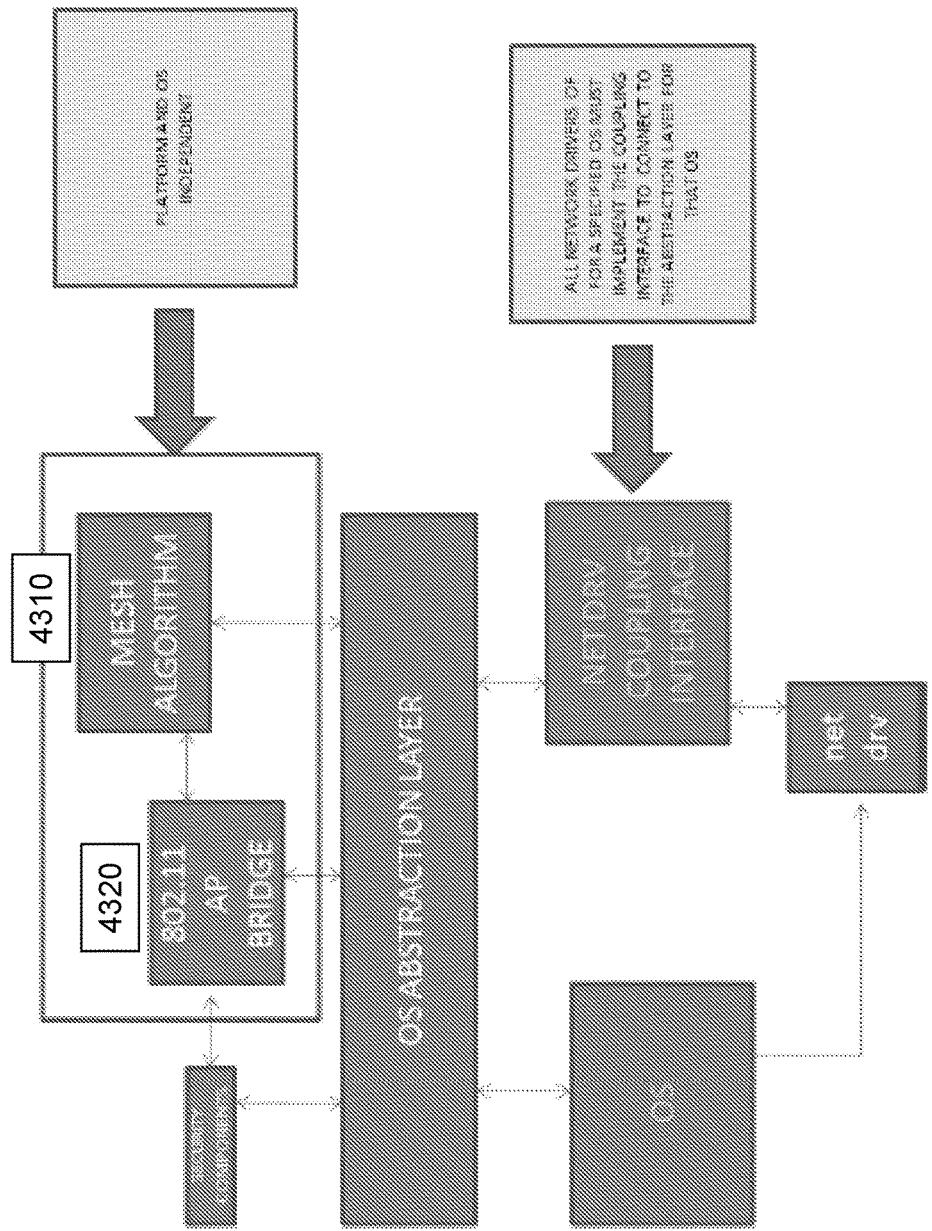

FIG. 43 is a schematic of how the abstraction layers for logical radios may themselves be combined to create more complex abstractions. Element 4320 refers to two abstractions AP (also in FIGS. 12, 17). The "bridge" is a combined logical radio abstraction, similar to the Uplink and Downlink (U+D) backhaul, but bridging over disparate frequencies and protocols.

FIG. 44 shows the bridging function (as described in FIG. 43). Mobile node 4455 switches from "blue" 5.8G backhaul to a "pink" 2.4G backhaul. The sub tree beginning with mobile node 4457 is thus operating on a non-interfering channel/frequency/protocol. The static counterpart is 4460.

Figure 45:
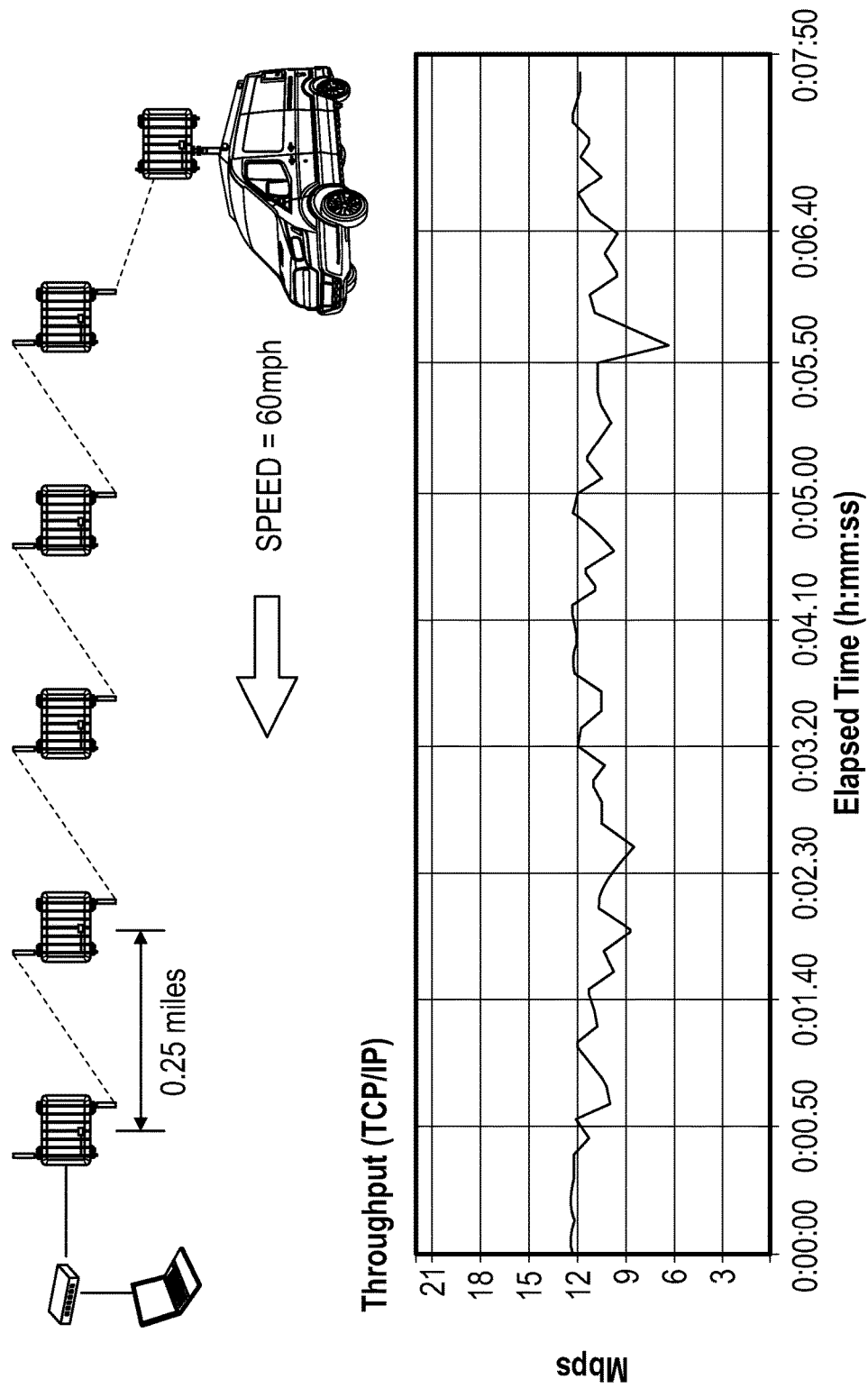

FIG. 45 depicts a "string of pearls" configuration of static mesh nodes. A mobile mesh node, traveling at 60 mph makes temporary connections with each node in the string. Switching from node to another is seamless and unbroken, as noted by the video output below. The process is repeated with single radios embodiments, using logical radios. Bandwidth degraded along the string of pearls, as expected, but video output was still jitter free and unbroken, due to proactive Scan Control, FIG. 12, Logical Radio abstractions and the benefits of O(n), tree based routing.

Figure 46:
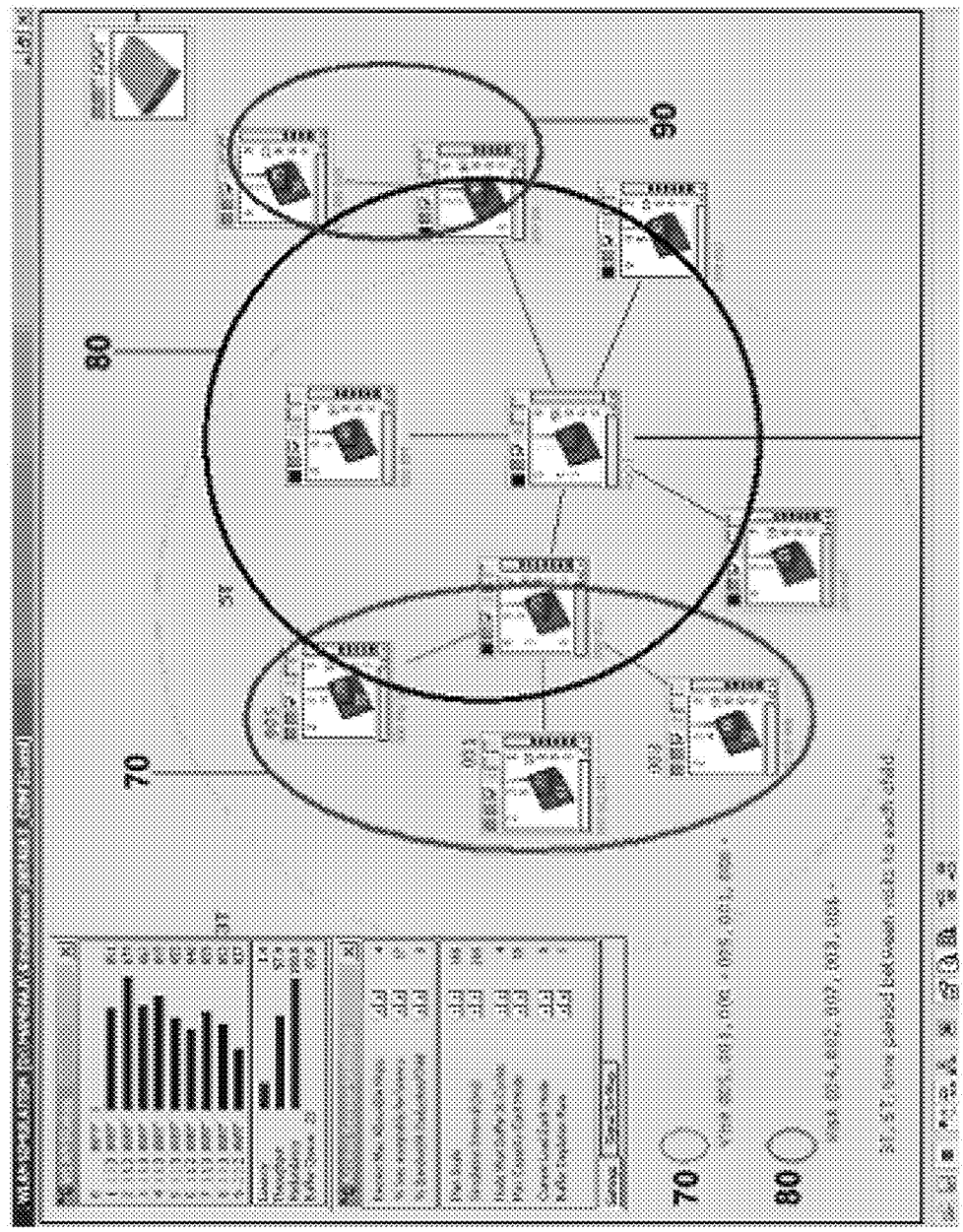

FIG. 46 depicts the dependency of latency sensitive traffic to the network tree topology, specifically, the number of siblings in sub trees along the route to the destination node/parent/root.

Figure 47:
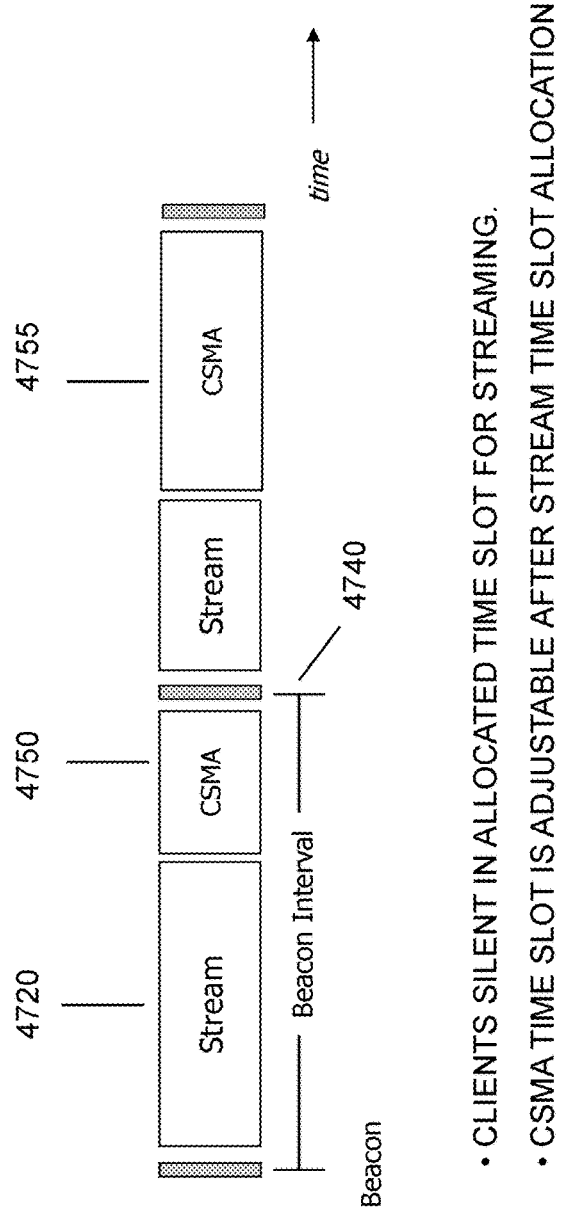

FIG. 47 depicts the use of a reserved time slot for transmitting bulked, latency sensitive data, whereby clients remain silent during transmission in this time slot. The time slot allocations may be fixed or variable. In one embodiment it is dynamically managed by Collaborative Scheduling.

Figure 48:
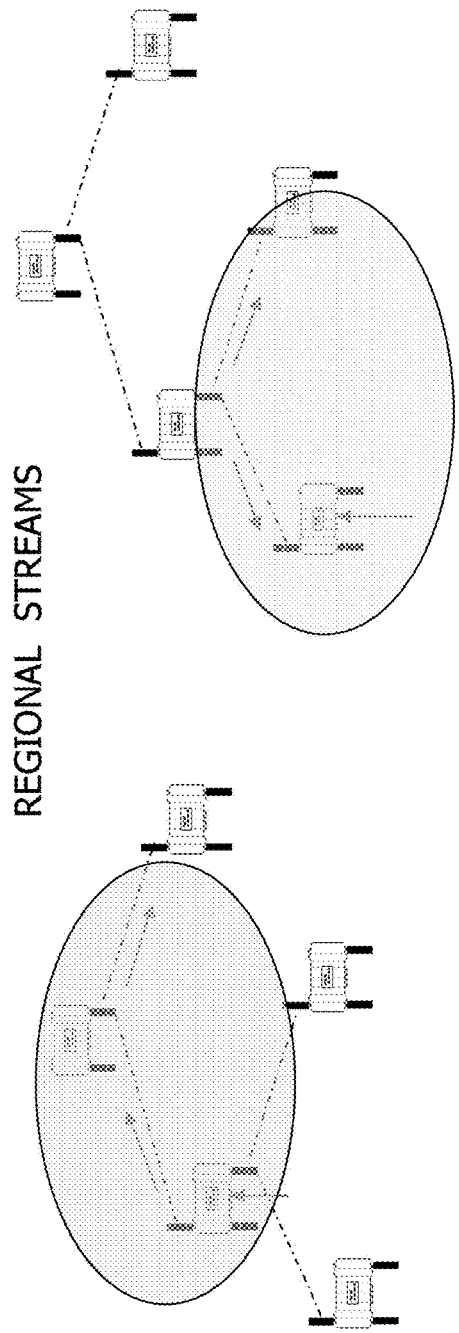

FIG. 48 depicts broadcasts/streams restricted to a region. The region may be defined by geography, membership and mesh topology e.g. restrict the number of hops or sub trees. Further, the region may include directions: up/down or a set of turn by turn directions. An example of regional streams may include a section of the home, where only siblings of a sub tree require particular data stream. Note that backhaul bandwidth is not affected outside stipulated regions. Restricted broadcasting improves overall network health.

Figure 49:
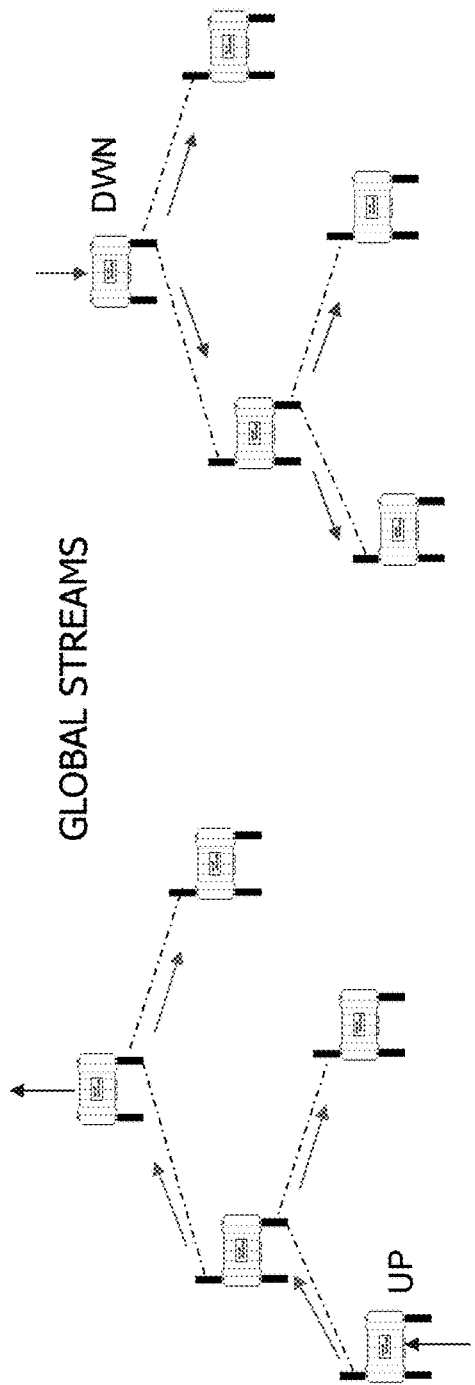

FIG. 49 is effectively the reverse of FIG. 48 and is global: e,g. not restricted. Tree based topologies favor global broadcasts. Streams from the root are always downwards. While streams from nodes may be either, they are typically upwards. The majority of devices populate the edge of the network and their pollen is typically upward bound, necessitating bulking, exception handling and deterministic time mail delivery along the route.

Figure 50:
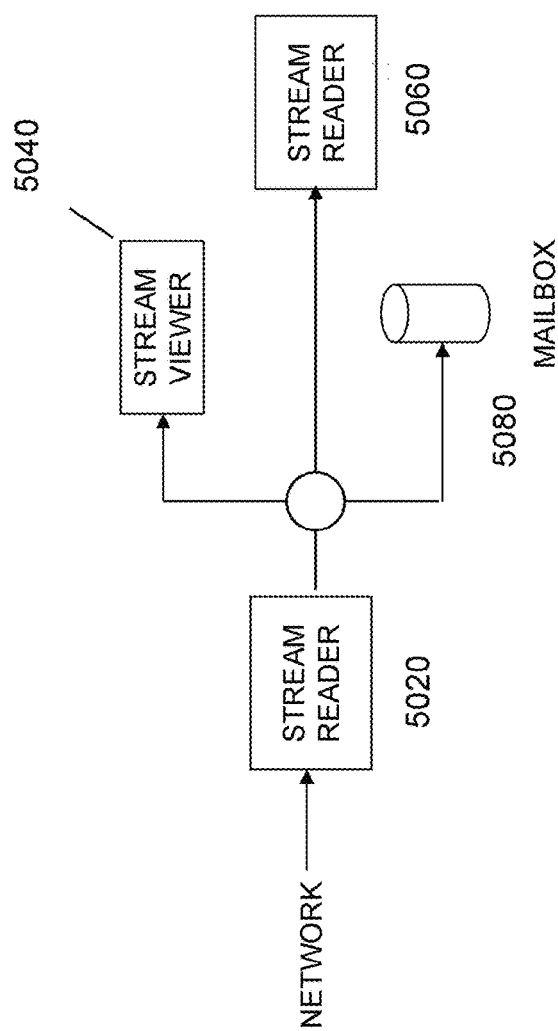

FIG. 50 depicts the Stream Reader, an agent authorized to peer into network router transmission and receiving packet queues, prior to their onward transmission through the network. Like Post office sorters, they identify and sort packets for scheduled deliveries, prune dead letters, duplicate messages etc. They also provide decoded outputs for Stream viewers, a custom GUI for the data. Stream readers may also forward output to other readers, mail boxes or messaging systems.

Figure 51:
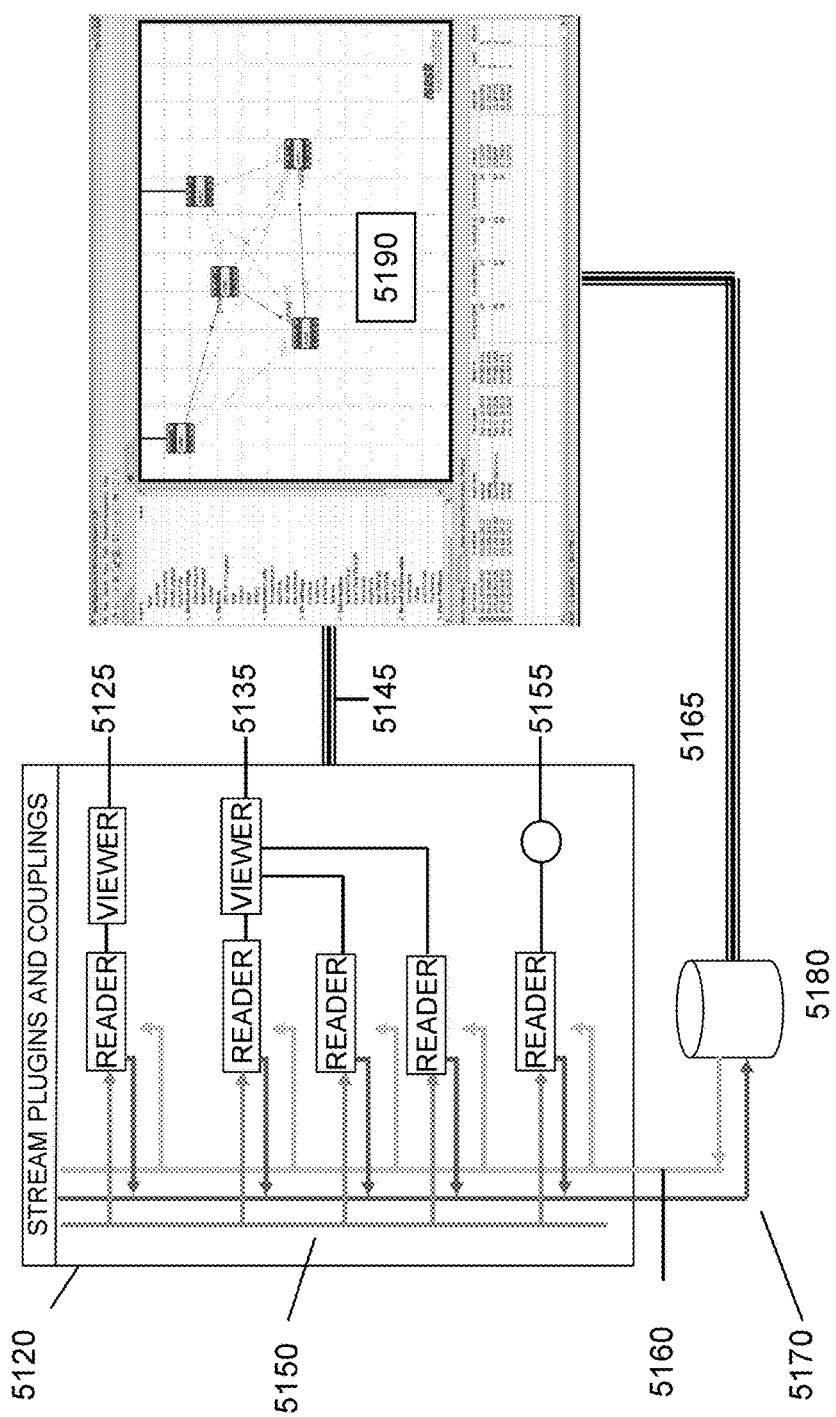

FIG. 51 depicts a circuit diagram of Stream Readers and their associated Stream Viewers, wired together to provide a capability, in this case "feeding" a section of the composite view ports 5190. The composite view port is back drivable since its connection may be to real or historical data.

Figure 52:
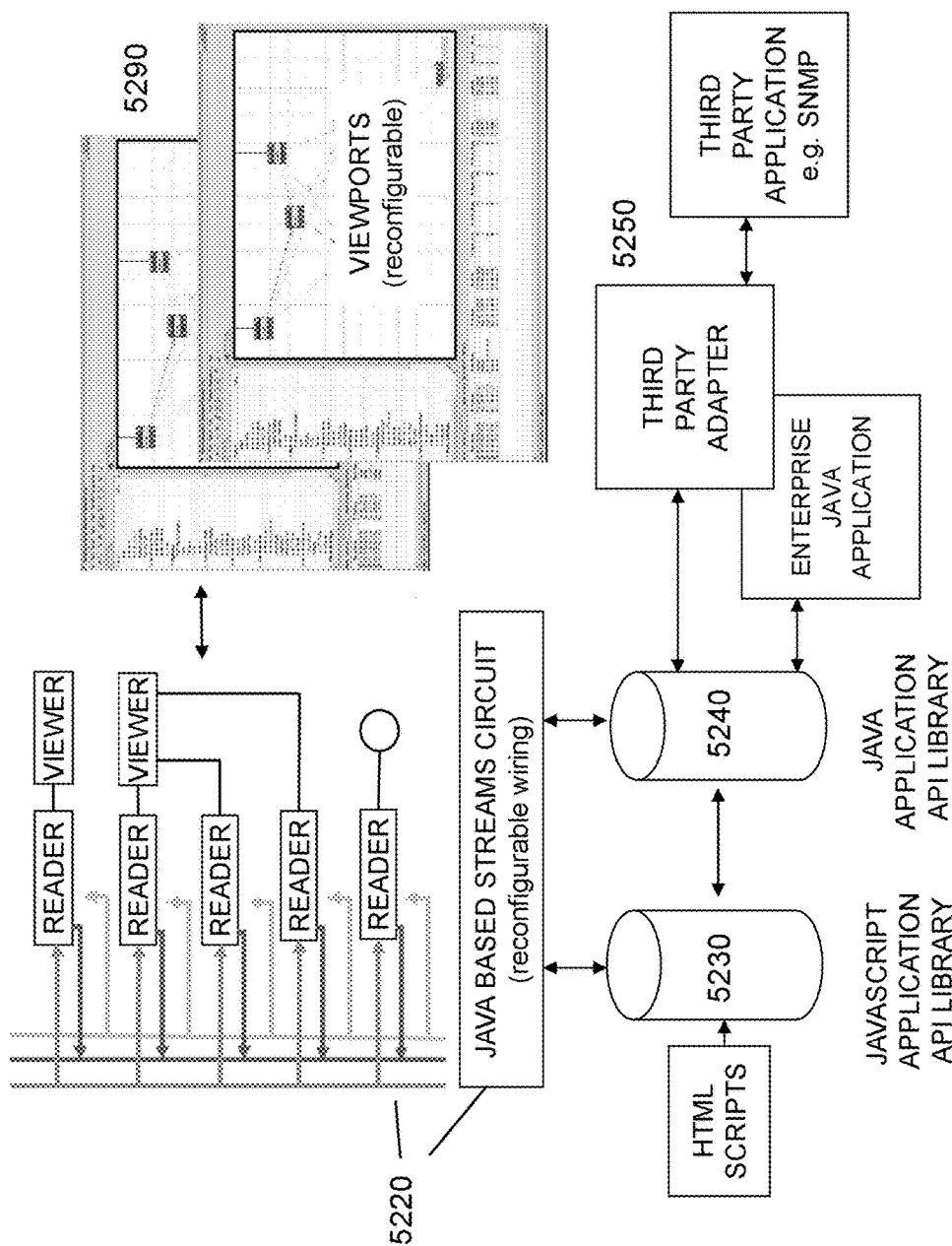

FIG. 52 depicts the adapters and API interface components that provide an extensible, open library of stream reader and viewers. This enables the rapid prototyping of custom circuits to provide specialized competencies. The view port additions enable human participation in managing the network health. This includes, through adaptor view ports, all assets of the network and their health.

Figure 53:
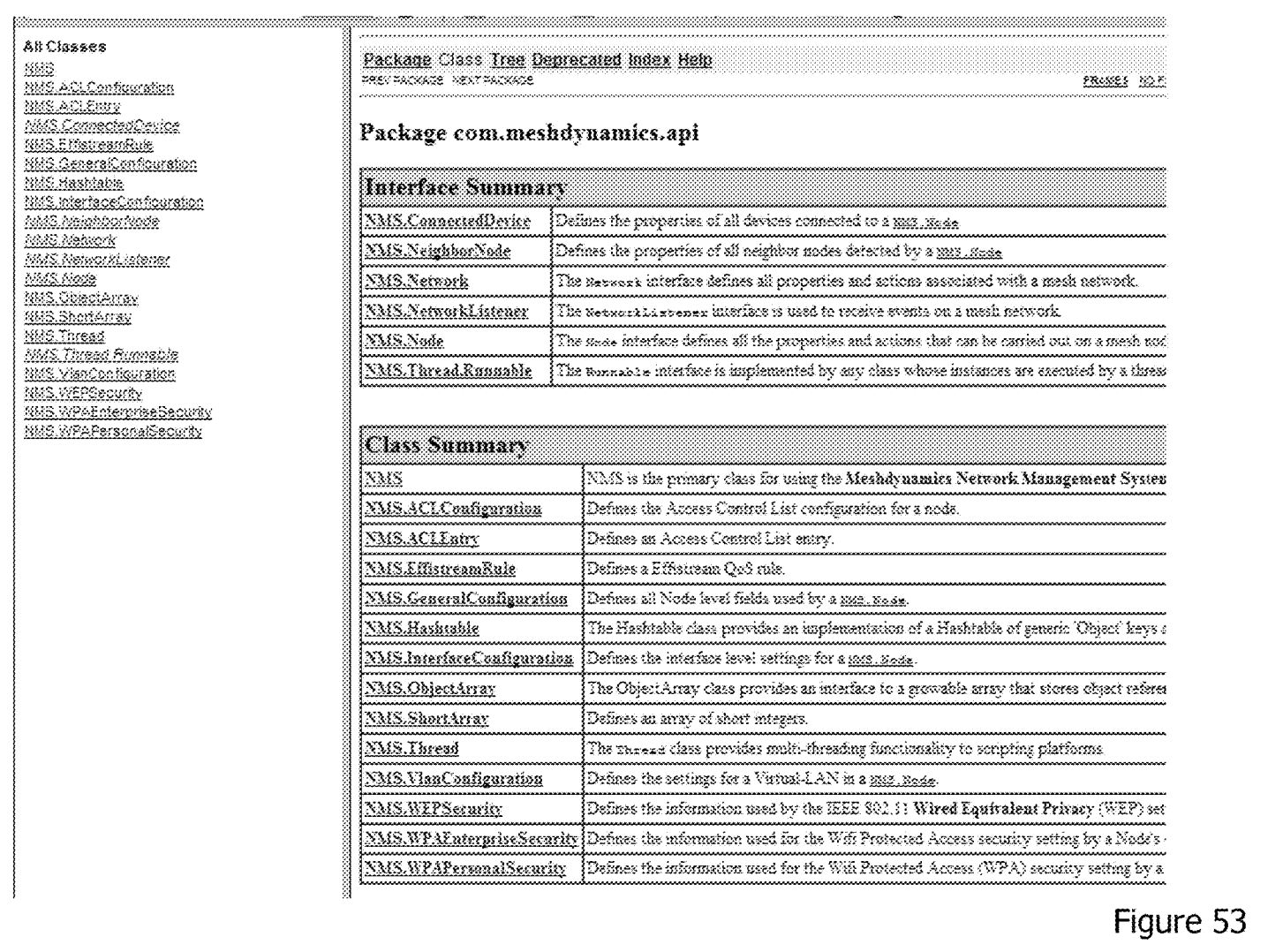
Figure 54:
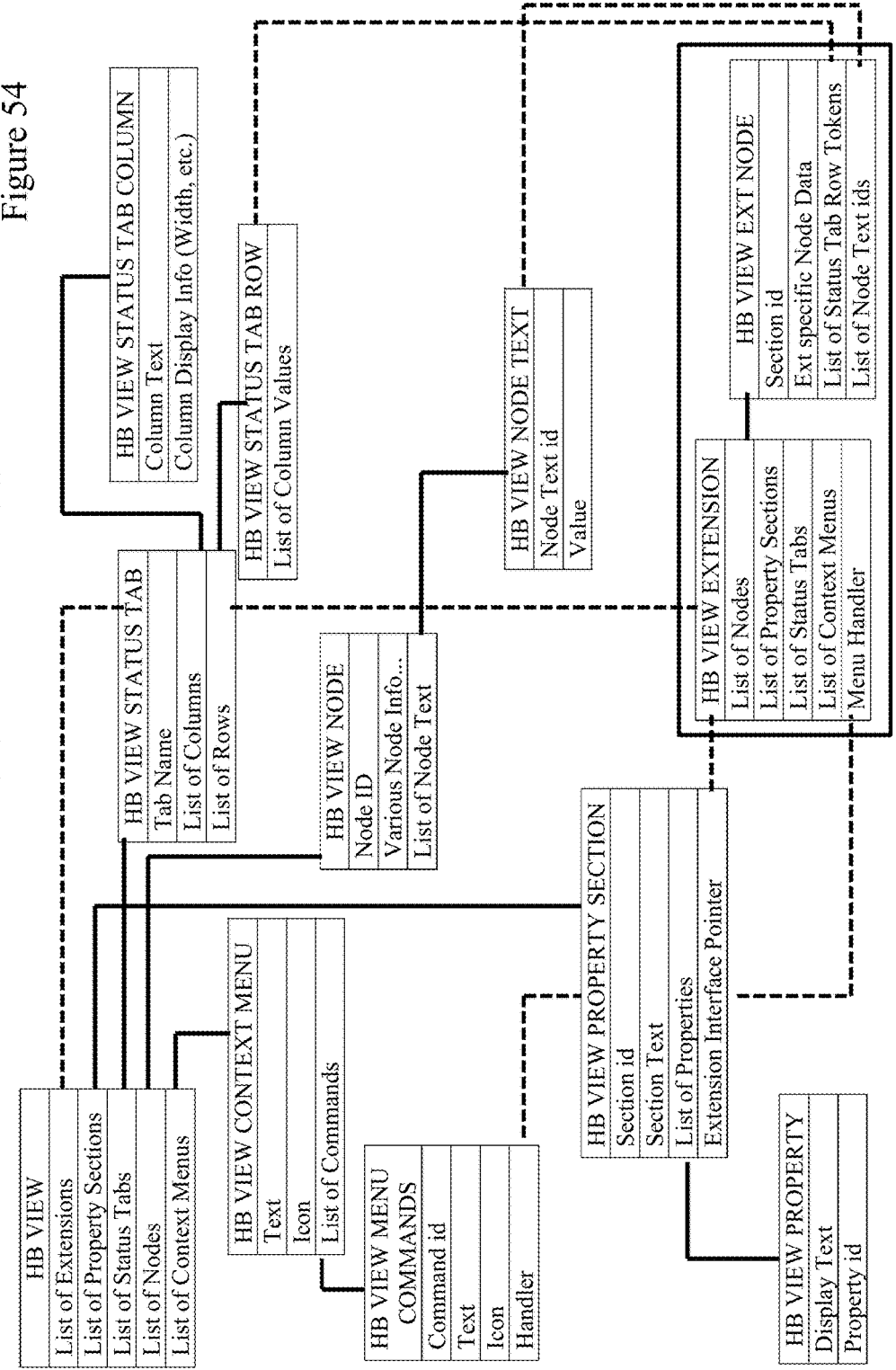

FIGS. 53 and 54 depict the published interfaces for the Network Manager Streams API and the Heart Beat Entity relationships, respectively. Together, these facilitate speedy viewport development.

Figure 55:
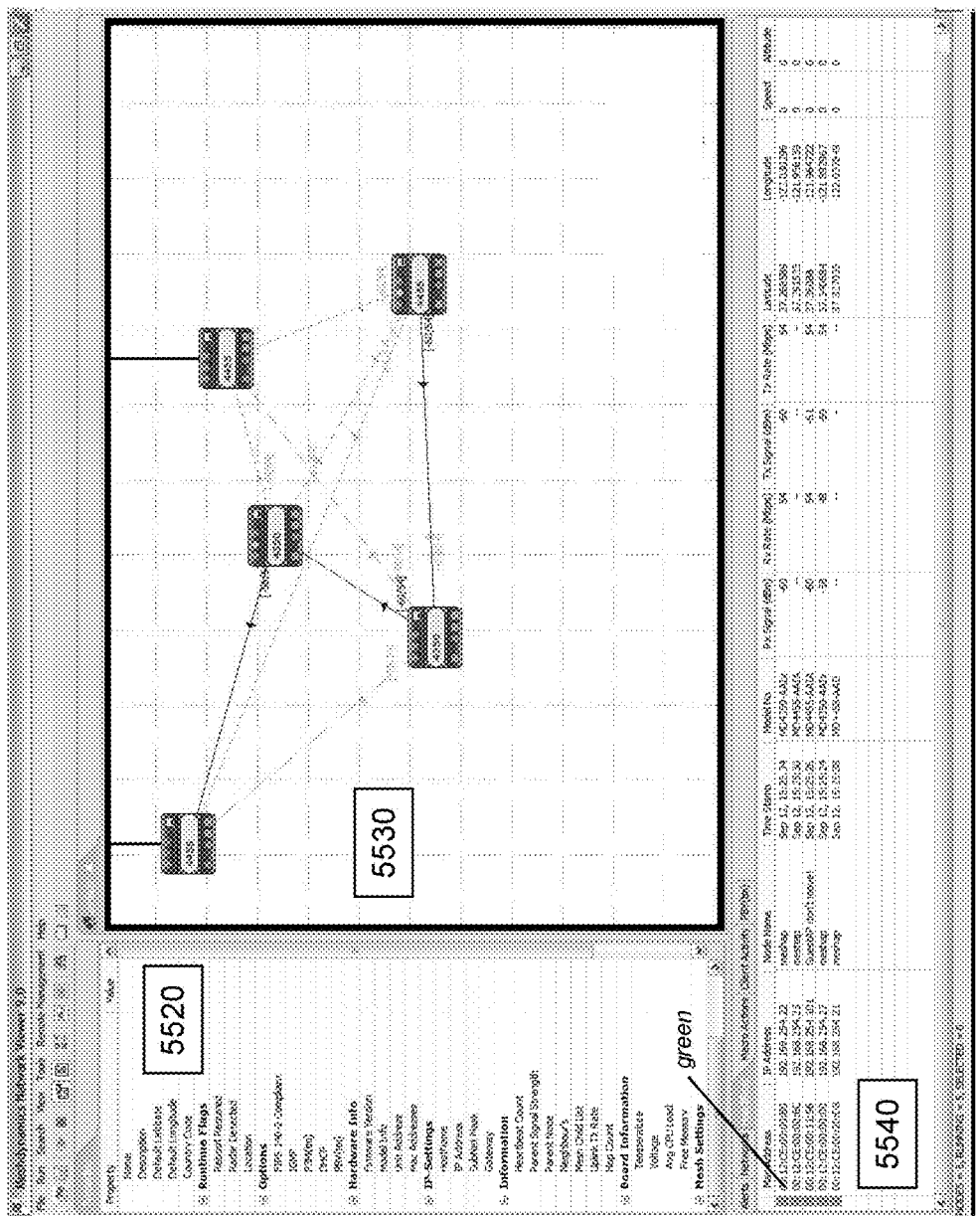

FIG. 55 depicts an embodiment of methods outlined in FIGS. 47 through 54. 5530 depicts the current mesh topology in dark lines. The lighter lines are alternatives gleamed from mesh node heart beats, which in turn was gleamed from SCAN agents, FIG. 12. Clicking on a mesh node brings up its machine status 5520. This includes applications resident on that router. Recent heart beat log shown in 5540. Green light 5540 indicates that heart beat based algorithms infer the node is healthy e.g. multiple alternate parents, strong signals.

FIG. 56 compares contemporary thin client, single control loop architecture to a dual control loop, with a membrane separating the two control loops but, through the chirp to IP bridge/membrane, there is bidirectional, pruned and selective traffic, based on collaborative scheduling of bus schedules in both directions. Note that the two control loops are working on their own frequencies but neither is waiting on the other, see also FIG. 46. This predicates the need for a "hub", e.g. Propagator. They also serve as bridges between the upper control loop, IP based and lower, tighter (low latency/isochronous) control loops preferably in more efficient chirp protocols. Note that the overhead of converting raw, machine specific raw data to a more palatable device abstracted format (e.g. small data) is performed within the cloud in the single control loop model, (left) and delegated to propagators in the other (right). Further, the lower control loop, between propagators and devices can be low latency/isochronous while the upper control loop focuses on more infrequent high level tasks: performance tracking, exception handling system updates (event based, low latency), routine hourly reports (large interval periodic).

Figure 57:
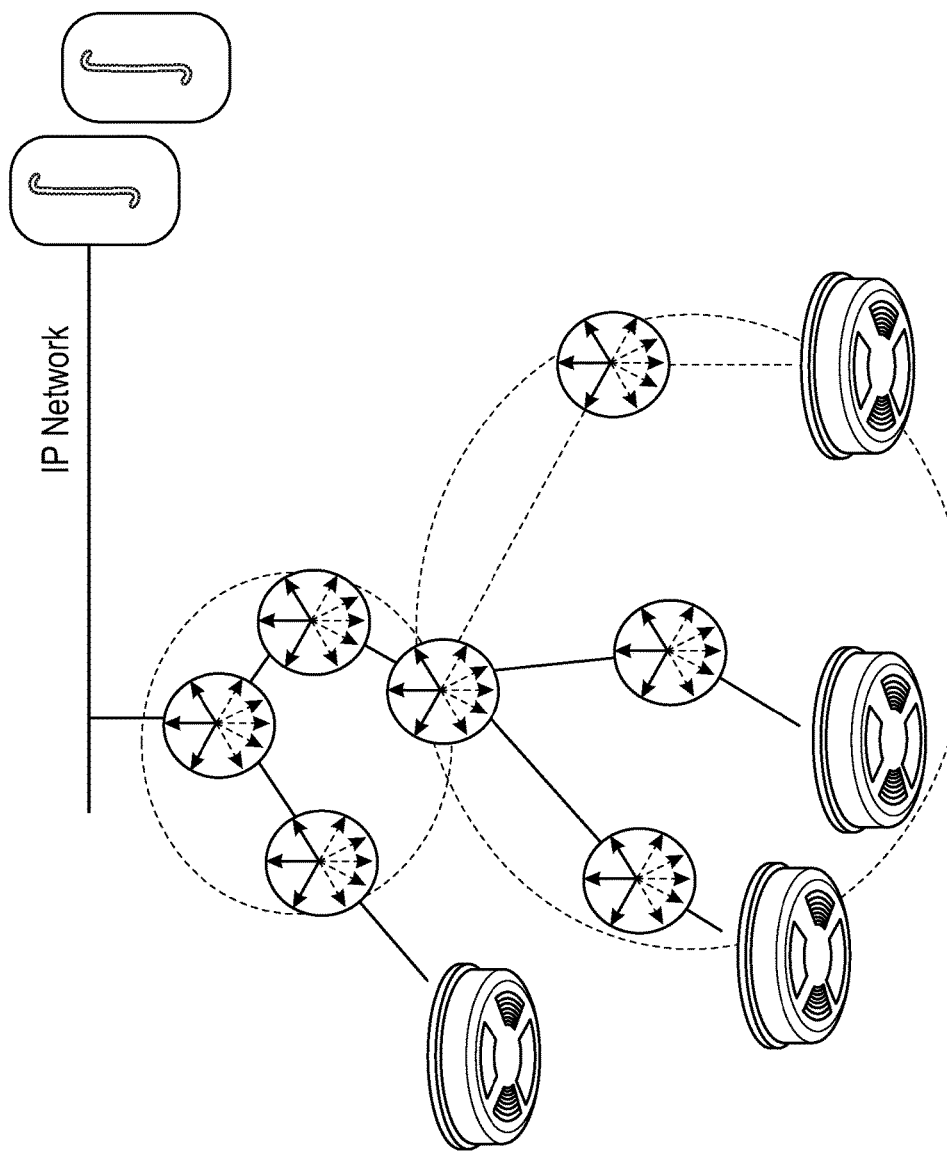
Figure 58:
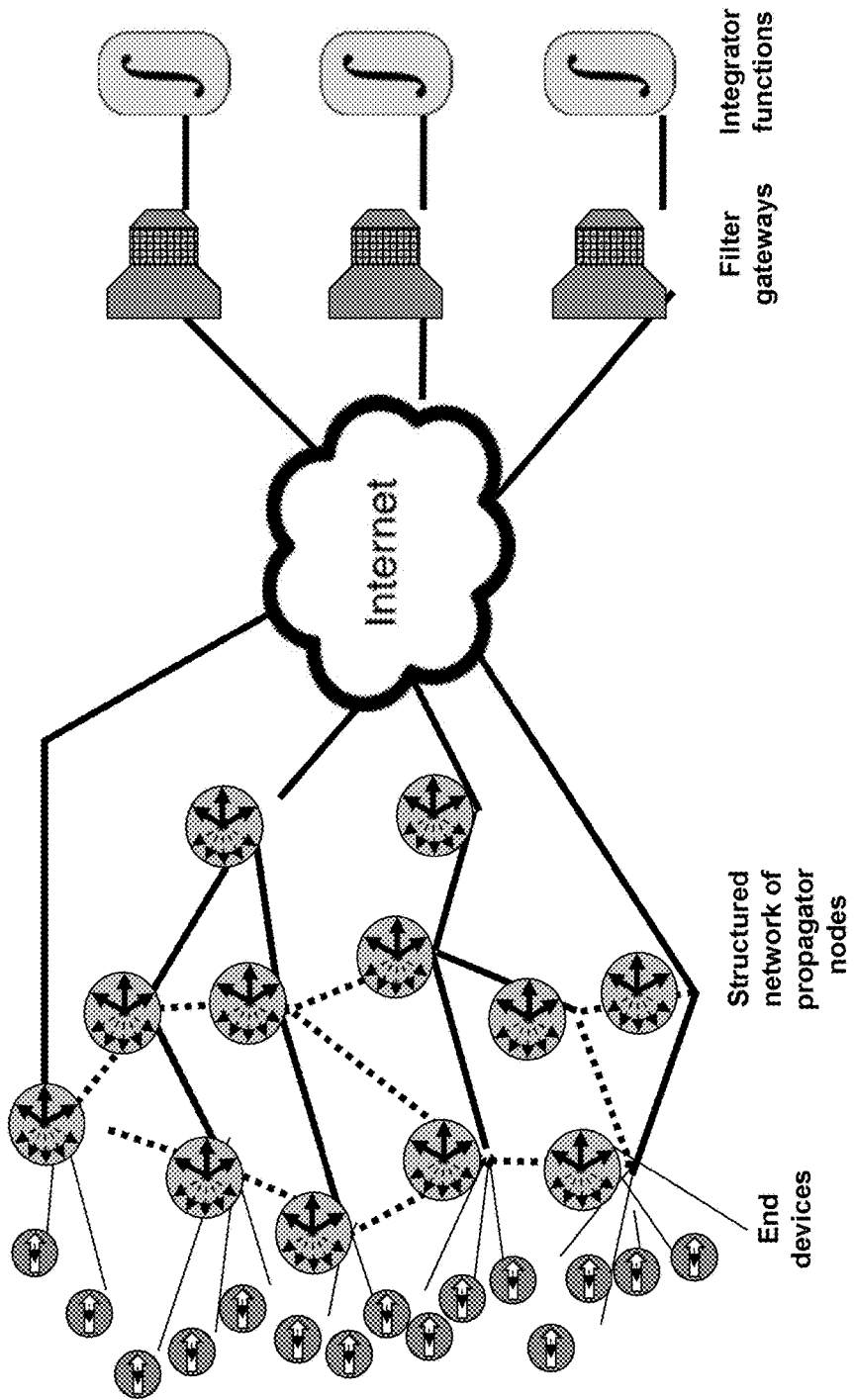

FIGS. 57 and 58 depicts a burgeoning market place "exchange", where the confluence of multiple sources of terse but potentially rich content streams, often in organic protocols occurs at propagator trees. The root node serves as the Chirp to IP bridge/membrane. Small data is progressively refined and pruned, in proactive manner, as data moves upstream, like salmon upstream.

Figure 59:
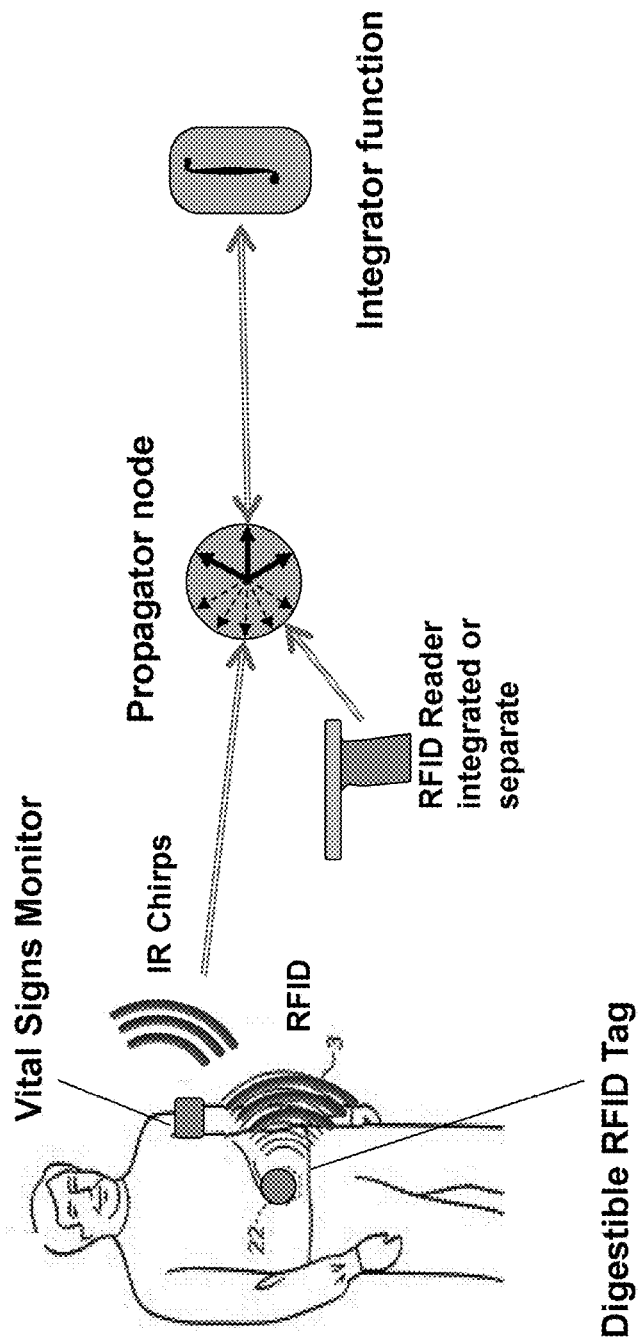
Figure 60:
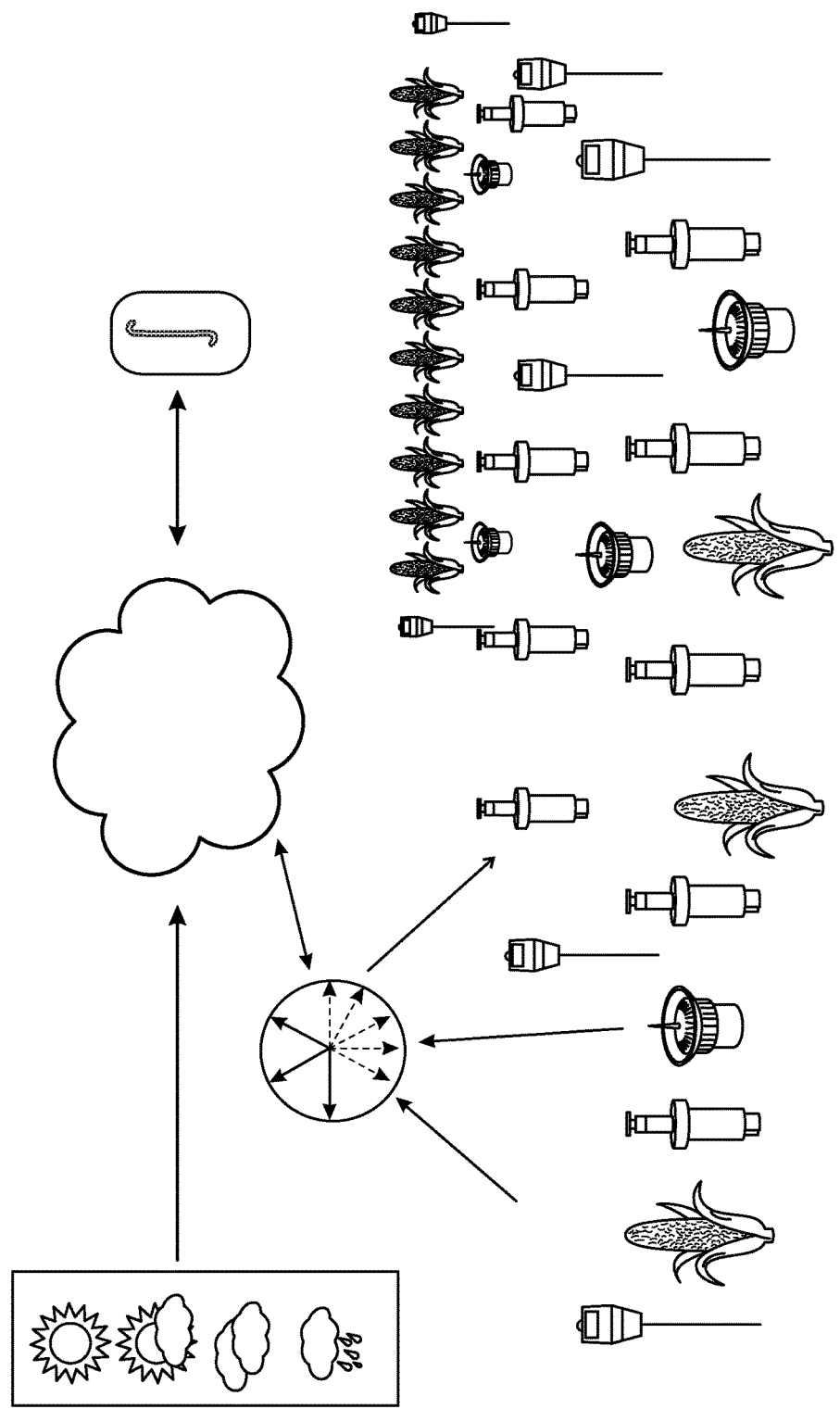

FIGS. 59 and 60 depict a publish/subscribe exchange/market supporting multiple devices and integrators each operating in their own private communities/but also part of the same logical exchange.

FIG. 59 is an example of a small "exchange" of multiple data streams, operating on different, non-interfering wireless media. The "vital signs" Integrator is fed exception and periodic, non urgent pruned data from the propagator. The exchange between device and integrator is managed by having two segmented control loops, maintained by the propagator.

FIG. 60 is an example of a proactive control system, operating on the confluence of both local and external data publishers. The propagator, with appropriate transceivers, picks up multiple sensor streams, from a grid of diverse sensor types. Local Integrators/Agents residing in the propagator, can quick discern patterns and overall state of a large area—since small data is being generated and shared across a local mesh network, see FIGS. 57 through 58. Local data streams are consolidated to provide a composite view of the region of interest. This feeds a second control systems where big data publishers provide a more global perspective. Thus, weather forecasts predicting rain, can cause the cloud server to direct the propagator network to direct which section of the corn field need additional local irrigation.

Figure 61:
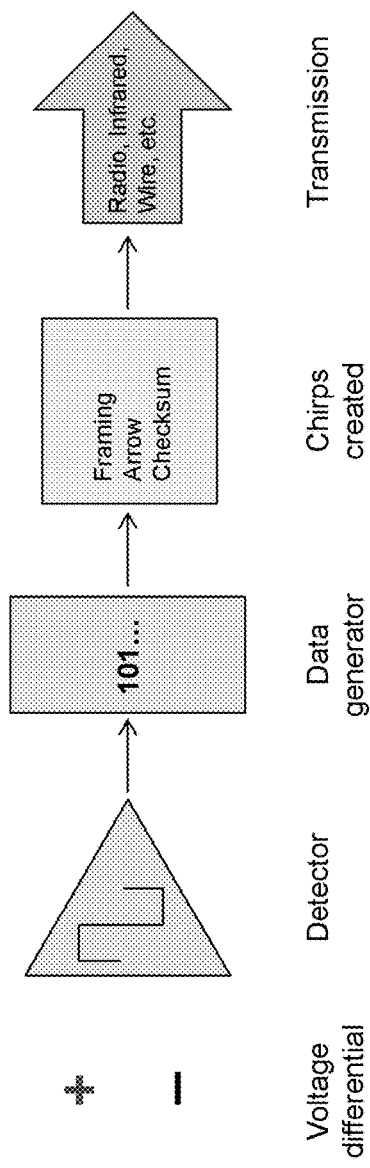

FIG. 61 depicts the simple circuitry needed to mass manufacture very low cost, low footprint, light chirp or "pollen" generators.

Figure 62:
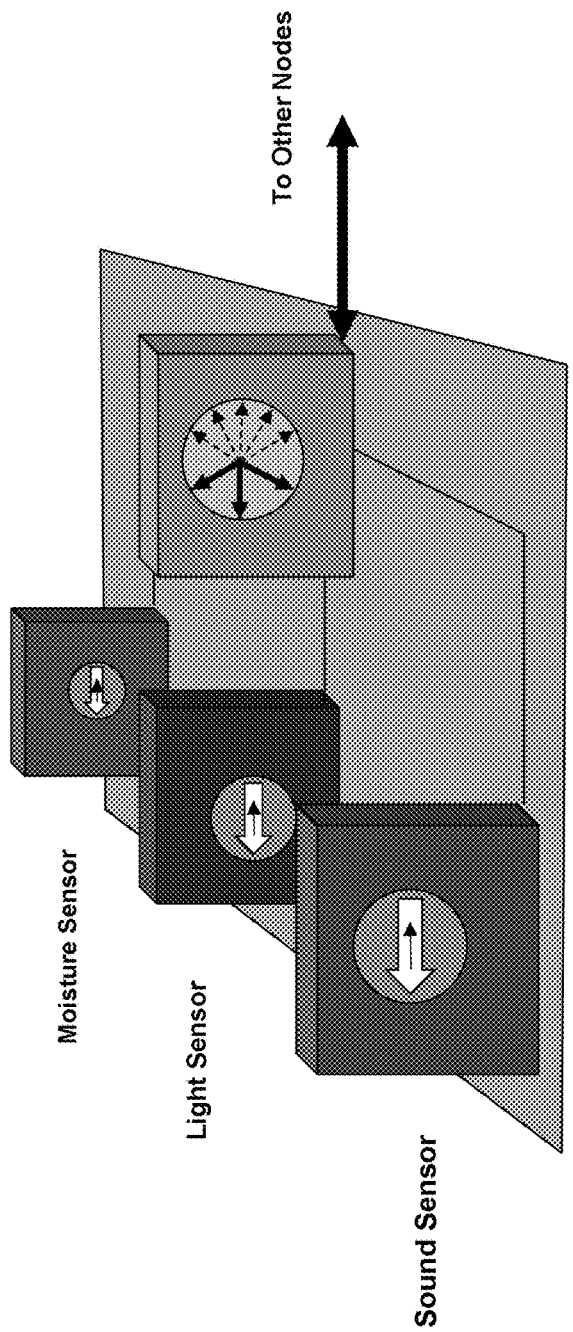

FIG. 62 depicts a first layer, rudimentary small data generator, where sensor fusion/consensus generates early warning signals with fewer false positives. The propagator and first layer integrator may be bundled as one device, servicing both single and multi-sensor subscribers in the local meshed network and beyond.

Figure 63:
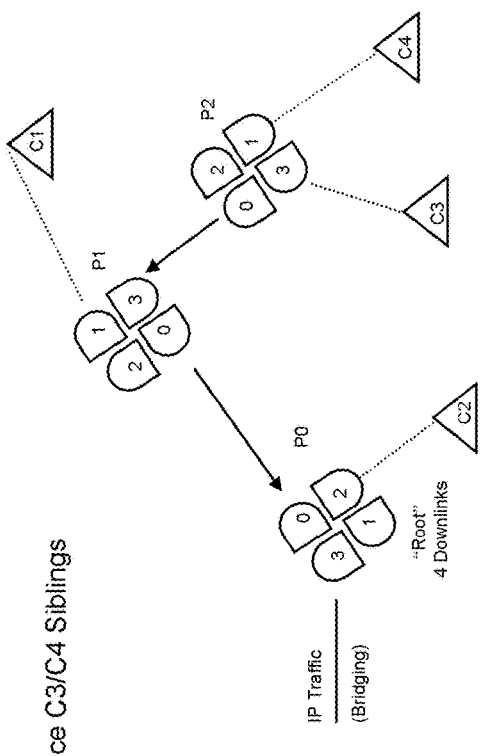

FIG. 63 depicts a modular four leaf clover like propagator, with 4 independent transceivers, 90 degrees rotated from each other. The 4 transceivers may be logically assigned uplink, downlink and scanner functionality, based on where the clients and relay node parents are located and the current network routing priorities. The transceivers may be dynamically and logically reassigned as the network topology changes or as clients migrate into and out of the network. Note that, as other 4 port devices depicted in this application, there is only one uplink per the 4 leaf clover design—it is scalable tree architecture. One layer is shown—overlays of such devices cover different wireless transmission media (e.g. Infrared LEDS for Chirp and Bluetooth for IP networking) A stack of such four leaf transceivers than thus service both Chirp and IP clients, including other propagators. Routing is shown as lineage based, so siblings are distinctively identified. In one embodiment the unit is autonomously rotated to better align Uplink and Downlink radios to see alternate parents, 5530.

Figure 64:
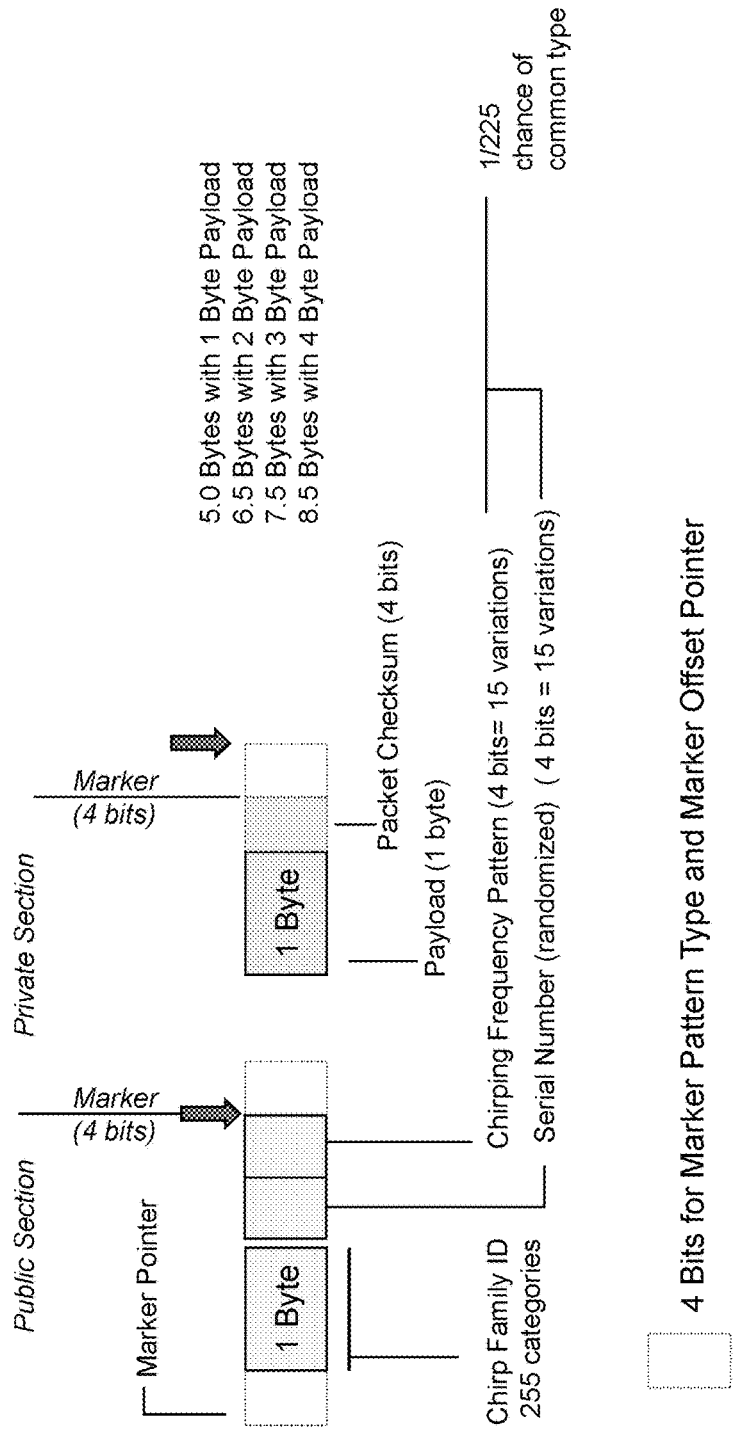

FIG. 64 depicts one embodiment of category classification based approach to publishing M2M data. The Marker Pointer tells the router/propagator/agent where to look for the type of Pattern being used. Thus Marker patterns located at Byte 6, would be part of the 6.X . . . family. A 4 bit Marker pattern value of 15 would imply that data being published is part of the 6.4.15 family. This coarse granularity may be sufficient to route the published data in the general direction of interested subscribers. Further levels of finer granularity are available to agents aware of what Marker Pattern 15 signifies e.g. how the category data in the 6 bytes of (open but cryptic) finer classification data are expected to be read.

FIGS. 65 through 67, relate to the distributed collaborative scheduling engine. FIG. 65 is the starting condition where each task is taking just a little longer than expected. The usual first in first out queue, see FIG. 66, results on excessive delays further out for entities at the tail of the queue. FIG. 67 employs collaborative scheduling to balance out and maintain overall "customer satisfaction". Two tasks are "stacked", because they are contending for the same resource a portion of the time. Stacking implies more resources are needed. When the resources are limited must be shared, this is not an option. As an example, consider the case of chirp devices and IP devices sharing the same wireless channel. Collaborative scheduling shifts the two tasks in opposite directions in time, to remove the stacking. The shifts are based on shifting those task start/end times within "Customer Satisfaction" constraints defined by the blue/red ranges for the task. In one embodiment, schedulers runs at each mesh node, thereby providing dynamic scheduling services for all packets entering or leaving the mesh node.

Figure 68:
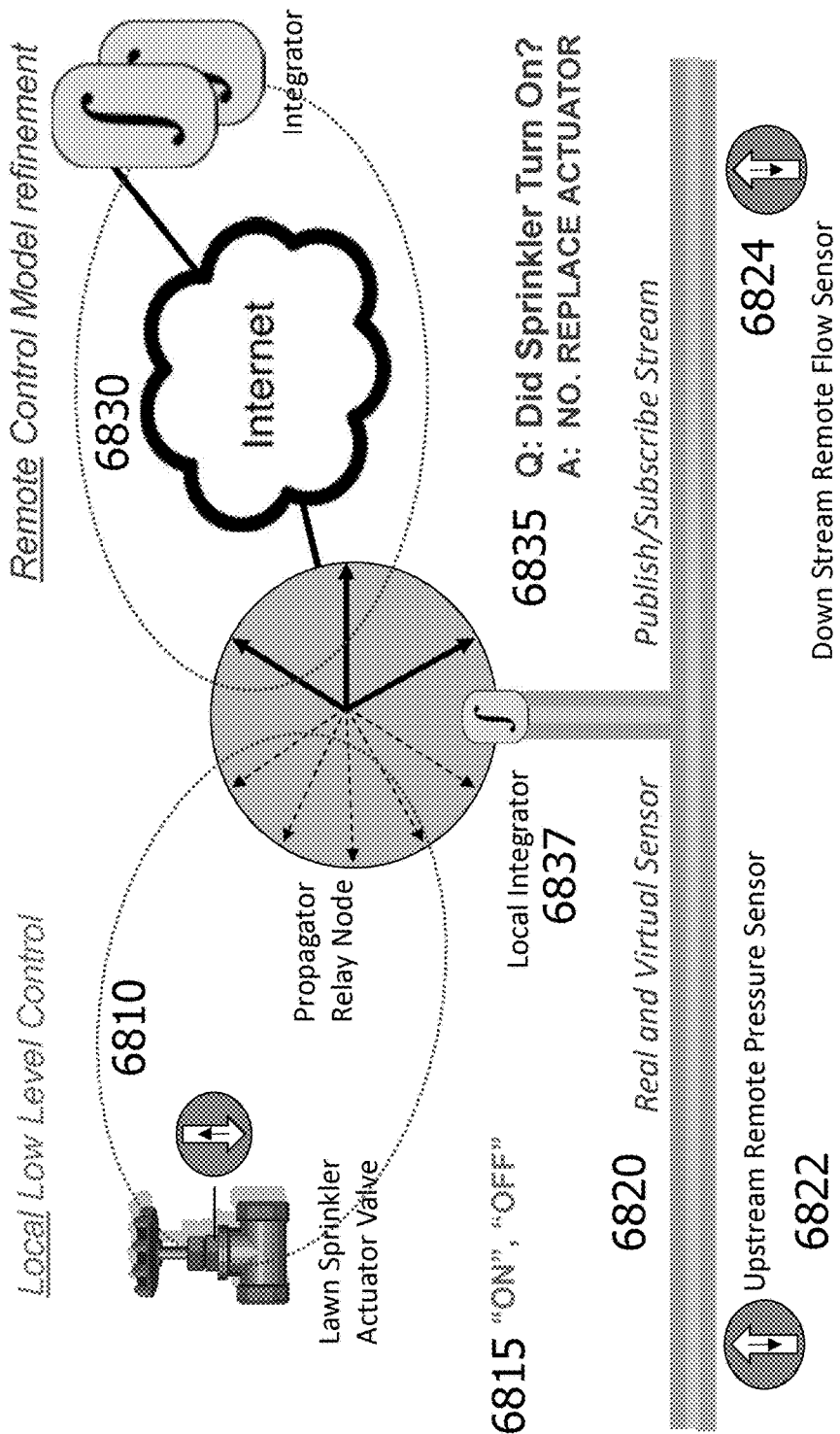

FIG. 68 depicts application use cases that highlight the shared publish subscribe exchange through which small data reaches big data subscribers and their analysis/inference engines. A low cost lawn sprinkler actuator is controlled through a local control loop 6910, a remote control loop 6930, conversing through a shared publish-subscribe exchange, 6920. Upstream to the actuator valve a water pressure sensor is depicted, 6922 as is a down stream water flow sensor 6924. Both sensors reside within the local (and secure) M2M home community and their (subscribed) chirps are part of scheduled pub/sub exchange 6920. The lower control loop vocabulary is limited to actuator commands 6915, (e.g. ON, OFF). The system has no way of knowing whether the lawn sprinkler is functional, without accessing information from the larger M2M community. When chirp data is time tagged, then causal analysis indicates that if the upstream water pressure is "good" and the down stream flow is "bad", then the actuator is worn out and needs replacement, see 6835. A local integrator agent, 6837 may also, through access to the shared pub/sub stream, 6920, be directed to perform this check each time the valve is activated, thus reserving internet traffic for exception handling. Thus an intelligent valve actuator emerges, without additional hardware/sensors at the actuator. Dual control loops thus provide intelligence without adding to the cost of the device.

Figure 69:
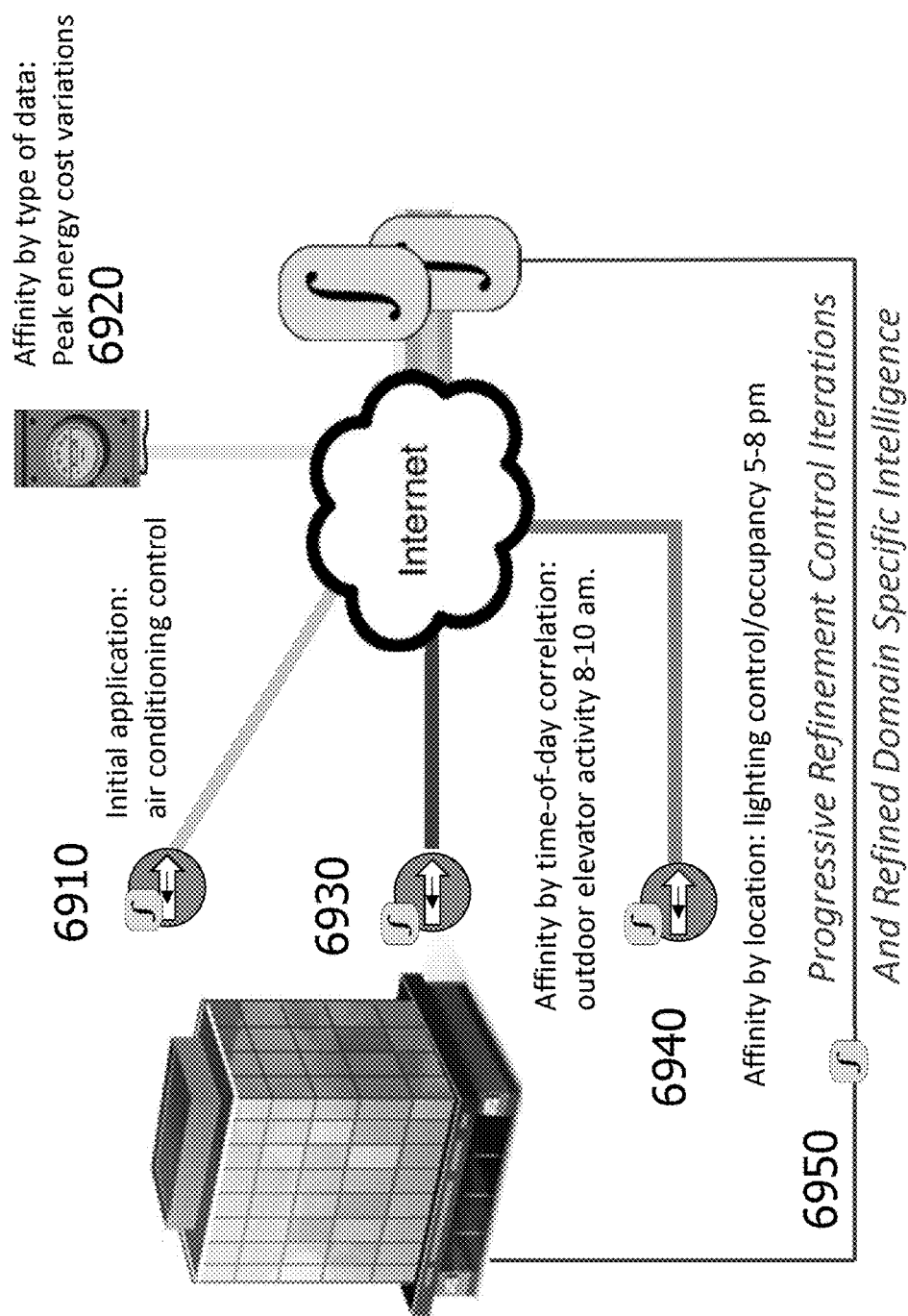

FIG. 69 depicts how discovery of related sensory streams can drive more refined control models for M2M Enterprise. The initial application is Air Conditioning control for a large building, 6910. The integrator agents, through the shared chirp classification streams, discovers other local subscribers to the energy usage/cost data 6920 active in the same building. Further analysis of their activities indicates that the front door elevators are active the same time that the heating/cooling in that zone is "unstable", 6930. It also can correlate night time activity, when lights are turned on 6940 in zones that need to be activated, when the lights are on. Hence multiple, related subscriptions now drive a refined control model for air conditioning, 6950. Note that human "experience" would arrive at the same conclusions over time but machines, through their subscriptions and pattern analysis are able to close the loop semi-autonomously or autonomously. Further, the causal analyses/inferences gleamed from one building may be transportable across related domains.

Figure 70:
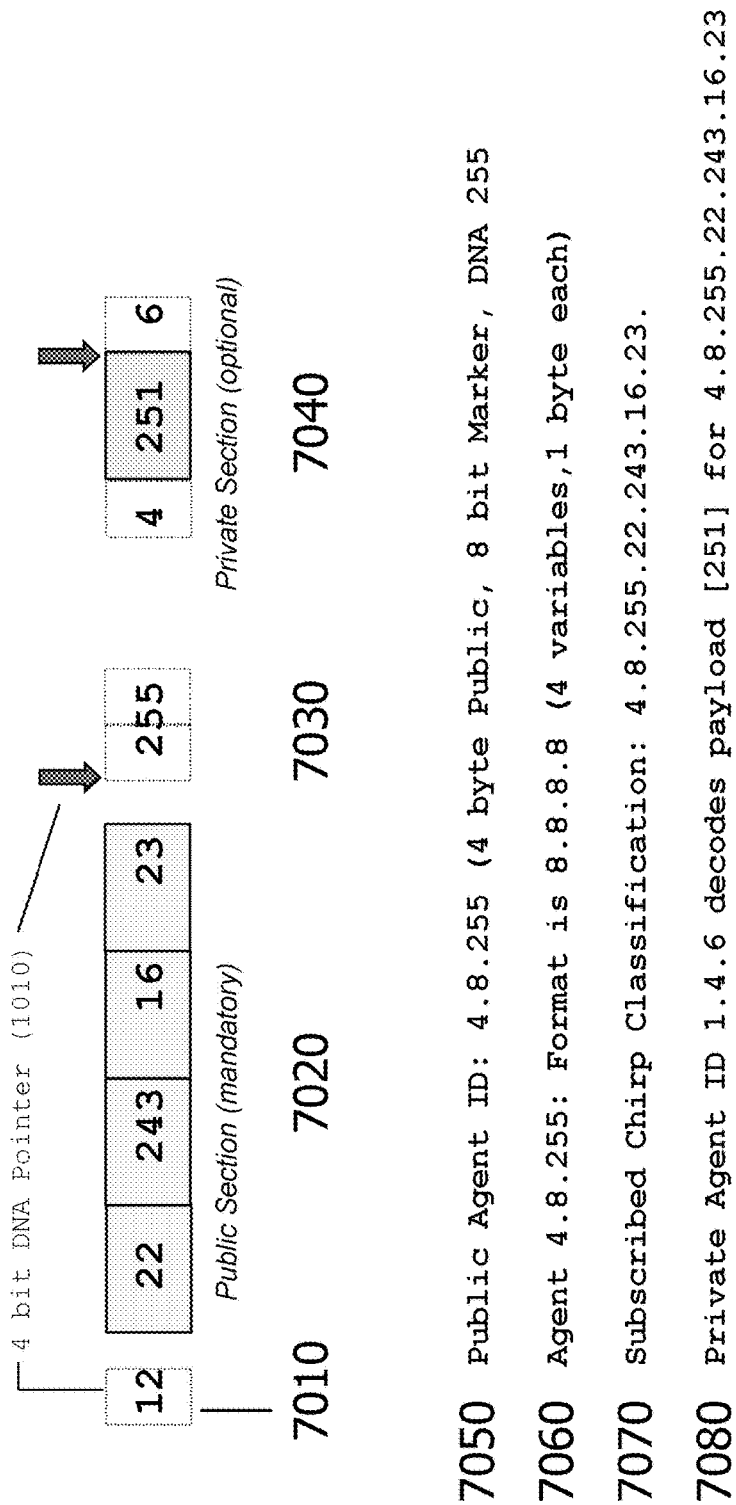

FIG. 70 depicts how discovery is engendered through the chirp classification system in one embodiment, see also FIG. 64. In FIG. 70, the 4 bit marker pointer 7010 has a bit address of 1010, indicating an 8 bit marker pointer 7030, at the end of the packet with its agent ID of 255. This means that the public section 7020 is 4 bytes long. The coarse classification is thus 4.8.255, sufficient for pub/sub bus schedules to deliver the chirps to hubs and clearing houses, see 7050. Those who have subscribed to Agent 4.8.255 may then be able to decipher the container further. For example, Agent 48.255 states that each of the 4 bytes is a further classification, see 7060. The full chirp classification is thus 4.8.255.22.243.16.23. Note that without access to the agent, though a subscription, this level of detail is not possible, since how the data is internally formatted within the 4 bytes is not known a priori. 4 bit marker pointer may be used for common and free formats while 8 bit markers, 7030 are used for subscription based services, in one embodiment of this invention. The same process applies to the (private) payload 7040 and 7080, where additional agent subscriptions are needed. Thus the level of shared information may be incrementally controlled within an M2M social community operating at the edge. Note that a larger 8 byte chirp (e.g. 8.8.X.) may also choose to use multiple agents with one agent pointing to another within the same packet. The incremental control of information shared is thus implemented in multiple manners.

Figure 71:
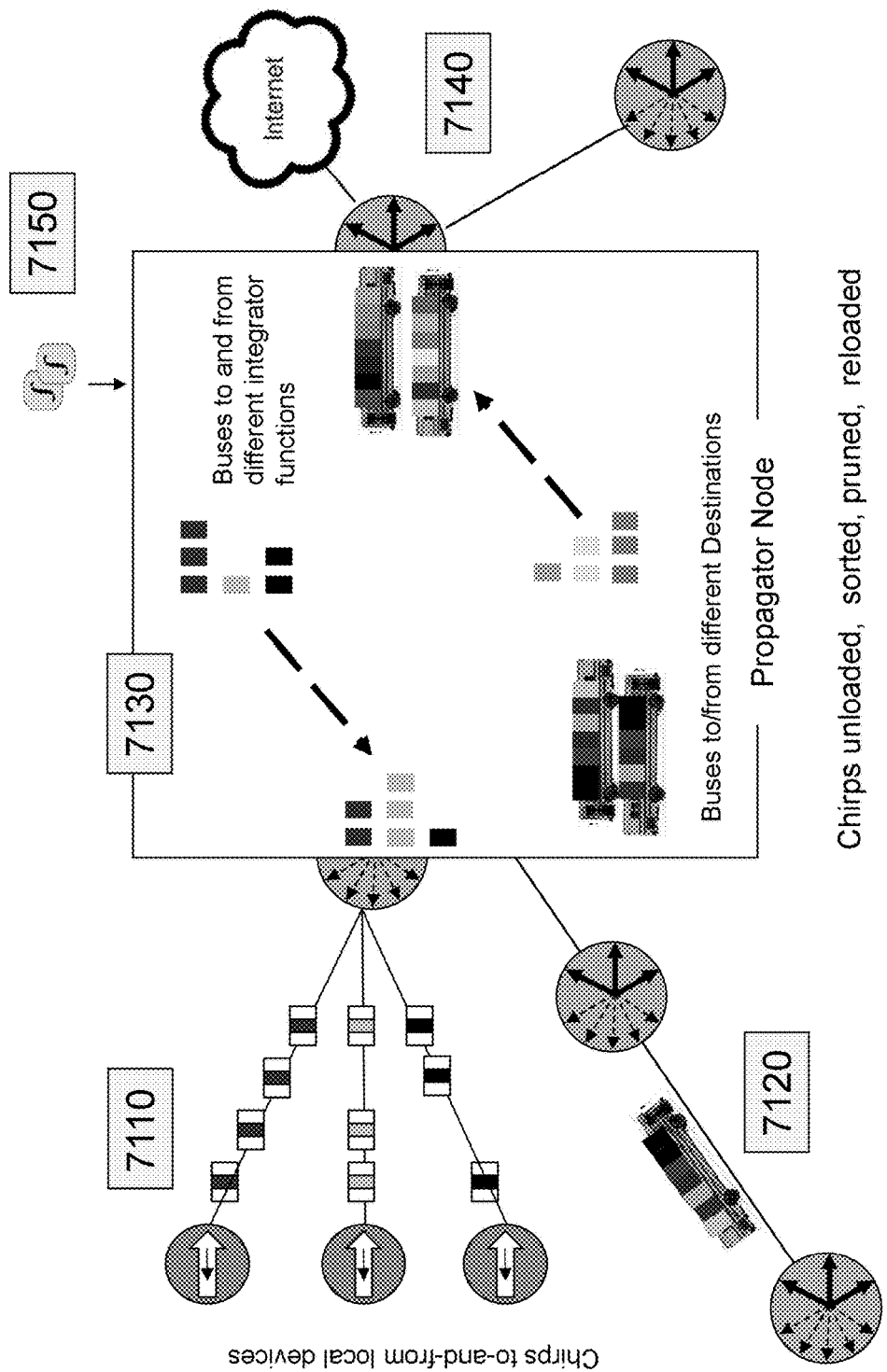

FIG. 71 shows chirp packets enter the propagator from both local and remote publishers 7110 and 7120 respectively. The latter is containerized as a busload for efficient transport, 7120. Inside the propagator, port forwarding tables define the locations of interested subscribers. The bus containers may be reconstituted, in alignment with the current dynamics of the pub-sub exchange. Chirp packets that are no longer desired or duplicates. For example, heart beat packet duplicates are discarded at each mesh node. The reconstituted bus containers are then sent out to both local and remote subscribers 7140. Subscriber interests are provided by both local and remote agents of integrator functions, 7050. Since chirps are category based, the protocol handlers (on both sides of the Chirp/IP boundary) are logically part of the same publish subscribe bus system, with buses operating at different schedules in both networks. In one embodiment, bus schedules are managed by a distributed scheduler, such as the embodiment of FIGS. 65 through 67. An Analogy would be nation wide bus services involving both greyhound (IP) and county (chirp) bus services collaborating on bus schedules to minimize overall delay, based on current traffic supply/demand.

Figure 72:
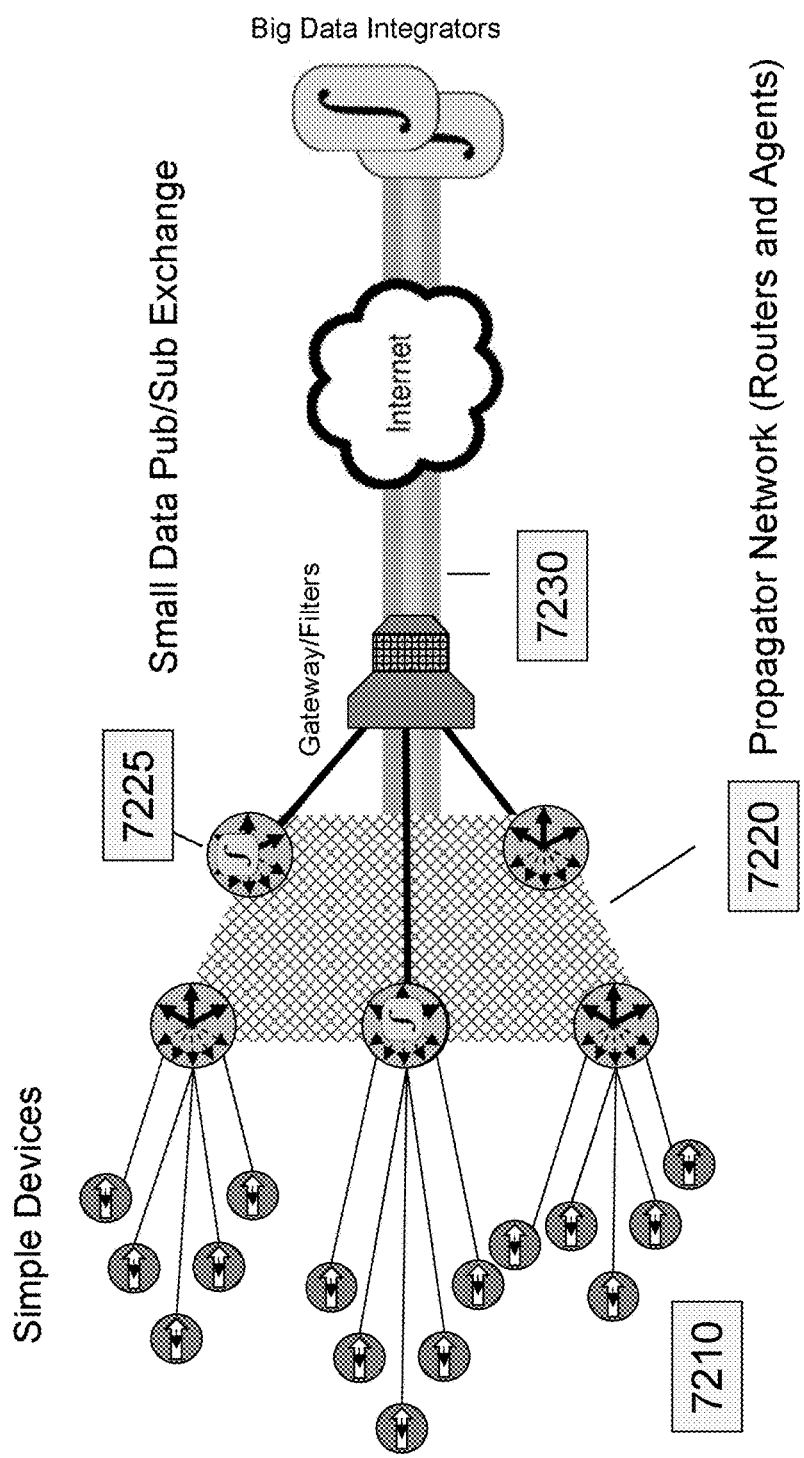

FIG. 72, a version of FIG. 58, depicts the top level view of the entire M2M service delivery framework consisting of simple terse messaging devices 7210. A propagator and bridging Mesh Network 7220. This includes agents resident on the nodes 7225, see also 7050 of FIG. 71. Agents act on behalf of big data subscriber interests 7230. The propagator and integrator functions are thus closely coupled, down to the network port forwarding tables. This engenders efficient, latency sensitive, "small data" flows.

DETAILED DESCRIPTION OF SPECIFIC EMBODIMENTS

The description above and below and the drawings of the present document focus on one or more currently embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The following concepts are applied in the embodiments described below:
1. Logical Radio Routers
2. Efficient Terse Messaging Transport
3. Modular Nodes based on U/D/S/A
4. Isolated Network support
5. Remote Management
6. Application Aware Mesh Control
7. Chirp Device Registration and Discovery
8. Latency Sensitive Terse Messaging This section applies those methods to transport "chirp" broadcasts akin to VoIP packets from "chirp" device networks to co-existent and incumbent IP based network devices and protocols.

Raison d'être for Chirp Protocols

Traditional networking protocols/techniques, specifically IP-based protocols, originated from sender-oriented communications. They emulated legacy frameworks of human-human networks to support human-to-human correspondence. Thus the methods of routing postal mail resulted in email. Emails are sender oriented. Sender oriented communications are intended to be read by stated intended recipients only. It is not lightweight: it contains destination addresses and potential encryption so they are not tampered by hackers. They were historically point to point communications.

With all this overhead in place, on every packet basis, IP based routing protocols favor economies of scale in moving large packets, preferably with best effort only. When QoS is required (latency/jitter/assured delivery) IP protocols extract a premium. Small packets are also charged a premium because the "standard" minimum packet size was not designed with them in mind. Traveling inside the minimum size, they have to pay the same price in transmission time and bandwidth requirements as the "standard" minimum.

Figure 10:
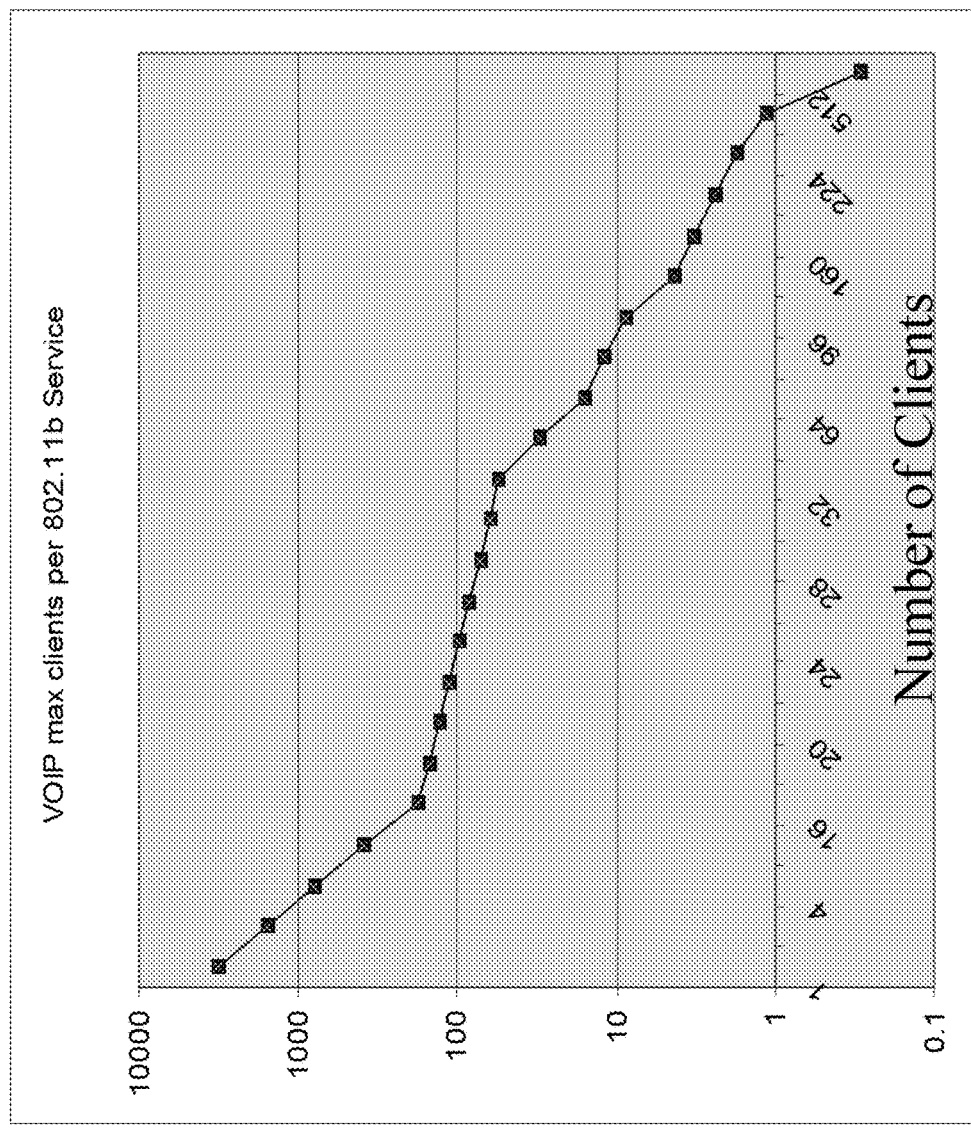
FIG. 10 shows the maximum VOIP bandwidth available per client, using 802.11 radios, as the number of clients increase, as measured by the size of the packet that each client can send every 20 ms. As the number of clients increase the size of the packet—and the associated voice quality—drops dramatically. In one embodiment, to achieve 64 Kbps voice quality, an 802.11b radio can support around 25 clients.
Figure 11:
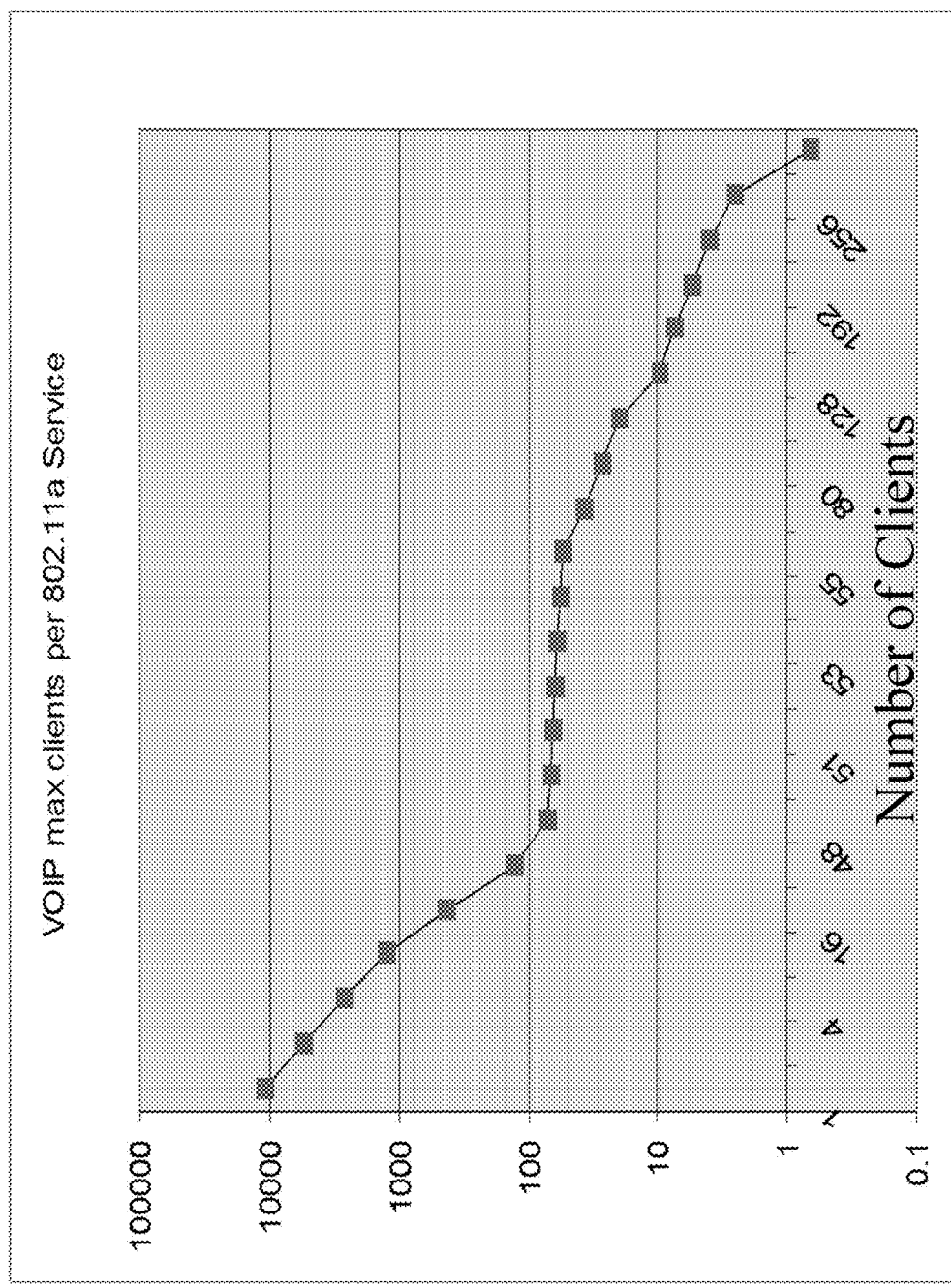
FIG. 11 shows the maximum VOIP bandwidth available per client, using 802.11a radios, as the number of clients increase, using the same packet size metric sent every 20 ms. As the number of clients increase the size of the packet—and the associated voice quality—drops dramatically. In one embodiment, to maintain 64 Kbps voice quality, an 802.11a radio can support around 55 clients.
Figure 12:
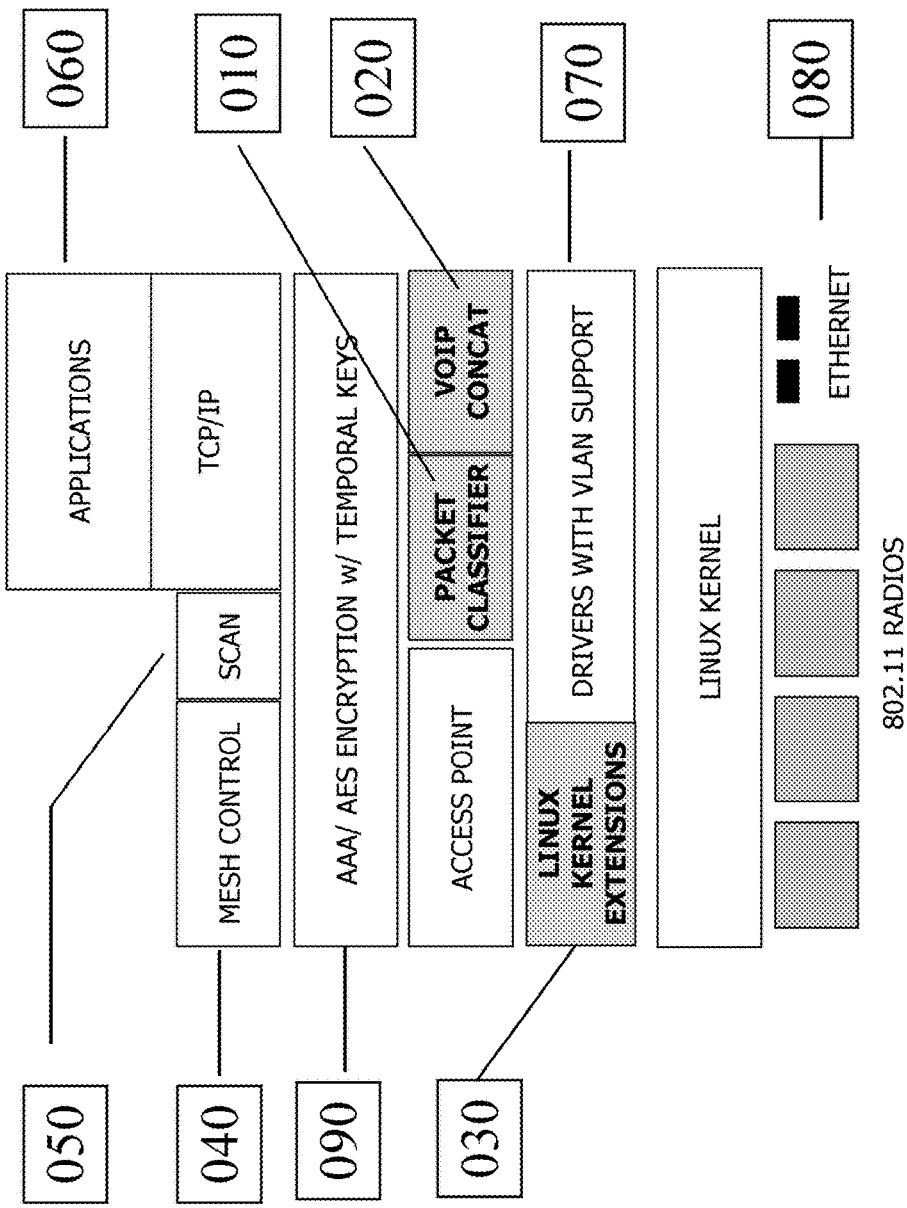
FIG. 12 shows extensions developed and implemented in the mesh network stack to provide an efficient backhaul for voice. The small voice packets are concatenated into larger packets and sent (as one packet) at regular intervals to the backhaul radios. At each mesh node voice packets intended for that destination are removed and the rest sent back (as one large packet).

This adversely affects the delivery schedule of lightweight packets (e.g. VOIP, FIGS. 10, 11) that travel no faster than large packets, through no fault of theirs, other being smaller than the standard packet size. Hence container based transport for VOIP, FIGS. 10-12 are discussed in referenced applications. Filling the packet container reduces the "price" per VOIP packet and also ensures reliable (assured latency/jitter) delivery. Without containerization, client capacity rapidly deteriorates, FIGS. 10-11. The IP highway is not suited for short chirp like devices, whether they are VOIP packets or other types of small-payload transmissions.

In addition to favoring larger packet sizes, retries (as in birds chirping repetitively) are frowned upon. Resending large packets increases traffic and TCP/IP overhead costs are based on a low number of retries. Further, retries are discouraged because they may flood the network e.g. broadcast storms. Retries are the exception, not the de facto modus operandi. Hence various forms of "virus" checks on email, file transports etc. are used. Since small packets are treated as one large packet, any device that begins to "chirp" like birds who chirp blindly and repetitively are costly especially when these chirp-like packets are travelling solo, FIGS. 10-11 and hence the value of concatenation and scheduled transmissions of larger packets see 020 in FIG. 12.

In contrast with legacy networks, communications that uses retries and over provisioning/broadcast storms are common in nature. For instance, pollen distribution by plants is not sender oriented. Instead, as many messages are sent as possible, in all directions. Note that these storms (e.g. pollen, monsoons) are seasonal, their time to live functions are encoded in their design. Parameters for these information containers do not have to be explicitly stated in each packet header. Pollen has its time-to-live function genetically encoded in it. Beyond that time it is ineffective. No network flooding can occur, despite over provisioning. Broadcasts are managed at a distributed systems level through the mesh control layer, FIG. 20, not on a per packet basis. Now, flooding can be contained, as in nature.

Further, nature's "packets" are receiver oriented. Pollen is promiscuously propagated, witness the temporary broadcast storms called allergy season. It is the receiver that has the (genetically encoded) secret handshake to unlock the pollen packet data. Sender data need not be encrypted.

In nature, receiver oriented security enables pollen to be lightweight (terse) and carried far by even low power winds. Further, pollen is reasonably patient or latency indifferent. As long as winds appear within pollen season, spring will occur. Light weight chirps/pollen are thus secure and lower Total Cost of Ownership (TCO) based on their lightness and "patience."

In the world of Internet of Things (IoT), there is a need to be able to support lightweight chirp-like data without unduly taxing either the incumbent IP based networking protocols or the "chirp" device. This network protocol would support economical and effective transport of small, terse, repetitive chirps. In many cases the chirps are latency indifferent. Further, they would allow varieties of subscriber driven (receiver oriented) temporary broadcast storms without adverse effects.

DNA Based Genus Classification

Routers/Propagators, need some pollen "genus" or category or description to enable the match making What does this descriptor look like? Bird chirps serve as an analogy. Bird chirps are categorized, based on studying individual bird categories. We can identify the bird type from its chirp/tune/melody. Hence those subscribers interested in melodies from doves, can now receive those recordings, based on bird category. The categories will have to support different levels of granularity—some bird enthusiasts are only interested in doves near their homes. Hence the category field, should be sufficiently flexible in design, to support further drill down.

In both melody/tunes and DNA structures, there exist "marker" strands of information that provide a common pattern across members of the category. These markers occur at specific locations and are of specific patterns. Thus, some categories may be described as those that have a 8 bit marker, always in the 4th byte of the bit stream. Thus the classification could be 4.8.XX.XX, where XX are more levels of granularity that may be gleaned from knowing a specific pattern type and what it entails, in terms of how to further classify the public (no security but not necessarily universally decipherable) category field.

Subscription based granularity Finer granularity is simply a matter of loading the appropriate agents who can recognize and sort based on information unlocked by the marker templates. Markers may be used in both public and private sections, FIG. 64. Agents unlock those patterns, based on access to Marker data formats to generate a finer granularity category/payload. In FIG. 70, the public category 4.8.255 7050 is sufficient to get the pollen to the 4.8.XX "bus stop". Agent 7060 then provides the data format to identify pollen as 4.8.255.22.243.16.23 7070. The publish subscribe exchange can thus support M2M flows shown in FIGS. 68, 69 at varying levels of granularity. The payload is still secure, with its own agent 7080.

Low Overhead Routing is now possible: a quick bit mask on incoming chirp packets, FIG. 71 filters all publishers for 4.8.255 . . . . Further filtering may require addition agent subscriptions e.g.

4.8.255.22

4.8.255.22.243 . . .

In one embodiment, Public classifications provide at least 3 levels of addressing (e.g. 4.8.255) and potentially the complete DNA strand/signature, based on agent subscriptions. The number of sub genus categories (e.g. 3 for 4.8.255) needed to more tightly define the zone of publisher interest is diverse. It is based on subscriber interests and mesh topologies see FIGS. 13, 39, 59, 60, 63, 68, 69. The nature of sorting, aggregation, filtering chirp data favors hubs along the router mesh tree. As described in referenced applications, natural "hubs" emerge, where it is more toll and hop cost effective to place agent for rerouting and reloading buses, FIG. 71, and agents will move to propagator nodes based on demand/supply and toll/hop costs, see Appendix A, Ser. No. 10/434,948.

Finer granularity costs requests follow the same toll hop costs and driven by the same economics: some applications/ agents will work with "cheaper" but still relevant data some "hops" away. Other traffic may be more latency/jitter sensitive see FIGS. 56, 68, and onwards. In one embodiment, packets are cloned at each junction of the mesh tree, to support multiple subscribers and routes. Pollen subscriber thus are dynamically driving the "wind" of bus loads, their contents and their frequency, at concurrent multiple levels of granularity, FIG. 71, 72.

Inherent Security of Chirp Protocols

Encapsulating Chirp Packets Chirp data transport involves traversing the IP network, in some embodiments, and are thus susceptible to snooping/hacking But this is not your typical IP data packet since the data is based or Chirp/Pollen-ID and/or Flower/Agents-ID etc. These are not typical IP or MAC-ID type Sender/Receiver Address Frames, FIGS. 34 through 36. The same format is also available for chirp devices:

a) The IP Destination Address (if applicable), and can include other addressing information depending on the type of transmission involved—e.g. unicast, multi-cast or broadcast, 3520, b) Chirp-ID (in the Sender Address frame, SA, 3522), c) Agent-ID being sought (in the BSSID Element, 3524)

d) Any other use of the IP frame formats, recognizable by an agent.

All options (and their variants) exist within the exemplary Action Frame format, suitable for transmission over standard WIFI networks.

In one embodiment, FIG. 36 shows a measurement request action frame, 3630. These management or action frames look like the innocuous request from stations requesting information from a specific AP (with BSSID). Only chirp aware routers are aware that these are actually chirp packets and that the data in the DA, SA and BSSID is to be interpreted differently based on their internally known data format (Marker template, FIGS. 64, 70).

Chirp routers know just enough to decode the DA, SA and BSSID data sections, FIGS. 35-36, to provide necessary routing. They cannot decipher the vendor specific information elements—only specific agents/tunes/flowers hold those private "keys." Routers simply engineer "winds" and "buses" to move pollen.

How does the Chirp aware router recognize a chirp packet masquerading as an IP packet? Multiple embodiments exist:

SIP-like Registries In one embodiment, the router knows which interface transports Chirp packets. It has a complete list of 802.11 stations associated with this AP. As part of the tree topology, it also has a list of all stations downstream— via the downlinks, FIGS. 4 through 8. It may not have access to the routing tables up stream. However, it may use distributed SIP registries that contain both chirp device and agent ID locations. Some embodiment use dynamic SIP registries to continue to provide VOIP phone connectivity even within isolated clusters. The same principles may be used to define where agents/flowers are, or the reverse look up—where chirp devices are, of interest to a particular agent.

Local Port Identification Even without the aid of SIP-like registries, chirp routers are still cognizant of the special nature of the data packets being transmitted. Chirp routers are keeping track of which port interface was used to inject the IP packet into the mesh network. In the mesh nodes shown in FIGS. 17, 23, there are multiple interfaces generally provided—the uplink and down links of Backhauls (BH and FD) and the client Access Points (AP). If the chirp packet came in through on of the APs, then it is marked as a chirp, since the Chirp ID provided does not match an associated IP based client's IP address or MAC-ID in its routing table.

Exclusion Principle in one embodiment, the AP does not need to keep a list of chirp devices it services—it can surmise its identity based on the exclusion principle, namely, this device ID, if an IP based device, is not in its routing tables or those of it node neighbors. Chirp device port locations and identity do not have to be stored, if anonymity is desired. In one embodiment, the chirp will still be forwarded up and/or down through the up links and down links the mesh tree, marked as a chirp in search of the agent/tune/ subscriber. The identity of both chirp and its interested agent/tune/flower is hidden and yet the pollen reaches the flower efficiently. Ability to provide this type of anonymity extends existing prior art IP based routing security.

Incognito Pollen: Some pollen travel incognito. That is, they expect propagators to rebroadcast them, potentially in all directions, until an intended agent discovers them. In one embodiment, a "4.0" category pollen implies a marker at byte 4 but its length is not specified. Agents with bit mask filtering locate such semi-incognito pollen, they know what the marker is. Note the marker can be arbitrarily long or short. Short markers increase the occurrence of false positives with other marker types (e.g. 4 bit markers 1.0.1.1 sharing same 4 bits as 8 bit marker 1.0.1.1.0.0.1.1). Agents that have this level of information can also glean other data from the packet melody/strands, to filter them out.

Port based Zone Control In another embodiment, a "0.0" category pollen does not specify either the location or size of the marker. This is completely incognito and the propagator must continue to rebroadcast the pollen both up and down the tree till it reaches either roots or leaves of the tree. Chirp devices have no access to the IP network except through the bridging propagators FIG. 22. As in nature's broadcast storms, an agent at the chirp interfaces is either present or the pollen dies. Not that the tree networks in FIG. 22 are all layer 2. Only routers and their routing applications (FIG. 12) can initiate a bridge from Chirp to IP. Hence IP spamming/flooding from a corrupted or malfunctioning chirp device is stopped at the router.

Audit Trails Enterprise Class messaging mandates full audit trails on the myriad forms of communication being supported with the network. Each mesh node keeps a time window log of all messages received from all ports 090, FIG. 12. Further, for security reasons, it needs to keep a log of all out going packets created by applications operating at both Kernel and Application levels of the Stack. In on embodiment, the mesh node routing tables treat applications as a special class of client devices, resident in their multi-tenant application deployment environment. The location of affected devices is known within the network tree. Heart beat based messages are sent to all "clean" nodes to avoid contact with "affected" nodes and a new "temporal Key" is issued Akin to ant colonies, the nodes response to "danger" evolves over time as publish-subscribe demographics change within the hybrid social network of humans and their machines and their evolving machine Esperanto, FIG. 69, 70.

Lineage Based Secret Maps. In some situations, a 0.0 pollen may wish to specify a direction and nothing else—e.g. up or down the tree. Thus, in one embodiment 0.0.1 pollen are upwards, while 0.0.2 pollen are downwards. Since each category has its own vocabulary and language, 0.0 chirp families may choose to use the next two bits to define direction (0.0.0.1, 0.0.1.0, 0.1.1.0 . . . ), as opposed to marker size. If the device is removed from the network and its expected topology, the navigation fails. The device is therefore "imprinted", like migrating birds, with a navigation "Mother" pattern. This is relevant to imprinting devices in the field to become part of a network, for life. The directions encompass both the chirp network topology and it parent IP based network tree, in an hybrid mesh network comprising of both, FIGS. 22, 39 et al. Alternate navigation routing maps are also provided in one embodiment, for dynamic failover in healthy networks, FIG. 55.

Chording Channels An agent can convert the data flow to be IP based, with regular IP addresses. In one embodiment, private networks coexist and span both chirp and conventional transmissions using "pattern" hopping techniques known only to them and their agents on the network. Part of the data travels as IP Data frames while others via chirp protocols, analogous to musical chords or dual signatures needed on a check. Only agents know the (chorded) "tune" This further obfuscates the chirp data flow.

In some embodiments, chirp data comprises IP based transport packets whose format is regular and legitimate IP-based packet. It supports all the Frame Control feature sets, FIG. 34, 3420, including multiple frames, power management and Distribution System (DS) flags. Thus, competent agents, running on chirp aware routers, may also convert IP data (including VOIP packets) into chirp packets, send them anonymously to another agent and then reconvert them back to IP traffic. This obfuscates IP based data flow. Thus both Chirp and IP payloads may be used interchangeably to obfuscate data flow within both chirp and legacy networks.

Conventional IP based devices may also use category patterns as part of their data classification schemes. IP based packet headers specify the sensor MAC_ID or serial number within the payload, in addition to the category classification for IP based applications using the pub-sub exchange. By the same token chirp devices, may, in their private payload or public category type, contain an IP address where they wish their pollen to be sent. At each junction of the mesh network, there is the potential to bridge between IP and non IP logical radio mesh networks, FIG. 22. At each junction there is the ability to reroute the packets or prune and reload them, FIG. 71, in alignment with current pub-sub demographics.

Chirp Bus Shuttle Scheduling

Several embodiments refer to scheduling of VOIP, to enable chirp like broadcasts from chirp like device networks to be efficiently repackaged to travel on existent and incumbent prior art IP based Network devices and protocols.

Chirps do not have destination addresses. Like school children boarding a school bus, they must be directed to get on the "yellow" bus/wind. In one embodiment, at each bus stop along the way, they need to be told which next bus to board, FIG. 71. The edge router FIGS. 12, 23, 71 manages bus arrival and departure times and also getting the chirp/pollen bulk containerized and ready for each bus trip. Where containers go is driven by the "clients": it is directing pollen to interested parties only. The chirp routers manage pollen/chirps getting on the correct "yellow" buses and bus departure schedules, as depicted in FIG. 71.

Random Intervals, In one embodiment, simple devices chirp intervals are random, thereby providing a "white noise" effect that smarter devices can adjust for, using automatic gain control and other methods.

Regular Intervals In one embodiment, buses leave at regular intervals to help schedule when a container of chirps arrives and leaves at each bus station. They are a part of the mesh network support infrastructure for chirp travel. Their frequency of arrival is driven by the polling frequency (e.g. 20 ms for VOIP phones). It will vary depending on the chirp device nature and urgency per methods taught previously, FIGS. 12, 24, 27, 28. Scanning and polling frequency is adaptive, per methods taught for mobile nodes.

Dynamic Intervals. Additionally, subscribers, in one embodiment, awaiting specific pollen delivery, may also request sooner or later delivery, thereby dynamically changing Quality of Service (QoS). Collaborative scheduling agents, in some embodiments, ensure global supply chain alignment of supply/demand using simple concepts like "avoid" and "cluster" to ensure appropriate use of bandwidth resources and prevent "stacking" FIG. 65 and also teaches hierarchical scheduling collaborative agents in control systems, FIGS. 26, 39, 68, 69.

This is a departure from Prior Art, where sender oriented IP packets declare their Quality of Service (QoS) requirements a priori, and QoS requirements are blindly enforced along the network path at significant added cost. QoS is dynamically managed in a receiver oriented network.

Bus Logistics Hubs In one embodiment, using the bus stations as decision points breaks up routing decision to hops between logistics hubs. The current active subscriber demographics and demand may be reevaluated at these hub points. Re-routing may be needed. For example, in one embodiment, routing policies may be specified. One "policy" is in place that all GE refrigerators provide a daily health status short "chirp" "color" (e.g. red, orange, blue, purple) forwarded to GE appliance service centers/subscribers. There are four such appliance region centers e.g. North, South, East and West. Based on the chirp signature and device location, directives running in edge routers "know" which bus load this pollen/chirp has to be part of There may be multiple subscribers so it also needs to track and route multiple concurrent buses to multiple subscriber locations. Further, at each bus stop, at each mesh node, the routers must "know" enough to "sort" pollen, at varied levels of granularity for most effective onward directions, FIG. 71. If packets need to be cloned to support multiple subscribers, they are, at forks along the path, in this embodiment. VOIP-like chirp packet cloning is managed by the router on a need basis, where forks occur—e.g. the container was traveling north, now is split into eastward and westward "half" containers and combined with other fellow "half" eastward and westward bound containers to form a more efficient whole container.

Departures from Prior Art The hierarchical tree architecture is similar to a post office hierarchy (county, city, country are the hub levels), but unlike the post office, the direction or "default" address does not convert the communication into explicit addresses and sender-oriented transmissions. This type of routing circumvents the static address schemes used in traditional mail and email routing. In these embodiments, the destination of the bus is dynamic and so is its routing path. This is analogous to not just changing bus routing (e.g. an accident) but also end destination (e.g. hospital) based on the current situation and nature of containerized load. If the load is no longer needed, it is discarded mid journey. Round tripping, caused by static destination addresses, is avoided. Further packets are cloned and pruned at each junction of the route, in alignment with pub-sub demands.

Collaborative Coexistence

Chirp data transport to the cloud involves traversing the IP network. Collaborative Coexistence is key since some chirp packets have subscribers reachable only through the incumbent IP network, e.g. VOIP chirp-like packets for an overseas subscriber. These networks and protocols must also conform to the existing frameworks and mediation layers e.g. FIGS. 12, 20. Chirp/pollen devices are simple—they do not know where the flower is. Hence IP destination addresses cannot be provided. Chirp aware routing supports these new receiver oriented packets.

Further, if chirp devices intend to operate in the same frequency spectrum as IP devices, then both dance partners need to share the dance floor without constantly stubbing each others toes (e.g. collision causing interference some causing retries possibly network flooding). Coexistence requires chirp devices not habitually create collisions or accidents on the IP based highways, like bad drivers. Methods taught with legacy chirp like devices (VOIP) see FIGS. 10-12, 24-25 ensure both types of transmitters dance well together in the same RF space.

Scheduling Device Chirps In one embodiment the chirp transmission schedules feeds the inter-node chirp bus schedules. Collaborative Scheduling, FIGS. 65 through 67 is used by mesh nodes to thus drill down to generate the local bus schedules for the node-node transport system. This in turn, drives when chirps need to arrive. The schedule also directs when buses leave. Routers are monitoring the bus queues. Routers may also thus request smart chirp devices to chirp more (if missing buses) or less frequently (if often waiting in line). Chirps then occur with the timing constraints of the bus scheduling system so that chirp packets arrive in time to climb aboard the bus in time to meet the inter-bus schedules of the logistics hubs. Hence, smart chirp devices, have an advantage over their simpler chirp only devices.

Ideally, Chirp transmissions should occur sufficiently frequently for the level of granularity requested by the subscribers ("Customers") schedules.

Small blue/red shift directives are provided by the Access Point for chirp devices. The Access Point receiving the chirps, monitors them to determine the range of the transmission "task" start/end times and their blue/red regions. It can thus profile the task and its variants. The bus schedule for the subscribers are then examined to determine the optimal bus size and interval. This, in turn drives how often the chirps must be transmitted and at what time. Synchronization may be approximate, measured in terms of a non dimensional parameter e.g. the fraction of the current chirp interval. This ensures complicity since both parties understand what that means regardless of whether they represent the time in nanoseconds or primitive register counters, Thus listen capable chirp devices may be controlled to adapt to the subscriber interests.

Closing Local Control Loops

Compare pollen based routing to conventional IP addressing. IP addressing is destination based. After the IP packet reaches its destination, the payload is deciphered. The typical thin client machine control loop, FIG. 56 is best efforts and assumes (remote) connectivity. It is difficult to provide local autonomous machine control for applications in FIGS. 39, 56, 57, 68, 69.

The Chirp Category classifications scheme enables usable small data to be both generated and consumer by and for the edge member devices. Data is processed closer to the source/cluster, where it has more impact in tight sensing-control-actuation loops FIG. 56.

Topology Matters FIG. 46, depicts why network latency and topology are inter-related and hence relevant to latency sensitive VOIP/Chirp bus delivery schedules. In one embodiment, a round robin approach where, the AP services each client in turn. In that example, 10 ms is the (equal) service duration for individual client services. Packets are buffered till a round robin cycle is complete. At the end of each cycle the container is sent, per up the tree, in one embodiment. The local latency upper bound would therefore be 30 ms for section 70. By the same token, the root node is servicing 5 clients and hence the upper bound to reach the root node is 50 ms for sections 70, 80. Further, the example pointed out that, had all the nodes been connected directly to the root node, the latency would be 90 ms. 1 hop networks—all clients connected to a root node—are not necessarily "better". A five-hop string-of-pearls, O(n) routing scheme, FIG. 45, may provide better service, than the 1-hop 5-client star, FIG. 46, Section 80.

In one embodiment, bus delivery schedules are driven by the round robin delay caused by servicing siblings, at each sub tree along a route. More siblings imply more latency and favor node/device migrations. Others may barter to get a bigger slice of the pie. Accordingly, network topology and routing is modified based on toll/hop costs.

In FIG. 46, nodes operated independently and asynchronously but based on a common multiple of some service time interval e.g. 10 ms. Minimum Bus Intervals vary, based in the number of siblings. During the process, the bus interval is set. Buses leave at preset intervals, regardless of whether the bus is full or not. In more efficient implementations, the departure time is flexible, and buses may wait till more passengers arrive, within a prescribed waiting limit. Thus the stream and CSMA allocations are based on "stacking", in dynamic alignment with "Customer Satisfaction" FIGS. 65, 66, 67.

Periodic Silent Intervals In FIG. 47, the bulk bus transport stream 4720 is first, during which all clients can listen but not talk, see FIGS. 12, 24. The remainder time 4750 is used to transfer data back from IP based clients to nodes etc. Further, FIG. 25 shows separate "channels" for concurrent transmissions. Contention is reduced during the Stream section, 4720 and possibly more. SCAN agent, FIG. 12, measures overall activity of disparate packet types (a form of "channel list"). Note that in Wi-Fi standard infrastructure mode, all communications are with the AP, hence tree based routing is inherent.

Stream Reader Circuits: FIG. 50 depicts the stream reader, in one embodiment. Special purpose Stream Readers are privy to data traffic queued for transmission at a node. Like post office sorters, they identify and sort the "mail" and therefore, help to collectively define bus schedules, reduce dead letter re-transmissions etc. Stream readers, resident at the node, feel the "pulse" and therefore provide early warning signals to the Mesh Control Layer. More "mail" from one node may increase toll cost for other child nodes to switch parents, using load balancing and adaptive power control methods, FIG. 1.

Stream readers can feed multiple stream viewers, 5040, sequential readers/agents, 5060 or a logging database 5080 community mailbox etc. A circuit of collaborating stream readers and subscribers emulate complex logistic supply chains, see FIG. 51, 5120. Disparate traffic data is sent to knowledge repositories 5180. Secure Control lines from it, 5170, drive sub-circuit behaviors and their outputs, 5125, 5135, 5155. Repositories may also provide the secret handshakes needed by readers to correctly decode public network traffic 5150. Thus bulk network traffic, 5150 may employ little or no encryption and thus be lightweight, like pollen. Further, the Network Viewer 5190 may be connected to the real time stream plug in circuit 5145 or run it in playback mode, 5165 from knowledge repositories 5180. The same circuit based framework 5120 may also provide interleaved real time and historical trending, simulations and machine learning, FIG. 52, 5290. Note that 5155 is not connected—it is in "connectionless" broadcast/multicast mode. Thus both direct and indirect subscription styles are supported within the same stream reader framework.

One embodiment of an open extensible Stream Reader Framework, FIG. 52, is implemented in Java. A subset, JavaScript API 5230, provides dynamic and customizable HTML based views. Custom Stream viewers define the GUI for different devices and form factors. More complex business logic applications use the Enterprise class Java API and Repository 5240. Third party adapters and applications, 5250, extend the network to consumers/providers of information and their viewers. FIGS. 53 and 54 depicts the published interfaces for the Network Manager Streams API and the Heart Beat Entity relationships, respectively. Together, they enable speedy development, for Hybrid Human-Machine networks FIG. 55.

Device Management and Control

Discovery and Registration: Several embodiments expand on the DHCP approach with the isolated distributed SIP registry functionality as described in that invention. Terse and periodic VOIP chirps are routed by the local SIP server. Further, when the VOIP network joins an external network, SIP registry information is exchanged. The Chirp registries may thus also exchange chirp device classifications and protocol specifics. Other (restricted) registries may contain location of agents dispersed at local nodes based on bus scheduling requirements. This enables discovery using the same approaches for devices, agents and logistics hubs. A comprehensive framework for discovery and routing for both Chirp and IP devices are thus supported by the DHCP and SIP registry modules, specifically designed for mobile, temporal wireless mesh networks.

When a new device is registered on the network, its agent/app is "loaded"-. This agent/app then provides the subscriber-based chirp-to-chirp translations and chirp-to-IP translations and filtered "small" data. Based on the direction of the chirp, agents may also direct propagators to provide intermediate translations see FIGS. 22,23 through applets operating at the routing and "port" forwarding tables at each mesh node port/interface of the dynamic switch stack tree.

Learning through Correlations FIGS. 68 through 69 depict application use cases that highlight the shared publish subscribe exchange through which small data reaches big data subscribers and their analysis/inference engines. In FIG. 68, a low cost lawn sprinkler actuator is controlled through a local control loop, 6910 and a remote control loop 6930, conversing through a shared publish-subscribe exchange, 6920, see also FIG. 56. Upstream to the actuator valve a water pressure sensor is depicted, 6922 as is a down stream water flow sensor 6924. Both sensors reside within the local (and secure) M2M home community and their (subscribed) chirps are part of scheduled pub/sub exchange 6920.

The lower control loop vocabulary is limited to actuator commands 6915, (e.g. "ON", "OFF"). The system has no way of knowing whether the lawn sprinkler is functional, without accessing information from the larger M2M community. When chirp data is time tagged, then causal analysis indicates that if the upstream water pressure is "good" and the down stream flow is "bad", then the actuator is worn out and needs replacement, see 6835. A local integrator agent, 6837 may also, through access to the shared pub/sub stream, 6920, be directed to perform this check each time the valve is activated, thus reserving internet traffic for exception handling. Thus an intelligent valve actuator emerges, without additional hardware/sensors at the actuator. Dual control loops thus provide intelligence without adding to the cost of the device.

FIG. 69 depicts how discovery of related sensory streams can drive more refined control models for M2M Enterprise. The initial application is Air Conditioning control for a large building, 6910. The integrator agents, through the shared chirp classification streams, discovers other local subscribers to the energy usage/cost data 6920 active in the same building. Further analysis of their activities indicates that the front door elevators are active the same time that the heating/cooling in that zone is "unstable", 6930. It also can correlate night time activity, when lights are turned on 6940 in zones that need to be activated, when the lights are on. Hence multiple, related subscriptions now drive a refined control model for air conditioning, 6950. Note that human "experience" would arrive at the same conclusions over time but machines, through their subscriptions and pattern analysis are able to close the loop semi-autonomously or autonomously. Further, the causal analyses/inferences gleamed from one building may be transportable across related domains. Therein lies the power of a shared pub/sub exchange—the ability to glean useful data from hitherto unknown sources. See also Classification Aided Discovery How does the local integrator or its big data supervisors "discover" water pressure correlations in FIG. 68 or the local energy consumers in FIG. 69?. This discovery is engendered through the chirp classification system, two embodiments shown in FIGS. 64 and 70. In FIG. 70, the 4 bit marker pointer 7010 has a bit address of 1010, indicating an 8 bit marker pointer 7030, at the end of the packet with its agent ID of 255. This means that the public section 7020 is 4 bytes long. The coarse classification is thus 4.8.255, sufficient for pub/sub bus schedules to deliver the chirps to hubs and clearing houses, see 7050. Those who have subscribed to Agent 4.8.255 may then be able to decipher the container further. For example, Agent 48.255 states that each of the 4 bytes is a further classification, see 7060. The full chirp classification is thus 4.8.255.22.243.16.23.

Network Management The resulting implementation within a network of wireless nodes is scalable with no loss of bandwidth over many hops. The resulting network logic is distributed with low level autonomy on routing, power and channel management. The network uses distributed intelligence in terms of applications and where they reside: the result is a network where both the network management and the applications within the network can be distributed. The embodiments serve as a new type of service delivery framework specifically to address more "smarts" at the edge where the simple devices are sending terse messages or chirps. The network is flexible in that it can be implemented with multi-purpose devices, with alternative embodiments relying on a router and other embodiments using a client device. The embodiments rely on mesh nodes or routers, with the benefit of the router versus Machine controller are that by relying on the router there is low latency communication and ability to prevent escalation. The embodiments also rely on the router as the application delivery platform. The result is that the SDN control plane extends to the edge of the network where the chirping devices broadcast. In one embodiment the heartbeat extension to include sensor feeds and the result is integration with the NMS.

In summary, a new type of device management system emerges where efficient M2M command and control is enabled at the edge and edge communities. Chirp category based packet identification provides the M2M version on nature's receiver based communication protocols. Timing pollen "winds" is explored in FIGS. 25, 26, 65, 71. Heart Beats and Streams are discussed in FIGS. 46 through 55. The streams support applications in closing real time M2M control loops, FIGS. 56 through 63, 68 through 71. FIGS. 72 and 58, depict the top level view of devices, propagators and integrators, each essential to a sustainable Internet of Things.

The invention claimed is:

1. A system of transmitting of data packets within a network comprising:
   at least one device transmitting at least one short communication message;
   at least one network router comprising a chirp receiver for the at least one short communication message;
   wherein said chirp receiver accepts said short communication message during an access function of said router without interrupting other communications; and
   wherein said router further comprises an uplink function connecting said least one router to an external ip-based network using intermediary routers; a downlink function connecting said least one router to other routers within said network; and a scanning function wherein said uplink function, downlink function, scanning, and access functions are performed using one physical radio acting as multiple logical radios wherein the uplink function logical radio and the downlink function logical radio connect the routers participating in the system in a tree-based virtual switch.

2. The system of claim 1 further comprising at least one non-chirp enabled network router having a single physical radio which performs the uplink function, downlink function, scanning function, and access function.

3. The system of claim 1 wherein the updates to the routing information within the network follow O(n) complexity where n is a number of network participants.

4. The system of claim 1 wherein said short communication message comprises a terse status update without a specific receiver.

5. The system of claim 1 wherein said short communication message comprises a series of terse status updates received by the router wherein said router containerizes said series of terse messages.

6. The system of claim 1 wherein said uplink function comprises a connection to a single parent forming a logical tree network.

7. The system of claim 1 wherein said downlink function comprises a connection to other routers wherein said downlink routers do not communicate with one another directly, forming a logical tree network.

8. The system of claim 1 wherein each router sends a regular heart beat status update.

* * * * *